(12) United States Patent
Ishiga

(10) Patent No.: US 8,478,053 B2
(45) Date of Patent: Jul. 2, 2013

(54) IMAGE SORTING APPARATUS

(75) Inventor: Kenichi Ishiga, Yokohama (JP)

(73) Assignee: Nikon Corporation, Tokyo (JP)

( * ) Notice: Subject to any disclaimer, the term of this patent is extended or adjusted under 35 U.S.C. 154(b) by 507 days.

(21) Appl. No.: 12/834,457

(22) Filed: Jul. 12, 2010

(65) Prior Publication Data

US 2011/0069896 A1 Mar. 24, 2011

(30) Foreign Application Priority Data

| Jul. 15, 2009 | (JP) | 2009-166376 |
| Jul. 15, 2009 | (JP) | 2009-166377 |
| Jun. 29, 2010 | (JP) | 2010-147024 |
| Jun. 29, 2010 | (JP) | 2010-147025 |
| Jun. 29, 2010 | (JP) | 2010-147026 |
| Jun. 29, 2010 | (JP) | 2010-147027 |

(51) Int. Cl.
*G06K 9/62* (2006.01)

(52) U.S. Cl.
USPC .......................................................... 382/224

(58) Field of Classification Search
USPC .................................................. 382/224, 305
See application file for complete search history.

(56) References Cited

U.S. PATENT DOCUMENTS

| 5,640,468 | A | 6/1997 | Hsu |
| 5,828,771 | A * | 10/1998 | Bloomberg ................... 382/112 |
| 6,380,934 | B1 | 4/2002 | Freeman et al. |
| 6,535,636 | B1 | 3/2003 | Savakis et al. |
| 6,621,926 | B1 | 9/2003 | Yoon et al. |
| 6,671,405 | B1 | 12/2003 | Savakis et al. |
| 6,711,293 | B1 | 3/2004 | Lowe |
| 6,754,667 | B2 | 6/2004 | Kim et al. |
| 6,856,987 | B2 | 2/2005 | Kobayashi et al. |
| 6,868,182 | B2 | 3/2005 | Kasutani |
| 6,870,957 | B1 | 3/2005 | Kasutani |
| 7,035,477 | B2 | 4/2006 | Cheatle |
| 7,054,861 | B2 | 5/2006 | Kobayashi et al. |
| 7,239,750 | B2 | 7/2007 | Rising |
| 7,245,762 | B2 | 7/2007 | Shin et al. |

(Continued)

FOREIGN PATENT DOCUMENTS

| JP | A-4-329489 | 11/1992 |
| JP | B2-3020887 | 1/2000 |

(Continued)

OTHER PUBLICATIONS

Gong, Y. et al., "Image Indexing and Retrieval Based on Color Histograms," *Multimedia Tools and Applications 2*, 1996, pp. 133-156.

(Continued)

*Primary Examiner* — Samir A. Ahmed
(74) *Attorney, Agent, or Firm* — Oliff & Berridge, PLC

(57) ABSTRACT

An image sorting apparatus provided with an image inputting unit that inputs an image; a distribution function preparing unit that prepares a distribution function of pixel values of the image; a describing unit that performs series expansion on the distribution function by using base functions that form a complete set and are orthogonal to each other due to different weights in a distribution area and describing the distribution function by expansion coefficients, an evaluating unit that evaluates features of the shape of the distribution function based on the expansion coefficients, and a sorting unit that sorts the image to images of at least two categories based on results of the evaluation.

17 Claims, 21 Drawing Sheets

U.S. PATENT DOCUMENTS

| | | | | |
|---|---|---|---|---|
| 7,298,896 | B2 * | 11/2007 | Yamaguchi et al. | 382/172 |
| 7,426,301 | B2 * | 9/2008 | Porikli | 382/181 |
| 2003/0035595 | A1 * | 2/2003 | Liu | 382/305 |
| 2003/0193582 | A1 | 10/2003 | Kinjo | |
| 2006/0008151 | A1 * | 1/2006 | Lin et al. | 382/190 |
| 2011/0222785 | A1 * | 9/2011 | Hirohata et al. | 382/224 |

FOREIGN PATENT DOCUMENTS

| | | |
|---|---|---|
| JP | A-2003-157439 | 5/2003 |
| JP | B2-3562516 | 6/2004 |
| JP | A-2006-221607 | 8/2006 |
| JP | A-2009-183329 | 8/2009 |
| JP | A-2010-67221 | 3/2010 |

OTHER PUBLICATIONS

Niblack, W. et al., "The QBIC Project: Querying Images by Content Using Color, Texture, and Shape," *SPIE*, 1993, pp. 173-187, vol. 1908.

Manjunath, B.S. et al., "Texture Features for Browsing and Retrieval of Image Data," *IEEE Transactions on Pattern Analysis and Machine Intelligence*, Aug. 1996, vol. 18, No. 8.

Motoyoshi, I. Et al., "Image Statistics and the Perception of Surface Qualities," *Nature*, May 10, 2007, pp. 206-209, vol. 447, No. 7141.

Mojsilovic, A. et al., "Capturing Image Semantics With Low-Level Descriptors," *IEEE*, 2001, pp. 18-21.

Landau, L. et al., "The Classical Theory of Fields," *Course of Theoretical Physics*, vol. 2, 1973, pp. 64-69 and 71-73, $4^{th}$ Edition.

Landau, L. et al., "Mechanics," *Course of Theoretical Physics*, vol. 1, 1973, pp. 1-24, $3^{rd}$ Edition.

Landau, L. et al., "Statistical Physics," *Course of Theoretical Physics*, vol. 5, 1976, pp. 1-110, $3^{rd}$ Edition Part 1.

Landau, L. et al., "Quantum Mechanics (Non-relativistic Theory)," *Course of Theoretical Physics*, vol. 3, 1977, pp. 45-49, 267-271 and 370-378, $3^{rd}$ Edition.

Schiff, L. I., "Matrix Formulation of Quantum Mechanics," *Quantum Mechanics*, 1970, pp. 148-186, $3^{rd}$ Edition.

Arfken, G., "Special Functions and Integration Equations," *Mathematical Methods for Physicists*, 1970, pp. 478-533 and pp. 609-642, vol. 3.

The Color Science Association of Japan, "Color Science," *Course of Color Science*, 2004, pp. 80, 81, 140, 141, Table 3.4 and Table 3.13, vol. 1.

Gormish, M.J., "Source Coding With Channel, Distortion, and Complexity Constraints," *Doctorate Thesis*, Mar. 1994, pp. 50-66.

Akai, M. et al., "Electronic Structure of Impurities in Ferromagnetic Iron. I. $s, p$ Valence Impurities," *Journal of the Physical Society of Japan*, Nov. 1985, pp. 4246-4256, vol. 54, No. 11.

Akai, H. et al., "Electronic Structure of Impurities in Ferromagnetic Iron. II. $3d$ and $4d$ Impurities," *Journal of the Physical Society of Japan*, Nov. 1985, pp. 4257-4264, vol. 54, No. 11.

Akai, M. et al., "Electronic Structure of Impurities in Ferromagnetic Iron. III. Light Interstitials," *Journal of the Physical Society of Japan*, Mar. 1987, pp. 1064-1077, vol. 56, No. 3.

\* cited by examiner

Chebyshev polynomial $T_n(x)$

IMAGE SORTING APPARATUS

CROSS-REFERENCE TO RELATED APPLICATIONS

The disclosure of the following priority application is herein incorporated by reference:

Japanese Patent Application No. 2009-166376 filed on Jul. 15, 2009,

Japanese Patent Application No. 2009-166377 filed on Jul. 15, 2009,

Japanese Patent Application No. 2010-147024 filed on Jun. 29, 2010,

Japanese Patent Application No. 2010-147025 filed on Jun. 29, 2010,

Japanese Patent Application No. 2010-147026 filed on Jun. 29, 2010, and

Japanese Patent Application No. 2010-147027 filed on Jun. 29, 2010.

TECHNICAL FIELD

The present invention relates to an image sorting apparatus.

BACKGROUND ART

In the past, there has been the technical field referred to as "similar image retrieval" for retrieving similar images for one model image presented by a user. NPLT 1 discloses the technique of using color histograms and evenly combining their bins for rough quantification, using those values themselves as features, and measuring a distance of degree of similarity in a feature space to thereby extract similar images. NPLT 2 proposes a system of retrieving similar images from the aspects of color, texture, and shape and defines features similar to those of NPLT 1 for the color, but defines quite different features for the other aspects. NPLT 3 shows a method of similar image retrieval using texture features. Here, an image is transformed into Gabor wavelets, and the set of the mean value of produced high frequency subband values and standard deviation is defined as a feature vector. Then, a technique of extracting an image resembling a texture shown in the Brodatz texture database by a distance comparison in a feature space is disclosed.

On the other hand, unlike similar image retrieval, the technique which can be referred to as "perceptual retrieval" for sorting photos by perceptual adjectives is disclosed in PLT 1. Here, the perception of a photo is described by approximating the photo by three representative colors and comparing this with a database prepared in advance for color designers producing clothing, interiors, and city landscapes and describing relationships between a triadic model and adjective-based verbal impressions. That is, instead of further roughly describing the relationship in the method of NPLT 1 to determine representative colors, a plurality of one to 10 or so pattern models are prepared for one word.

Further, NPLT 4 clarifies the relationship between an image and glossiness. That is, it points out the existence of a deep connection between the asymmetry of a luminance histogram of an image and the mechanism of human perception and judgment of glossiness. Specifically, this clarifies the relationship between the skewness of a luminance histogram and glossiness. In order to form simulation images for a psychological experiment for this purpose, a beta function enabling establishment of correspondence with the skewness is postulated as the model of the histogram, and parameters of that are changed to thereby perform the psychological experiment.

CITATION LIST

Patent Literature

{PLT 1} Publication of Japanese Patent No. 3020887

Non Patent Literature

{NPLT 1} Y. Gong, C. H. Chuan, and G. Xiaoyi, "Image Indexing and Retrieval Based on Color Histograms," Multimedia Tools and Applications 2, 133-156 (1996).

{NPLT 2} W. Niblack, R. Barber, W. Equitz, M. Flickner, E. Glasman, D. Petkovic, P. Ynaker, C. Faloutsos, and G. Taubin, "The QBIC Project: Querying Images By Content Using Color, Texture, and Shape," SPIE Vol. 1908, 173-187 (1993).

{NPLT 3} B. S. Manjunath and W. Y. Ma, "Texture Features for Browsing and Retrieval of Image Data," IEEE Transactions on Pattern Analysis and Machine Intelligence, Vol. 18, No. 8, August 1996.

{NPLT 4} I. Motoyoshi, S, Nishida, L. Sharan, and E. H. Adelson, "Image Statistics and the Perception of Surface Qualities," Nature, 2007, May 10; Vol. 447 (7141), pp. 206-209.

SUMMARY OF INVENTION

Technical Problem

The techniques of the above NPLTs 1 to 3 had the problem that while these had the capability of collecting similar images of a scene extremely accurately matching a color histogram or texture pattern of a proposed image or proposed pattern, these did not have the capability of determining features common to images calling up the same perception even in scenes of different color or texture. On the other hand, the idea of representative three color approximation of PLT 1 may be applicable in certain respects, but cannot be said to accurately describe the overall perception of a photo. Further, NPLT 4 is extremely noteworthy, however, this stops at pointing out of the relationship between skewness and glossiness. The relationships with a variety of perceptions are not known at all.

A main object of the present invention is to provide an image sorting apparatus for sorting images according to adjectives. Further, another object is to introduce a hypothesis for the mechanism of perception and perform mathematical modeling so as to throw light on the relationship between measured quantities of images and psychological quantities and to introduce a method of quantitative description of quantities characterizing perception in an advanced form better suited to the mechanism of perception.

Solution to Problem (1)

(1-1)

According to the present invention, there is provided an image sorting apparatus comprising:

an image inputting unit that inputs an image;

a distribution function preparing unit that prepares a distribution function of pixel values of the image;

a describing unit that performs series expansion on the distribution function by using base functions that form a complete set and are orthogonal to each other due to different weights in a distribution area and describing the distribution function by expansion coefficients, an evaluating unit that evaluates features of the shape of the distribution function based on the expansion coefficients, and a sorting unit that sorts the image to images of at least two categories based on results of the evaluation.

(1-2)

In the image sorting apparatus described in item (1-1), the describing unit can use base functions that are orthogonal to each other due to different weights between a center portion and two end portions of the distribution area spreading in a positive region.

(1-3)

In the image sorting apparatus described in item (1-1), the describing unit can use base functions capable of shape description with a density attaching importance to shapes of a rising portion and a falling portion located at the two ends of the distribution function more than the shape of the center portion.

(1-4)

In the image sorting apparatus described in item (1-1), the describing unit can use Chebyshev polynomials as the base functions.

(1-5)

According to the present invention, there is provided an image sorting apparatus comprising:

an image inputting unit that inputs an image;

an edge image preparing unit that prepares an edge image concerning edge components of the image;

a distribution function preparing unit that prepares a distribution function of pixel values of the edge image;

a describing unit that performs series expansion on the distribution function by using base functions that form a complete set and are orthogonal to each other due to different weights in a distribution area and describing the distribution function by expansion coefficients, an evaluating unit that evaluates features of the shape of the distribution function based on the expansion coefficients, and a sorting unit that sorts the image to images of at least two categories based on results of the evaluation.

(1-6)

In the image sorting apparatus described in item (1-5), the describing unit can use base functions that are orthogonal to each other due to different weights between near zero and outside of the distribution area spreading in positive and negative regions.

(1-7)

In the image sorting apparatus described in item (1-5), the describing unit can use base functions capable of shape description with a density attaching importance to the shape of lower slope portions located at the outside of the distribution function more than the shape near the origin.

(1-8)

In the image sorting apparatus described in item (1-5), the describing unit can use spherical Bessel functions as the base functions.

(1-9)

In the image sorting apparatus described in item (1-5), the edge image preparing unit can filter the image to successively produce high frequency subband images comprised of a plurality of resolutions, successively combine the high frequency subband images from the lowest resolution to produce a single combined high frequency band image, and define the single combined high frequency band image as the edge image.

(1-10)

In the image sorting apparatus described in item (1-1) or item (1-5), when the image is a color image, it is possible to express the image by three color plane images of a hue plane, value plane, and chroma plane and perform the above processing for each of the three color plane images so as to sort the color image into images of at least two categories.

(1-11)

In the image sorting apparatus described in item (1-1) or item (1-5), the sorting unit can sort the image into at least two categories of adjectives.

(1-12)

According to the present invention, there is provided an image sorting apparatus comprising:

an image inputting unit that inputs an image;

a distribution function preparing unit that prepares a distribution function of pixel values of the image, a describing unit that performs series expansion on the distribution function by using base functions comprised of an even function group and an odd function group that form a complete set and are orthogonal to each other and describing the distribution function by expansion coefficients, a physical quantity calculating unit that gives even quantum numbers $(0, 2, \ldots)$ and odd quantum numbers $(1, 3, \ldots)$ to function groups belonging to subgroups having same properties concerning even functions and odd functions among the base function groups and calculating a physical quantity of the sum of products of the expansion coefficients and the quantum numbers given to each for all expansion coefficients;

an evaluating unit that evaluates features of the shape of the distribution function based on the physical quantity, and a sorting unit that sorts the image to images of at least two categories based on results of the evaluation.

(1-13)

In the image sorting apparatus described in item (1-12), when the image inputting unit inputs an image of one color plane, the describing unit uses Chebyshev polynomials as the base functions, and the physical quantity calculating unit can calculate the physical quantity by giving a quantum number 0 to all even function groups and giving a quantum number 1 to all odd function groups.

(1-14)

In the image sorting apparatus described in item (1-12), when the image inputting unit inputs an edge image concerning an edge component of one color plane, the describing unit uses, as the base functions, spherical Bessel functions comprised of at least an order 0 even function group and an order 1 odd function group, and the physical quantity calculating unit can calculate the physical quantity by giving quantum numbers equal to the orders of the spherical Bessel functions to the subgroups.

(1-15)

In the image sorting apparatus described in item (1-14), when the describing unit describes the distribution function by using order 2 or higher spherical Bessel functions, the physical quantity calculating unit can calculate the physical quantity and further can obtain a sum of products in a case when inverting the odd number order expansion coefficients to negative signs so as to calculate another quantity.

(1-16)

In the image sorting apparatus described in item (1-14), the edge image can be a single combined high frequency band image obtained by filtering the image to successively produce high frequency subband images comprised of a plurality of resolutions and successively combining the high frequency subband images from the one with the lowest resolution.

(1-17)

In the image sorting apparatus described in item (1-14) or item (1-16), the inputting unit can input edge images of planes of hue, value, and chroma.

(2)

(2-1)

According to the present invention, there is provided an image sorting apparatus comprising:

an image inputting unit that inputs an image $S^{(1)}(x,y)$ of at least one color plane of one image and an image $S^{(2)}(x,y)$ of an edge plane expressing edge components of the color plane;

an element calculating unit that calculates a plurality of elements $E_n^{(1)}$ (n=1, 2, 3, ... ) expressing features of distribution for the distribution of the pixel values $S^{(1)}$ of the image of the color plane and calculates a plurality of elements $E_n^{(2)}$ (n=1, 2, 3, ... ) for the distribution of pixel values $S^{(2)}$ of the image of the edge plane;

a first stage general recording unit that performs the processings of the image inputting unit and element calculating unit for all of the population images used as models of general images and records values of the plurality of elements $E_n^{(1)}$ and $E_n^{(2)}$, a first stage specific recording unit that performs the processings of the image inputting unit and element calculating unit for one or more images used as models of specific images and records values of the plurality of elements $E_n^{(1)}$ and $E_n^{(2)}$;

a first stage deviation value calculating unit that calculates, for the elements $E_n^{(1)}$ and $E_n^{(2)}$, deviation values $\alpha_n^{(1)}$ and $\alpha_n^{(2)}$ of the specific images relative to a mean of general images based on the positions in the distribution of the values of elements of the specific images with respect to the distribution of values of elements in the population images;

a subsum calculating unit that calculates each of a subsum $E^{(1)}$ obtained by taking a sum of the plurality of elements $E_n^{(1)}$ by using the deviation value $\alpha_n^{(1)}$ as a linear combination coefficient and a subsum $E^{(2)}$ obtained by taking a sum of the plurality of elements $E_n^{(2)}$ by using the deviation value $\alpha_n^{(2)}$ as a linear combination coefficient, a second stage general recording unit that performs the processing of the subsum calculating unit for all of the population images used as models of the general images and records values of the subsums $E^{(1)}$ and $E^{(2)}$;

a second stage specific recording unit that performs the processing of the subsum calculating unit for one or more images used as models of the specific images and records values of the subsums $E^{(1)}$ and $E^{(2)}$, a second stage deviation value calculating unit that calculates, for each of the subsums $E^{(1)}$ and $E^{(2)}$, deviation values $\alpha^{(1)}$ and $\alpha^{(2)}$ of the specific images relative to the mean of general images based on the positions in the distribution of values of subsums of the specific images with respect to the distribution of values of subsums in the population images, a linear sum calculating unit that calculates, for the subsums $E^{(1)}$ and $E^{(2)}$, one linear sum E obtained by taking a sum using the deviation values $\alpha^{(1)}$ and $\alpha^{(2)}$ as linear combination coefficients, and a sorting unit that sorts whether the input one image is provided with a property close to the model of a specific image based on above one linear sum E.

(2-2)

In the image sorting apparatus described in item (2-1), the subsum calculating unit can calculate a quantity $T^{(1)}$ corresponding to a norm when expressing the calculated plurality of elements $E_n^{(1)}$ together in one vector and further calculate a mean value $<T^{(1)}>$ concerning all population images of models of the general images with respect to the calculated norm $T^{(1)}$ to thereby normalize the subsum $E^{(1)}$ and can calculate a quantity $T^{(2)}$ corresponding to a norm when expressing the calculated plurality of elements $E_n^{(2)}$ together in one vector and further calculate a mean value $<T^{(2)}>$ concerning all population images of models of the general images with respect to the calculated norm $T^{(2)}$ to thereby normalize the subsum $E^{(2)}$.

(2-3)

In the image sorting apparatus described in item (2-2), the subsum calculating unit can calculate, for each model (i) of the specific images, a quantity $|\alpha_{i,n}^{(1)}|$ corresponding to the norm when expressing deviation values $\alpha_{i,n}^{(1)}$ (i corresponds to the deviation value $\alpha_n^{(1)}$ of the i-th model) corresponding to elements calculated with respect to the models (i) together in one vector and further calculate a mean value $<|\alpha_{i,n}^{(1)}|>_i$ among all types of specific models with respect to the calculated norm $|\alpha_{i,n}^{(1)}|$ to thereby normalize the subsum $E_i^{(1)}$ (i corresponds to the subsum $E^{(1)}$ of the i-th model) and can calculate, for each model (i) of the specific images, a quantity $|\alpha_{i,n}^{(2)}|$ corresponding to the norm when expressing deviation values $\alpha_{i,n}^{(2)}$ (i corresponds to the deviation value $\alpha_n^{(2)}$ of the i-th model) corresponding to elements calculated with respect to the models (i) together in one vector and further calculate a mean value $<|\alpha_{i,n}^{(2)}|>_i$ among all types of specific models with respect to the calculated norm $|\alpha_{i,n}^{(2)}|$ to thereby normalize the subsum $E_i^{(2)}$ (i corresponds to the subsum $E^{(2)}$ of the i-th model).

(2-4)

In the image sorting apparatus described in item (2-1), the linear sum calculating unit can calculate a quantity $T_i$ corresponding to a norm when expressing subsums $E_i^{(1)}$ and $E_i^{(2)}$ (i corresponds to subsums $E^{(1)}$ and $E^{(2)}$ of the i-th model) concerning the models (i) of the calculated specific images together in one vector, further calculate a mean value $<T_i>$ concerning all of the population images of models of the general images for the calculated norm $T_i$, and further calculate a mean value $<<T_i>>_i$ among all types of specific models for the calculated mean value $<T_i>$ to thereby normalize the linear sum $E_i$ (i corresponds to the linear sum E of the i-th model).

(2-5)

In the image sorting apparatus described in item (2-4), the linear sum calculating unit can calculate, for each model (i) of the specific images, the quantity $|\alpha_i|$ corresponding to the norm when expressing deviation values $\alpha_i^{(1)}$ and $\alpha_i^{(2)}$ (i corresponds to the deviation values $\alpha^{(1)}$ and $\alpha^{(2)}$ of the i-th model) corresponding to subsums calculated together in one vector for each model (i) and further calculate a mean value $<|\alpha_i|>_i$ among all types of specific models with respect to the calculated norm $|\alpha_i|$ to thereby normalize the linear sum $E_i$.

(2-6)

According to the present invention, there is provided an image sorting apparatus comprising:

an image inputting unit that inputs an image $S^{(1)}(x,y)$ of at least one color plane of one image and an image $S^{(2)}(x,y)$ of an edge plane expressing the edge components of that color plane;

an element calculating unit that calculates at least two types of elements among three types of a plurality of elements $p_n^{(1)}$ (n=1, 2, 3, ... ) expressing features of distribution with respect to the distribution of pixel values $S^{(1)}$ of the image of the color plane, one element $M_s^{(1)}$ expressed by a linear sum of the linear form of $p_n^{(1)}$, and a plurality of elements $E_n^{(1)}$ (n=1, 2, 3, ... ) expressed by a linear sum of the quadratic form of $p_n^{(1)}$ and calculates at least two types of elements among three types of a plurality of elements $p_n^{(2)}$ (n=1, 2, 3, ...) expressing features of distribution with respect to the distribution of pixel values $S^{(2)}$ of the image of the edge plane, one element $M_s^{(2)}$ expressed by a linear sum of the linear form of $p_n^{(2)}$, and a plurality of elements $E_n^{(2)}$ (n=1, 2, 3, ...) expressed by a linear sum of the quadratic form of $p_n^{(2)}$;

a first stage general recording unit that performs processings of the image inputting unit and element calculating unit for all of population images used as models of general images and records values of the plurality of elements $E_n^{(1)}$, $p_n^{(1)}$, and $M_s^{(1)}$ and $E_n^{(2)}$, $p_n^{(2)}$, and $M_s^{(2)}$;

a first stage specific recording unit that performs processings of the image inputting unit and element calculating unit for one or more images used as models of specific images and records values of the plurality of elements $E_n^{(1)}$, $p_n^{(1)}$, and $M_s^{(1)}$ and $E_n^{(2)}$, $p_n^{(2)}$, and $M_s^{(2)}$, a first stage deviation value calculating unit that calculates, for each of the elements $E_n^{(1)}$, $p_n^{(1)}$, and $M_s^{(1)}$ and $E_n^{(2)}$, $p_n^{(2)}$, and $M_s^{(2)}$, each of the deviation values $\beta_n^{(1)}$, $\gamma_n^{(1)}$, and $\delta_s^{(1)}$ and $\beta_n^{(2)}$, $\gamma_n^{(2)}$, and $\delta_s^{(2)}$ of the specific images with respect to the mean of general images based on the positions in the distribution of values of elements of the specific images with respect to the distribution of values of elements in the population images;

a first stage subsum calculating unit that calculates each of a subsum $E^{(1)}$ obtained by taking a sum for each of the elements $E_n^{(1)}$ by using the deviation value $\beta_n^{(1)}$ as a linear combination coefficient, a subsum $p^{(1)}$ obtained by taking a sum for each of the elements $p_n^{(1)}$ by using the deviation value $\gamma_n^{(1)}$ as a linear combination coefficient, and a subsum $M^{(1)}$ obtained by taking a sum for each of the elements $M_s^{(1)}$ by using the deviation value $\delta^{(1)}$ as a linear combination coefficient and calculates each of a subsum $E^{(2)}$ obtained by taking a sum for each of the elements $E_n^{(2)}$ by using the deviation value $\beta_n^{(2)}$ as a linear combination coefficient, a subsum $p^{(2)}$ obtained by taking a sum for each of the elements $p_n^{(2)}$ by using the deviation value $\gamma_n^{(2)}$ as a linear combination coefficient, and a subsum $M^{(2)}$ obtained by taking a sum for each of the elements $M_s^{(2)}$ by using the deviation value $\delta_s^{(2)}$ as a linear combination coefficient;

a second stage general recording unit that performs processing of the first stage subsum calculating unit for all of the population images used as models of the general images and records values of the subsums $E^{(1)}$, $p^{(1)}$, and $M^{(1)}$ and $E^{(2)}$, $p^{(2)}$, and $M^{(2)}$;

a second stage specific recording unit that performs processing of the first stage subsum calculating unit for one or more images used as models of the specific images and records values of the subsums $E^{(1)}$, $p^{(1)}$, and $M^{(1)}$ and $E^{(2)}$, $p^{(2)}$, and $M^{(2)}$;

a second stage deviation value calculating unit that calculates, for each of the subsums $E^{(1)}$, $p^{(1)}$, and $M^{(1)}$ and $E^{(2)}$, $p^{(2)}$, and $M^{(2)}$, each of deviation values $\beta^{(1)}$, $\gamma^{(1)}$, and $\delta^{(1)}$ and $\beta^{(2)}$, $\gamma^{(2)}$, and $\delta^{(2)}$ of the specific images with respect to a mean of general images based on the position in the distribution of values of subsums of the specific images relative to the distribution of values of subsums in the population images;

a second stage subsum calculating unit that calculates each of a subsum $E'^{(1)}$ obtained by taking a sum for each of the subsums $E^{(1)}$, $p^{(1)}$, and $M^{(1)}$ by using the deviation values $\beta^{(1)}$, $\gamma^{(1)}$, and $\delta^{(1)}$ as linear combination coefficients and a subsum $E'^{(2)}$ obtained by taking a sum for each of the subsums $E^{(2)}$, $p^{(2)}$, and $M^{(2)}$ by using the deviation values $\beta^{(2)}$, $\gamma^{(2)}$, and $\delta^{(2)}$ as linear combination coefficients;

a third stage general recording unit that performs the processing of the second stage subsum calculating unit for all of the population images used as models of the general images and records values of the subsums $E'^{(1)}$ and $E'^{(2)}$;

a third stage specific recording unit that performs the processing of the second stage subsum calculating unit for one or more images used as models of the specific images and records values of the subsums $E'^{(1)}$ and $E'^{(2)}$;

a third stage deviation value calculating unit that calculates, for each of the subsums $E'^{(1)}$ and $E'^{(2)}$, each of the deviation values $\alpha^{(1)}$ and $\alpha^{(2)}$ of the specific images with respect to the average of general images based on the position in the distribution of values of subsums of the specific images relative to the distribution of values of subsums in the population images;

a third stage linear sum calculating unit that calculates one linear sum E obtained by taking a sum for each of the subsums $E'^{(1)}$ and $E'^{(2)}$ by using the deviation values $\alpha^{(1)}$ and $\alpha^{(2)}$ as linear combination coefficients; and a sorting unit that sorts whether the input one image is provided with a property close to a model of a specific image based on the one linear sum E.

(2-7)

In the image sorting apparatus described in item (2-6), the second stage subsum calculating unit can calculate a quantity $T'^{(1)}$ corresponding to a norm when expressing the calculated subsums $E^{(1)}$, $p^{(1)}$, $M^{(1)}$ together in one vector and further calculate a mean value $<T'^{(1)}>$ concerning all of the population images of models of the general images for the calculated norm $T'^{(1)}$ to thereby normalize the subsum $E'^{(1)}$ and can calculate a quantity $T'^{(2)}$ corresponding to a norm when expressing the calculated subsums $E^{(2)}$, $p^{(2)}$, and $M^{(2)}$ together in one vector and further calculate a mean value $<T'^{(2)}>$ concerning all of the population images of models of the general images for the calculated norm $T'^{(2)}$ to thereby normalize the subsum $E'^{(2)}$.

(2-8)

In the image sorting apparatus described in item (2-7), the second stage subsum calculating unit can calculate, for each model (i) of the specific images, the quantity $|\beta'_i{}^{(1)}|$ (corresponding to a norm when expressing deviation values $\beta_i^{(1)}$, $\gamma_i^{(1)}$, and $\delta_i^{(1)}$ (i corresponds to deviation values $\beta^{(1)}$, $\gamma^{(1)}$, and $\delta^{(1)}$ of the i-th model) corresponding to subsums $E^{(1)}$, $p^{(1)}$, and $M^{(1)}$ calculated for the models (i) together in one vector and further can calculate a mean value $<|\beta'_i{}^{(1)}|>_i$ among all of the types of specific models with respect to the calculated norm $|\beta'_i{}^{(1)}|$ to thereby normalize the subsum $E'_i{}^{(1)}$ (i corresponds to the subsum $E'^{(1)}$ of the i-th model) and can calculate, for each model (i) of the specific images, the quantity $|\beta'_i{}^{(2)}|$ corresponding to a norm when expressing deviation values $\beta_i^{(2)}$, $\gamma_i^{(2)}$, and $\delta_i^{(2)}$ (i corresponds to deviation values $\beta^{(2)}$, $\gamma^{(2)}$, and $\delta^{(2)}$ of the i-th model) corresponding to subsums $E^{(2)}$, $p^{(2)}$, and $M^{(2)}$ calculated for the models (i) together in one vector and further can calculate a mean value $<|\beta'_i{}^{(2)}|>_i$ among all of the types of specific models with respect to the calculated norm $|\beta'_i{}^{(2)}|$ to thereby normalize the subsum $E'_i{}^{(2)}$ (i corresponds to the subsum $E'^{(2)}$ of the i-th model).

(2-9)

In the image sorting apparatus described in item (2-1), the element calculating unit can find mean values $<A>$ and $<B>$ of distributions and standard deviation values $\sigma_A$ and $\sigma_B$ with respect to a distribution function $f^{(\alpha)}(A)$ of a pixel value A of an image of an $\alpha$ plane and a distribution function $f^{(\beta)}(B)$ of a pixel value B of an image of a $\beta$ plane in $\alpha$ and $\beta$ expressing the color planes of any of hue, value, and chroma, find quantities of the linear form with respect to the pixel values A and B, calculate quantities of the quadratic form;

$$<A><B>, <A>\sigma_B, \sigma_A<B>, \sigma_A\sigma_B,$$

$$<A><A>, <A>\sigma_A, \sigma_A\sigma_A,$$

$$<B><B>, <B>\sigma_B, \sigma_B\sigma_B$$

from quantities of the linear form of those, and use each of those as the plurality of elements $E_n^{(1)}$ (n=1, 2, 3, ...)

(2-10)

In the image sorting apparatus described in item (2-1), the element calculating unit can find mean values $<A>$ and $<B>$ of distributions and standard deviation values $\sigma_A$ and $\sigma_B$ with respect to a distribution function $f^{(\alpha)}(A)$ of a pixel value A of an edge image of an $\alpha$ plane and a distribution function $f^{(\beta)}(B)$ of a pixel value B of an edge image of a $\beta$ plane in $\alpha$ and $\beta$ expressing the color planes of any of hue, value, and chroma, find quantities of the linear form with respect to the pixel values A and B, calculate quantities of the quadratic form;

$$<A><B>, <A>\sigma_B, \sigma_A<B>, \sigma_A\sigma_B,$$

$$<A><A>, <A>\sigma_A, \sigma_A\sigma_A,$$

$$<B><B>, <B>\sigma_B, \sigma_B\sigma_B$$

from quantities of the linear form of those, and use those as the plurality of elements $E_n^{(2)}$ (n=1, 2, 3, ...)

(2-11)

In the image sorting apparatus described in item (2-1), the element calculating unit can prepare distribution functions $f^{(\alpha)}(x)$ and $f^{(\beta)}(x)$ of pixel values x of images of the $\alpha$ plane and $\beta$ plane in $\alpha$ and $\beta$ (including a case of $\beta=\alpha$) expressing the color planes of any of hue, value, and chroma, perform series expansion on each of distribution functions by using m number of base functions $\psi_m(x)$ (m: quantum number) which form a complete set in the distribution area and are orthogonal to each other:

$$f^{(\alpha)} = c_1^{(\alpha)}\psi_1 + c_2^{(\alpha)}\psi_2 + \ldots + c_m^{(\alpha)}\psi_m,$$

$$f^{(\beta)} = c_1^{(\beta)}\psi_1 + c_2^{(\beta)}\psi_2 + \ldots + c_m^{(\beta)}\psi_m$$

multiply the i-th and k-th expansion coefficients of the expansion coefficients $c_i^{(\alpha)}$ and $c_i^{(\beta)}$ (i=1, 2, ..., m) with each other to thereby produce two types of elements of the quadratic form expressed by a symmetric product and an antisymmetric product:

$$c_i^{(\alpha)}c_k^{(\beta)} + c_k^{(\alpha)}c_i^{(\beta)},$$

$$c_i^{(\alpha)}c_k^{(\beta)} - c_k^{(\alpha)}c_i^{(\beta)}$$

and use each of the quantities $I_{n=i-k}^{(\alpha)(\beta)+}$ and $I_{n=i-k}^{(\alpha)(\beta)-}$ obtained by taking a sum of all elements having a constant quantum number difference n=i-k as the plurality of elements $E_n^{(1)}$ (n=1, 2, 3, ...) for each of these two types of elements of the quadratic form.

(2-12)

In the image sorting apparatus described in item (2-1), the element calculating unit can prepare distribution functions $f^{(\alpha)}(x)$ and $f^{(\beta)}(x)$ of pixel values x of edge images of the $\alpha$ plane and $\beta$ plane in $\alpha$ and $\beta$ (including a case of $\beta=\alpha$) expressing the color planes of any of hue, value, and chroma, perform series expansion on each of the distribution functions by using m number of base functions $\psi_m(x)$ (m: quantum number) which form a complete set in the distribution area and are orthogonal to each other:

$$f^{(\alpha)} = c_1^{(\alpha)}\psi_1 + c_2^{(\alpha)}\psi_2 + \ldots + c_m^{(\alpha)}\psi_m,$$

$$f^{(\beta)} = c_1^{(\beta)}\psi_1 + c_2^{(\beta)}\psi_2 + \ldots + c_m^{(\beta)}\psi_m$$

multiply the i-th and k-th expansion coefficients of the expansion coefficients $c_i^{(\alpha)}$, $c_i^{(\beta)}$ (i=1, 2, ..., m) with each other to thereby produce two types of elements of the quadratic form expressed by a symmetric product and an antisymmetric product:

$$c_i^{(\alpha)}c_k^{(\beta)} + c_k^{(\alpha)}c_i^{(\beta)},$$

$$c_i^{(\alpha)}c_k^{(\beta)} - c_k^{(\alpha)}c_i^{(\beta)}$$

and use each of the quantities $I_{n=i-k}^{(\alpha)(\beta)+}$ and $I_{n=i-k}^{(\alpha)(\beta)-}$ obtained by taking a sum of all elements having a constant quantum number difference n=i-k as the plurality of elements $E_n^{(2)}$ (n=1, 2, 3, ...) for each of these two types of elements of the quadratic form.

(2-13)

In the image sorting apparatus described in item (2-6), the element calculating unit can find mean values $<A>$ and $<B>$ of distributions and standard deviation values $\sigma_A$ and $\sigma_B$ with respect to a distribution function $f^{(\alpha)}(A)$ of the pixel values A of an image of the $\alpha$ plane and a distribution function $f^{(\beta)}(B)$ of the pixel values B of an image of the $\beta$ plane in $\alpha$ and $\beta$ expressing the color planes of any of hue, value, and chroma and use those as a plurality of elements $p_n^{(1)}$ (n=1, 2, 3, ...)

(2-14)

In the image sorting apparatus described in item (2-6), the element calculating unit can find mean values $<A>$ and $<B>$ of distributions and standard deviation values $\sigma_A$ and $\sigma_B$ with respect to the distribution function $f^{(\alpha)}(A)$ of the pixel values A of an edge image of the $\alpha$ plane and the distribution function $f^{(\beta)}(B)$ of the pixel values B of an edge image of the $\beta$ plane in $\alpha$ and $\beta$ expressing the color planes of any of hue, value, and chroma and use those as a plurality of elements $p_n^{(2)}$ (n=1, 2, 3, ...)

(2-15)

In the image sorting apparatus described in item (2-6), the element calculating unit can prepare distribution functions $f^{(\alpha)}(x)$ and $f^{(\beta)}(x)$ of pixel values x of images of the $\alpha$ plane and $\beta$ plane in $\alpha$ and $\beta$ (including the case of $\beta=\alpha$) expressing the color planes of any of hue, value, and chroma, perform series expansion on each of the distribution functions by using m number of base functions $\psi_m(x)$ (m: quantum number) which form a complete set in the distribution area and are orthogonal to each other:

$$f^{(\alpha)} = c_1^{(\alpha)}\psi_1 + c_2^{(\alpha)}\psi_2 + \ldots + c_m^{(\alpha)}\psi_m,$$

$$f^{(\beta)} = c_1^{(\beta)}\psi_1 + c_2^{(\beta)}\psi_2 + \ldots + c_m^{(\beta)}\psi_m$$

and use the expansion coefficients $c_i^{(\alpha)}$, $c_i^{(\beta)}$ (i=1, 2, ..., m) as the plurality of elements $p_n^{(1)}$ (n=1, 2, 3, ...)

(2-16)

In the image sorting apparatus described in item (2-6), the element calculating unit can prepare distribution functions $f^{(\alpha)}(x)$ and $f^{(\beta)}(x)$ of pixel values x of edge images of the $\alpha$ plane and $\beta$ plane in $\alpha$ and $\beta$ (including the case of $\beta=\alpha$) expressing the color planes of any of hue, value, and chroma, perform series expansion on each of the distribution functions by using m number of base functions $\psi_m(x)$ (m: quantum number) which form a complete set in the distribution area and are orthogonal to each other:

$$f^{(\alpha)} = c_1^{(\alpha)}\psi_1 + c_2^{(\alpha)}\psi_2 + \ldots + c_m^{(\alpha)}\psi_m,$$

$$f^{(\beta)} = c_1^{(\beta)}\psi_1 + c_2^{(\beta)}\psi_2 + \ldots + c_m^{(\beta)}\psi_m$$

and use the expansion coefficients $c_i^{(\alpha)}$ and $c_i^{(\beta)}$ (i=1, 2, ..., m) as the plurality of elements $p_n^{(2)}$ (n=1, 2, 3, ...)

(3)

(3-1)

According to the present invention, there is provided an image sorting apparatus comprising:

an image inputting unit that inputs an image concerning at least one color plane $\alpha$, a first quantity calculating unit that finds a mean value <A> of distribution and a standard deviation value $\sigma_A$ with respect to the distribution function $f^{(\alpha)}(A)$ of the pixel values A of the above one image and calculates quantities of the linear form with respect to the pixel values A;

a second quantity calculating unit that calculates quantities of the quadratic form:

$$<A><A>, <A>\sigma_A, \sigma_A\sigma_A$$

from the calculated quantities of the linear form;

a third quantity calculating unit that calculates one linear sum of the quantities expressed by the linear combination of the calculated quantities of the quadratic form; and a sorting unit that sorts the image into images of at least two categories based on the calculated linear sum of the quantities.

(3-2)

According to the present invention, there is provided an image sorting apparatus comprising:

an image inputting unit that inputs an image concerning at least two color planes $\alpha$ and $\beta$, a first quantity calculating unit that finds mean values <A> and <B> of distributions and standard deviation values $\sigma_A$ and $\sigma_B$ with respect to the distribution function $f^{(\alpha)}(A)$ of the pixel values A of the image of the $\alpha$ plane and distribution function $f^{(\beta)}(B)$ of the pixel values B of the image of the $\beta$ plane and calculates the quantities of the linear form for the pixel values A and B, a second quantity calculating unit that calculates quantities of the quadratic form:

$$<A><B>, <A>\sigma_B, \sigma_A<B>, \sigma_A\sigma_B,$$

$$<A><A>, <A>\sigma_A, \sigma_A\sigma_A,$$

$$<B><B>, <B>\sigma_B, \sigma_B\sigma_B$$

from the calculated quantities of the linear form;

a third quantity calculating unit that calculates one linear sum of the quantities expressed by the linear combination of the calculated quantities of the quadratic form; and a sorting unit that sorts the image into images of at least two categories based on the calculated linear sum of the quantities.

(3-3)

In the image sorting apparatus described in item (3-1) or item (3-2), the apparatus can calculate an entropy S obtained by integrating values comprised of the distribution functions from $f(x)$ to $-f(x)\log(f(x))$ for an interval x in which the distribution functions have a positive value and calculate a quantity T corresponding to the norm when expressing the calculated quantities of the quadratic form together in one vector to thereby produce a product TS thereof, and the third quantity calculating unit can further add the linear combination of the produced product TS with respect to the calculated one linear sum to calculate one linear sum.

(3-4)

In the image sorting apparatus described in item (3-1) or item (3-2), the third quantity calculating unit can further add the linear combination of a quantity of the linear form with respect to the linear sum of the quantities of the quadratic form to thereby calculate one linear sum of quantities.

(3-5)

In the image sorting apparatus described in item (3-4), the apparatus can calculate an entropy S obtained by integrating values comprised of the distribution functions from $f(x)$ to $-f(x)\log(f(x))$ for an interval x in which the distribution functions have a positive value, calculate the quantity $T_E$ corresponding to the norm when expressing the calculated quantities of the quadratic form together in one vector and thereby to produce a product $T_E S$ thereof, and further calculate quantities $T_p$ and $T_M$ corresponding to the norms when expressing the calculated quantities of the linear form together in two vectors in units of mean value and standard deviation value to produce products $T_p S$ and $T_M S$ thereof, and the third quantity calculating unit can further add the linear combination of the product $T_E S$ and products $T_p S$ and $T_M S$ to the above calculated one linear sum to thereby calculate one linear sum.

(3-6)

In the image sorting apparatus described in item (3-1) or item (3-2), the image concerning one color plane can be any of an image of a hue plane, an image of a value plane, and an image of a chroma plane.

(3-7)

In the image sorting apparatus described in item (3-1) or item (3-2), the image concerning one color plane can be any of an edge image of a hue plane, an edge image of a value plane, and an edge image of a chroma plane.

(3-8)

In the image sorting apparatus described in item (3-7), the edge image can be obtained by filtering an image to successively produce high frequency subband images comprised of a plurality of resolutions and successively combining the high frequency subband images from the one with the lowest resolution to obtain a single combined high frequency band image.

(4)

(4-1)

According to the present invention, there is provided an image sorting apparatus comprising:

an image inputting unit that inputs an image concerning at least one color plane $\alpha$;

a distribution function preparing unit that prepares a distribution function $f^{(\alpha)}(x)$ of the pixel values x of the one image;

a describing unit that performs series expansion:

$$f^{(\alpha)} = c_1^{(\alpha)}\psi_1 + c_2^{(\alpha)}\psi_2 + \ldots + c_m^{(\alpha)}\psi_n$$

by using base functions $\psi_n(x)$ (n: quantum number) which form a complete set in the distribution area and are orthogonal to each other and describing the distribution function according to expansion coefficients $c_i^{(\alpha)}$ (i=1, 2, ..., n);

an element producing unit that multiplies the i-th and k-th expansion coefficients of the distribution function $f^{(\alpha)}(x)$ with each other to thereby produce elements of the quadratic form:

$$c_i^{(\alpha)}c_k^{(\alpha)} + c_k^{(\alpha)}c_i^{(\alpha)} = 2c_i^{(\alpha)}c_k^{(\alpha)}$$

expressed by a symmetric product;

a quantity producing unit that produces quantities $I_{m=i-k}^{(\alpha)(\alpha)+}$ obtained by taking the sum of all elements having a constant quantum number difference m=i−k from among the produced elements of the quadratic form with respect to a plurality of quantum number differences;

an evaluating unit that evaluates features of the shape of the distribution function based on at least one of the produced quantities; and a sorting unit that sorts the image into images of at least two categories based on results of the evaluation.

(4-2)

In the image sorting apparatus described in item (4-1), the element producing unit can further multiply the i-th and k-th expansion coefficients of two distribution functions of a distribution function $f^{(\alpha)}(x)$ of the $\alpha$ plane and a distribution function $f^{(\alpha)}(-x)=f^{(-\alpha)}(x)$ obtained by axially inverting the pixel values x of the $\alpha$ plane with each other to thereby produce two types of elements of the quadratic form which are expressed by the symmetric product and antisymmetric product:

$$c_i^{(\alpha)}c_k^{(-\alpha)}+c_k^{(\alpha)}c_i^{(-\alpha)}$$

$$c_i^{(\alpha)}c_k^{(-\alpha)}-c_k^{(\alpha)}c_i^{(-\alpha)}$$

and the quantity producing unit can further produce quantities $I_{m=i-k}^{(\alpha)(-\alpha)+}$ and $I_{m=i-k}^{(\alpha)(-\alpha)-}$ obtained by taking a sum of all elements having a constant quantum number difference m=i–k for each of the produced two types of elements of the quadratic form with respect to a plurality of quantum number differences.

(4-3)

According to the present invention, there is provided an image sorting apparatus comprising:

an image inputting unit that inputs an image concerning at least two color planes $\alpha$ and $\beta$;

a distribution function preparing unit that prepares distribution functions $f^{(\alpha)}(x)$ and $f^{(\beta)}(x)$ of the pixel values x of the two images;

a describing unit that performs series expansions:

$$f^{(\alpha)}=c_1^{(\alpha)}\psi_1+c_2^{(\alpha)}\psi_2+\ldots+c_n^{(\alpha)}\psi_n,$$

$$f^{(\beta)}=c_1^{(\beta)}\psi_1+c_2^{(\beta)}\psi_2+\ldots+c_n^{(\beta)}\psi_n$$

by using n number of base functions $\psi_n(x)$ (n: quantum number) which form a complete set in the distribution area and are orthogonal to each other and describing the two distribution functions by the expansion coefficients $c_i^{(\alpha)}$ and $c_i^{(\beta)}$ (i=1, 2, ..., n);

an element producing unit that multiplies the i'-th and k-th expansion coefficients of the two distribution functions with each other to thereby produce two types of elements of the quadratic form expressed by a symmetric product and antisymmetric product:

$$c_i^{(\alpha)}c_k^{(\beta)}+c_k^{(\alpha)}c_i^{(\beta)},$$

$$c_i^{(\alpha)}c_k^{(\beta)}-c_k^{(\alpha)}c_i^{(\beta)};$$

a quantity producing unit that produces quantities $I_{m=i-k}^{(\alpha)(\beta)+}$ and $I_{m=i-k}^{(\alpha)(\beta)-}$ obtained by taking a sum of all elements having a constant quantum number difference m=i–k for each of the produced two types of elements of the quadratic form;

an evaluating unit that evaluates features of the shape between the two distribution functions based on at least one of the produced quantities; and a sorting unit that sorts the images into images of at least two categories based on results of the evaluation.

(4-4)

In the image sorting apparatus described in item (4-3), the element producing unit can further multiply the i-th and k-th expansion coefficients of two distribution functions of the distribution function $f^{(\alpha)}(x)$ of the $\alpha$ plane and a distribution function $f^{(\beta)}(-x)=f^{(-\beta)}(x)$ obtained by axially inverting the pixel values x of the $\beta$ plane by each other to thereby produce two types of elements of the quadratic form which are expressed by the symmetric product and antisymmetric product:

$$c_i^{(\alpha)}c_k^{(-\beta)}+c_k^{(\alpha)}c_i^{(-\beta)}$$

$$c_i^{(\alpha)}c_k^{(-\beta)}-c_k^{(\alpha)}c_i^{(-\beta)}$$

and the quantity producing unit can further produce quantities $I_{m=i-k}^{(\alpha)(-\beta)+}$ and $I_{m=i-k}^{(\alpha)(-\beta)-}$ obtained by taking a sum of all elements having a constant quantum number difference m=i–k for each of the produced elements of the quadratic form with respect to a plurality of quantum number differences.

(4-5)

In the image sorting apparatus described in item (4-3), the element producing unit can further multiply i-th and k-th expansion coefficients of the distribution functions with each other to thereby produce elements of the quadratic form expressed by symmetric products:

$$c_i^{(\alpha)}c_k^{(\alpha)}+c_k^{(\alpha)}c_i^{(\alpha)}=2c_i^{(\alpha)}c_k^{(\alpha)},$$

$$c_i^{(\beta)}c_k^{(\beta)}+c_k^{(\beta)}c_i^{(\beta)}=2c_i^{(\beta)}c_k^{(\beta)};$$

the quantity producing unit can further produce quantities $I_{m=i-k}^{(\alpha)(\alpha)+}$ and $I_{m=i-k}^{(\beta)(\beta)+}$ obtained by taking a sum of all elements having a constant quantum number difference m=i–k for each of the produced elements of the quadratic form with respect to a plurality of quantum number differences; and the evaluating unit can evaluate features of the shape of the distribution functions as a whole based on the produced quantities.

(4-6)

In the image sorting apparatus described in item (4-5), the element producing unit can further multiply the i-th and k-th expansion coefficients with each other in two distribution functions of the distribution function $f^{(\alpha)}(x)$ of the $\alpha$ plane and distribution function $f^{(\alpha)}(-x)=f^{(-\alpha)}(x)$ obtained by axially inverting the pixel values x of the $\alpha$ plane and two distribution functions of the distribution function $f^{(\beta)}(x)$ of the $\beta$ plane and the distribution function $f^{(\beta)}(-x)=f^{(-\beta)}(x)$ obtained by axially inverting the pixel values x of the $\beta$ plane to thereby produce two types of elements of the quadratic form expressed by symmetric products and antisymmetric products:

$$c_i^{(\alpha)}c_k^{(-\alpha)}+c_k^{(\alpha)}c_i^{(-\alpha)}$$

$$c_i^{(\alpha)}c_k^{(-\alpha)}-c_k^{(\alpha)}c_i^{(-\alpha)}$$

$$c_i^{(\beta)}c_k^{(-\beta)}+c_k^{(\beta)}c_i^{(-\beta)}$$

$$c_i^{(\beta)}c_k^{(-\beta)}-c_k^{(\beta)}c_i^{(-\beta)}$$

and the quantity producing unit can further produce quantities $I_{m=i-k}^{(\alpha)(-\alpha)+}$, $I_{m=i-k}^{(\alpha)(-\alpha)-}$, $I_{m=i-k}^{(\beta)(-\beta)+}$, and $I_{m=i-k}^{(\beta)(-\beta)-}$ obtained by taking a sum of all elements having a constant quantum number difference m=i–k for each of the produced elements of the quadratic form.

(4-7)

In the image sorting apparatus described in item (4-1) or item (4-3), the evaluating unit can evaluate features of the shape of the distribution functions based on the linear sum of the quantities expressed by the linear combination of all of the produced quantities.

(4-8)

In the image sorting apparatus described in item (4-7), the apparatus can be further provided with a scalar quantity producing unit that calculates an entropy S obtained by integrating values comprised of the distribution functions from f(x) to −f(x)log(f(x)) for the interval x in which the distribution functions have a positive value and calculates a quantity T corresponding to the norm when expressing the produced quantities together in one vector to thereby produce a product TS thereof, and the evaluating unit can further add the linear combination of the produced product TS to one linear sum obtained by linear combination of the quantities to thereby calculate one linear sum and can evaluate features of the shape of the distribution functions based on the calculated one linear sum of the quantities.

(4-9)

In the image sorting apparatus described in item (4-7), the evaluating unit can add the linear combination of all of the expansion coefficients to the quantity expressed by the linear combination of all of the quantities to calculate one linear sum of quantities and can evaluate features of the shape of the distribution functions based on the calculated one linear sum of the quantities.

(4-10)

In the image sorting apparatus described in item (4-9), when the base functions are comprised of an even function group and an odd function group, the apparatus can be further provided with another quantity calculating unit that gives even quantum numbers (0, 2, . . . ) and odd quantum numbers (1, 3, . . . ) to function groups belonging to subgroups having the same properties concerning the even functions and odd functions in the base function group and calculates another quantity obtained by taking a sum of products of the expansion coefficients and the quantum number given to each for all expansion coefficients with respect to each distribution function, and the evaluating unit can add a linear combination of each of the further calculated other quantities with respect to the calculated one linear sum of the quantities to thereby calculate one linear sum of quantities and can evaluate features of the shape of the distribution functions based on the calculated one linear sum of the quantities.

(4-11)

In the image sorting apparatus described in item (4-10), the apparatus can be further provided with a scalar quantity producing unit for calculating the entropy S obtained by integrating values comprised of the distribution functions from f(x) to −f(x)log(f(x)) for the interval x in which the distribution functions have a positive value, calculating the quantity $T_E$ corresponding to the norm when expressing the produced quantities together in one vector and thereby produce a product $T_E S$ thereof, further calculating the quantity $T_p$ corresponding to the norm when expressing the expansion coefficients together in one vector and producing a product $T_p S$ thereof, and further calculating the quantity $T_M$ corresponding to the norm when expressing the calculated other quantities together in one vector and producing a product $T_M S$ thereof, and the evaluating unit can add a linear combination of the produced product $T_E S$, product $T_p S$, and product $T_M S$ with respect to the calculated one linear sum to thereby calculate one linear sum and can evaluate features of the shape of the distribution functions based on the calculated one linear sum of the quantities.

(4-12)

In the image sorting apparatus described in item (4-1) or item (4-3)

when the image inputting unit inputs an image of a color plane, the describing unit can use Chebyshev polynomials as the base functions.

(4-13)

In the image sorting apparatus described in item (4-12), the image of a color plane can be any of an image of a hue plane, an image of a value plane, and an image of a chroma plane.

(4-14)

In the image sorting apparatus described in item (4-1) or item (4-3), when the inputting unit inputs an edge image concerning the edge component of a color plane, the describing unit can use spherical Bessel functions as the base functions.

(4-15)

In the image sorting apparatus described in item (4-14), the edge image can be obtained by filtering an image to successively produce high frequency subband images comprised of a plurality of resolutions and successively combining the high frequency subband images from the one with the lowest resolution to obtain a single combined high frequency band image.

(4-16)

In the image sorting apparatus described in item (4-14), the edge plane of the color plane can be any of an edge image of a hue plane, an edge image of a value plane, and an edge image of a chroma plane.

(4-17)

According to the present invention, there is provided an image sorting apparatus comprising:

a unit for inputting an image expressed by at least one color plane, a unit for preparing at least two kinds of distribution functions to which properties of different images are projected from among images of the color planes, a unit for performing series expansion on each of the above at least two kinds of distribution functions by using base functions which form complete sets of different types for those and are orthogonal to each other and for describing each of the distribution functions by those expansion coefficients;

a unit for producing a plurality of features of the distribution functions based on the expansion coefficients of the distribution functions;

a unit for preparing a new physical parameter by taking a linear combination of all of the plurality of features of the produced distribution functions irrespective of the type of the distribution function; and a unit for sorting the image into images of at least two categories based on the physical parameter.

(4-18)

In the image sorting apparatus described in item (4-17), the features of the distribution functions can be quantities expressed by a quadratic form by using the expansion coefficients of the distribution functions.

(4-19)

In the image sorting apparatus described in item (4-17), the above at least two kinds of distribution functions can include a function expressing the distribution of signal values of an image and a function expressing the distribution of differential values of an image.

(4-20)

According to the present invention, there is provided an image sorting apparatus comprising:

a unit for inputting an image expressed by at least one color plane;

a unit for preparing a distribution function of pixel values of the image of the one color plane;

a unit for performing series expansion on the distribution function of the image by using base functions $\psi_n(x)$ (n: quantum number) forming a complete set in the distribution area and orthogonal to each other and describing the distribution function by the expansion coefficients;

a unit for multiplying two expansion coefficients of the distribution function of the image or a single expansion coefficient with itself to produce one or more quantities of the quadratic form $F_i (i \geq 1)$ comprised of a sum of subelements of those by a predetermined rule to thereby produce elements of the quadratic form of the expansion coefficients;

a unit for preparing an edge image concerning the edge components of the image of the one color plane;

a unit for preparing a distribution function of the pixel values of the edge image;

a unit for performing series expansion on the distribution function of the edge image by using base functions $\phi_m(x)$ (m: quantum number) forming a complete set in the distribution area and orthogonal to each other and describing the distribution function by the expansion coefficients;

a unit for multiplying two expansion coefficients of the distribution function of the edge image or a single expansion coefficient with itself to produce one or more quantities of the quadratic form $G_i (i \geq 1)$ comprised of a sum of subelements of those by a predetermined rule to thereby produce elements of the quadratic form of the expansion coefficients;

a unit for linear combination of the produced quantities of the quadratic form $F_i$ and $G_i$ to produce a new physical parameter of the quadratic form; and a sorting unit for sorting the image into images of at least two categories based on the new physical parameter of a quadratic form.

(4-21)

According to the present invention, there is provided an image sorting apparatus comprising:

a unit for inputting an image expressed by at least two color planes;

a unit for preparing distribution functions of pixel values of images of the two color planes $\alpha$ and $\beta$;

a unit for performing series expansion on each of the distribution functions of the images of the two color planes by using base functions $\psi_n(x)$ (n: quantum number) forming a complete set in the distribution area and orthogonal to each other and describing each of the distribution functions of the images of the two color planes by expansion coefficients $c_i^{(\alpha)}$ and $c_i^{(\beta)}$ (i=1, 2, ..., n);

a unit for multiplying two expansion coefficients from among the expansion coefficients $c_i^{(\alpha)}$ and $c_i^{(\beta)}$ (i=1, 2, ..., n) of the distribution functions of the images of the two color planes or an expansion coefficient with itself to produce elements of the quadratic form of expansion coefficients and producing one or more quantities of the quadratic form $F_i(i \geq 1)$ comprised of a sum of those subelements, or a sum and difference, by a predetermined rule;

a unit for preparing an edge image concerning edge components of the images of the two color planes $\alpha$ and $\beta$;

a unit for preparing distribution functions of pixel values of the edge images of the two color planes;

a unit for performing series expansion on each of distribution functions of the edge images of two color planes by using base functions $\phi_m(x)$ (m: quantum number) forming a complete set in the distribution area and orthogonal to each other and describing each of the distribution functions of the edge images of the two color planes by the expansion coefficients $d_i^{(\alpha)}$ and $d_i^{(\beta)}$ (i=1, 2, ..., m);

a unit for multiplying two expansion coefficients from among the expansion coefficients $d_i^{(\alpha)}, d_i^{(\beta)}$ (i=1, 2, ..., m) of distribution functions of the images of the two color planes or an expansion coefficient with itself to produce elements of the quadratic form of expansion coefficients and producing one or more quantities of the quadratic form $G_i(i \geq 1)$ comprised of the sum of those subelements, or the sum and difference;

a unit for linear combination of the produced quantities of the quadratic form $F_i$ and $G_i$ to produce a new physical parameter of the quadratic form; and a sorting unit for sorting the image into images of at least two categories based on the new physical parameter of the quadratic form.

(4-22)

In the image sorting apparatus described in item (4-20) or (4-21), the apparatus can use Chebyshev polynomials as the base functions for describing the distribution function of an image and can use spherical Bessel functions as the base functions for describing the distribution function of an edge image.

(4-23)

In the image sorting apparatus described in item (4-20) or (4-21), the edge image can be obtained by filtering an image to successively produce high frequency subband images comprised of a plurality of resolutions and successively combining the high frequency subband images from the one with the lowest resolution to obtain a single combined high frequency band image.

(4-24)

In the image sorting apparatus described in item (4-20), at least one color plane of the image can be any of a hue, value, and chroma.

(4-25)

In the image sorting apparatus described in item (4-21), at least two color planes of the image can be any of a hue, value, and chroma.

Advantageous Effects of Invention (1)

According to the present invention, in order to extract perceptual features from distribution functions, the distribution functions are expressed in a Hilbelt space by a group of orthogonal base functions with solutions satisfying a linear differential equation explaining many linear physical phenomena of nature for facilitating creation of more linear relationships with perception. By this, it has become possible to project an image to a space in which expansion coefficients thereof easily behave with a scale linear to human perception due to the role of a weight function for forming an orthogonal system in accordance with the features of distribution which can be taken by each distribution function. Further, it also has become possible to perform shape evaluation concerning the overall skewness and spread of distribution functions for evaluation using information concerning symmetry and/or asymmetry of the expansion coefficients thereof and base function group and a quantum number concerning the spread thereof together using a quantity easily behaving with a scale linear to human psychology.

(2)

According to the present invention, by establishing a method of description which is very clear in physical meaning and realizes linearity with a psychological quantity, a system providing results of extremely high performance image retrieval with respect to any adjectives and a learning method which is extremely simple and easy can be constructed. Further, there is no restriction on the number of the model images in the learning method, therefore provision of seamless retrieval from similar image retrieval of one image to perceptual retrieval of a plurality of images becomes possible.

(3)

According to the present invention, by describing perceptual features extracted from distribution functions not in the form of a mean value of distribution functions or standard deviation value, but in the form of energy of the quadratic form of the same, even when a statistical mean is taken among many common perceptual image groups, it has become able to keep these without loss. Due to that, it has become possible to describe a vague structure of perception in a space having a structure where information concerning hue, value, and chroma of colors is deeply linked with perception. Further, by throwing light on their distribution structures, in principle, it has become possible to digitalize an absolute impression of what perceptual adjective is strongly induced from a certain image or if a user has a negative impression.

(4)

According to the present invention, by describing the perceptual features extracted from distribution functions in a quadratic form of expansion coefficients orthogonally expressed in a Hilbelt function space, linear relationships are created between image features and psychological perception quantities, and description which matches with special features of the perception structure and are extremely easy to handle becomes possible. Further, by throwing light on their distribution structures, in principle, it has become possible to digitalize an absolute impression of what perceptual adjective is strongly induced from a certain image or if a user has a negative impression.

BRIEF DESCRIPTION OF DRAWINGS

{FIG. 17} A matrix diagram expressing a situation of constructing four extended traces.

DESCRIPTION OF EMBODIMENTS

Figure 1:
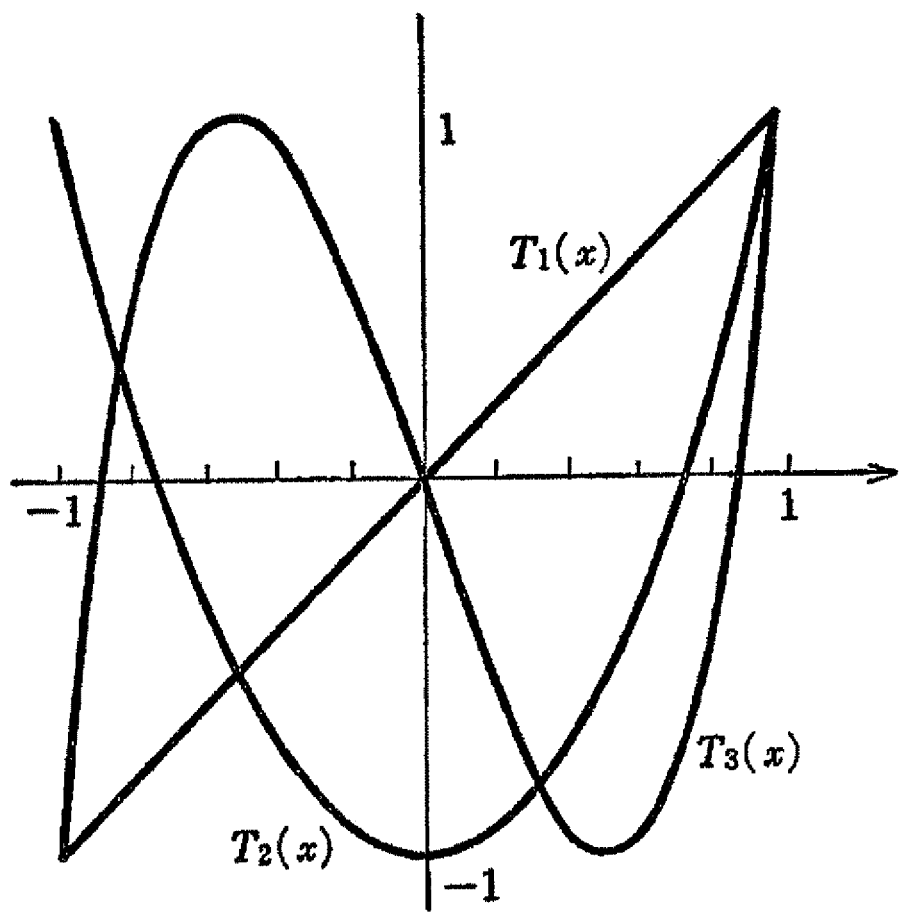
{FIG. 1} A graph of $T_1(x)$, $T_2(x)$, and $T_3(x)$ in a Chebyshev polynomial $T_n(x)$.

Before a concrete explanation of the embodiments of the present invention, the principle leading up to it will be explained.

[1] Discoveries of the Applicant Up to Now by Experiments

The attempts made by the applicant up to now so as to deal with the above problems will be summarized here. Much of this is disclosed in Japanese Patent Application No. 2008-23469 (First Filed Application 1) and Japanese Patent Application No. 2008-235578 (First Filed Application 2).

First, in order to prepare the experimental environment, adjectives expressing perceptions received from images were given to about 200 images. Those images were transformed to a Munsell HVC color space, then correspondences of color histograms and texture PDF with the attached adjectives were investigated by comparison for all experimental images. Here, "texture PDF" designates the histogram of an edge image. "PDF" is abbreviation of "probability density function". That term was used since a high frequency band is extracted from an image and the histogram thereof is called a PDF as common practice.

Note that, a texture PDF does not relate to the conventionally existing single high frequency subband, but is a histogram of a combined edge image obtained by combining high frequency subbands extracted by a uniquely introduced multiplex resolution in order to imitate a recognition mechanism visually instantaneously judging an image. That histogram reflects the correlation of the spatial arrangement of contrast, so a variety of shapes which are different from a generalized Gaussian function taken by a PDF shape of the usual single high frequency band end up appearing.

<Regarding Importance of Vague Descriptions in Perceptual Sorting>

The point which became clear when naming the adjectives describing perceptions of the images used for the experiments is that the phenomenon where even with images which are different in mean or representative hue, value, and chroma, the same perception will be caused, while even when the mean or representative hue, value, and chroma are the same, if other elements are strong, completely different perceptions will be caused is a very common phenomenon. Further, when seen from another side, this is also connected with the fact that adjectives have a hierarchical structure and only the ones close to the highest concept mainly remain as the adjectives given to the image. The concept of a hierarchical nature of adjectives matches with the facts known in the fields of neuropsychology etc. and shows that the description of features of adjectives are not any simpler compared with the cases handled in similar image retrieval.

The applicant investigated the relationship between adjectives and color histograms and texture PDFs explained above and as a result became convinced that there was a good possibility that the features relating to similar shapes which can be vaguely read from these distribution functions are directly linked with perceptions. Accordingly, in perceptual image retrieval, measurement of the similarity of absolute shapes of the histograms like in similar image retrieval is not important. The important point is how the similarity of features concerning the shapes of certain parts which stand out relative to other parts should be grasped as a vague feature so as to match with human senses.

The above First-Filed Application 1 pointed out the importance of simultaneous description of trends in overall shape difference patterns in combinations of the V plane and C plane particularly in color histograms. The First-Filed Application 2 points out the importance of evaluation of asymmetry and the difference of shapes of the lower slopes in texture PDFs. Among these, the measure provisionally employed for vague shape extraction was the evaluation of statistical quantities concerning the kurtosis and skewness of histograms of the V plane and C plane in the case of color histograms. Due to that it was judged whether one of the V and C planes had a two-band structure and the other had a one-band structure. Whether the state of the axis of the shape gradually transiting between those can be evaluated is one important element. In the case of a texture PDF, the asymmetry of the histogram shape was evaluated by using two parameters of the skewness and the uniquely defined sharpness (eboshi degree). In this, the conclusion was also reached that in evaluation of the same feature of asymmetry, use of two parameters, that is, a parameter sensitive to the lower slopes and a parameter insensitive to them, for evaluating one feature from two sides is important in order to obtain linkage with an adjective having a property of duality. The "duality" of an adjective means that the meaning of a single adjective is simultaneously provided with both of a major main sorting element and a fine sorting element for discriminating meaning from other adjectives included in that.

[2] Problems and Direction of Countermeasures
<Diversification and Quantification of Shape Recognition of Distribution Function>

1) Problems

The statistical quantities of kurtosis, skewness, etc. explained above involve the following problems in practice:

a) With single statistical quantities, the direct linkage with adjectives is weak.

b) There is no linear quantitative relationship with a psychological quantity concerning perception.

c) There is a limit to coping with diversification in histogram shape recognition.

Specifically explaining this, the statistical quantities of kurtosis and skewness enable discussion of shapes relating to asymmetry and kurtosis as parameters expressing deviation from the Gaussian distribution, but basically are not provided with a capability more than that. Accordingly, unless using kurtosis, skewness, standard deviation, mean value, etc. together, it is difficult to determine the features of the shape of a histogram and link it with adjectives. Further, even when combining these, for example, in the value of the kurtosis, there is no ability to distinguish between two band structures and a uniform distribution structure. In addition, the range of adjectives which can be explained is extremely limited.

Further, even if these statistical quantities are normalized by standard deviation from their definitions, not only values close to ±1 near zero, but also extreme values such as +20 in for example kurtosis will be derived depending on the image. The applicant tried to experimentally verify color histograms. As a result, with a single parameter alone, direct linkage with a higher order adjective is difficult. Not only this, the result is also far off from the psychological scale.

2) Plan of Countermeasures

In order to solve the above problems, the applicant introduces a completely new idea. That is, the applicant obtains a grasp of perception from the standpoint of physics and discusses the mechanics to try to describe perception cleanly in mathematical terms. Below, to make the term "histogram" more generalized so as to cover any quantity which can be observed from an image, the applicant will call this by the term "distribution function" in statistical physics. As clearly shown in the next section, the meaning indicated by "distribution function" does not stop at the range of a histogram.

In order to diversify and quantify shape recognition of a distribution function, the applicant introduces quantum mechanics techniques. Here, the applicant will describe the reasoning behind this.

Photons and electrons in image formation and an exposure process of a photo obey quantum theory.

The human visual system is also the same. Further, the neuronical circuits in the brain are also a quantum phenomenon.

As evidence of the matter explained second, the fact is that perception changes. Even if viewing an outside object in the same field of vision or an image forming a photograph, the impression will often differ depending on the day. When considering this fact together, if it were possible to quantumly describe perception, linear correspondence might arise between perception and the features of an image.

[3] Mode of Description of Perception Targeted
<Hierarchical Property of Adjective Structure>

In general, it is known that the mechanism of recognition of adjectives in the brain has a pyramidal hierarchical property. In the face of this fact, when trying to perform a content-based adjective search from an image signal, the question becomes what features concerning an image should be captured and what sort of structure they should have. It is only natural to presume that the features relating to an image also have a pyramidal hierarchical property.

Here, the applicant will describe the perceptual features which it envisions and their hierarchical structure. First, as the perceptual features of the lowest level of the lowest dimension, elements of the property of a scalar quantity concerning color such as a "representative hue, representative value, and representative chroma" of a photo image can be considered. That is, when representing a photo by the hue, value, and chroma having the largest area ratio, there are extremely low order features creating impressions such as overall "reddish" or "green" images or overall "dark" images due to insufficient exposure.

Next in position, elements of the property of a vector quantity concerning color, described by the "distribution structure of colors of HVC", may be considered. That is, when an HVC histogram is in a certain inherent feature state, it is presumed that a somewhat higher order perception is induced. Adjectives corresponding to this level may be for example "refreshing" or "restful". The impressions provided by these images strongly act on perception much earlier than the lower order impressions described before. Note, the lower order impressions do not vanish, their properties continuously persist as well. Next in position is considered to be features concerning "edge, texture, and contrast". At the present point of time, it is presumed that elements of the property of vectors of structural factors condensed one-dimensionally relating to texture correspond to these. It is considered that impressions such as "bold" images or "harsh" images are given due to a large number of edges and textures and strength of contrast.

Positioned above that is presumed to be the "composition", that is, the "spatial distribution". This is because the previously explained "color" and "texture" can be discussed by extracting one-dimensional information from HVC color planes, but spatial distribution must be discussed by extracting two-dimensional information from the planes. Further, it is considered that discrimination of adjectives such as "leisurely" and "heavy" from among these becomes possible. Positioned further above that may be considered structures such as universal aesthetic senses. However, it is presumed that individual perception also plays a large part in this. It is presumed that discrimination of adjectives such as "beautiful" from among these becomes possible.

<Mode of Description of Features Inherent in Perception: Additivity>

As a special feature of the hierarchical structure explained above, it can be said that the perception at a lower order level does not disappear, but continuously persists, but when there is a further higher order perception, this remains as the impression concept for that image with greater priority. Further, if thinking of intentionally excluding the higher order concepts and rating features at the lower order level, this actually can be said to be possible. Features having such a property are shown by studies to be able to magnificently describe images if the features have an additive property between them. This is because an additive property permits addition of higher order factors at all times and provides a mechanism enabling previous lower order factors to be superseded through substitution.

Further, experiments for the case of features having non-additive properties explained later provide evidence of the clear superiority of the additive property. That is, between features of different properties, the features have to be handled independently in Euclidean terms. With features having synergistic properties, unlike an additive property, what kind of situation will occur has to be studied. Accordingly, as the mode of description enabling the hierarchical property of adjectives to be reflected in combination of principal axes, the conclusion is that the perceptual features must have an additive property.

When performing linear combination between additive perceptual features, if adding features attaching importance to the highest order feature factors, the mechanism of human emotion, where the words of the highest concepts among the adjectives are derived most dominantly while the balance of lower order factors is reflected to a certain extent, is reproduced. For this reason, even when the principal axes of perception are different, perceptual features provided with exactly the same quality of additivity must be created. In other words, the perceptual features must be described by the quantities of the same dimension provided with additivity. This is the condition which must be equally satisfied within a principal axis of perception and between principal axes.

<Linear Model of Perception>

The higher order perceptual feature which can be read from a distribution function f is defined as follows. That is, it is assumed that there are a plurality of features of the shapes of distribution functions commonly appearing among image groups having the same perception even when the distribution functions change in the distribution functions of different types and levels. The number i takes values of 1, 2, . . . .

Color histogram distribution . . . $F_i$

Texture PDF distribution . . . $G_i$

Spatial distribution of pixel values . . . $H_i$

It is postulated that linear models of perception stand as follows.

$$\text{Adjective} = \alpha_1 F_1 + \alpha_2 F_2 + \ldots$$

$$+ \beta_1 G_1 + \beta_2 G_2 + \ldots$$

$$+ \gamma_1 H_1 + \gamma_2 H_2 + \ldots$$

A method of constructing features having such an additive property will be specifically explained for $F_i$ and $G_i$ in the following description and in the embodiments. In the perceptual invariants defined in the embodiments explained later, the fact that the additive property functions well is proved also from the fact that more stable experimental results are obtained by producing the same kind of invariants in hue, value, and chroma and taking the additive mean among those.

<Comparison with Other Non-Additive Methods>

1) Expression by Euclidean Distance of Feature Vectors

In the conventional similar image retrieval technique, the color, texture, and shape are individually handled, and comparison of the distance of similarity is carried out in each feature space. For example, the method of Document 2 will be taken as an example. As features of the different axes, completely different kinds of features are defined among the axes. There is no clear description of the method of combination of principal axes. However, in a case of performing similar image retrieval by using features of color, texture, and shape together, ordinarily, all features of the three principal axes are combined to one vector, the Euclidean distance in the feature space is measured, and images which are close in all of color, texture, and shape as much as possible are searched through.

When such a Euclidean distance is used, the sorting indicator will have the following property. Assume that a certain feature does not have similarity for example for color. At that time, even if there is similarity in texture and shape, if the feature not having similarity acts and ends up being placed once a certain distance away in the Euclidean distance, it can no longer be approached more. That is, there is no dominance relationship between features. All features are handled with the same rank. Accordingly, a higher order feature cannot overturn the results of a lower order feature. Accordingly, this property is not applicable to the hierarchical property of adjectives.

2) Expression by Synergistic Features

Assume that each feature is expressed with a synergistic property. In such a case, the sorting indicator ends up having the following property. Assume that a certain feature is very similar and values of the model of the feature and the retrieval target image match. The difference of the degree of similarity of the feature becomes zero, the result of the geometric mean is zero even when there is no similarity in the other features at all, and finally these become extremely similar. That is, when even one feature having a synergistic property coincides, all of the other judgments no longer act. In the sense of one feature standing out, this has a property of replacement by a higher order factor. However, the fact that the other lower order features no longer act does not match with the property of adjectives. That is, the feature is not a type which is judged by only a lower order average color, for example, a judgment of "green image", but that property remains no matter how low the order.

[4] Quantum Mechanics Description of Distribution Function

<Hilbelt Space Expression>

Base functions satisfying linear differential equations are used for series expansion on a distribution function. Note, assume that these base functions are orthogonal to each other and are provided with completeness in the sense that the original distribution function can be completely reproduced.

Series expansion of distribution function $$f(x) = \sum_{i=0}^{\infty} c_i \psi_i(x) \quad \{\text{Math. 1}\}$$

Orthogonality of Base Functions $$\int \psi_i(x) \psi_k(x) w(x) dx = \delta_{ik} \quad \{\text{Math. 2}\}$$

Here, the idea at the bottom of this will be explained. In order for a perceptual feature readable from a distribution function to satisfy the additive property, first, the components of the distribution function must satisfy a linear differential equation. This linear differential equation is positioned as a motion equation satisfied by the components. This stands on the hypothesis that a motion equation is closer to a physical phenomenon occurring in the brain the closer to differential equations satisfied by many physical phenomena in the fields of mechanics, magneto-electronics, and quantum mechanics.

The weight function defining the orthogonality must be determined by selecting the optimum base functions in accordance with the special features of the distribution function so that it becomes as close to the human recognition process as possible. Functions having orthogonality by integration are generally called "special functions". Many of those are defined by linear differential equations of hypergeometric equations or confluent hypergeometric equations. Further, in order to enable series expansion, it must have completeness in the sense of enabling equivalent expression of the original function. Such a special function forming orthogonality does not necessarily have completeness, therefore there is a limited choice of special functions provided with both the selection condition of the weight function and completeness. The first standard of the selection is the judgment of whether the base function group resembles the shape of the distribution function which is the target at present and a match of the interval area.

A solution y of a second-order homogeneous differential equation:

$$P(y) = y'' + p(x)y' + q(x)y = 0$$

has linearity with respect to any constant C:

$$P(Cy) = CP(y), P(C_1 y_1 + C_2 y_2) = C_1 P(y_1) + C_2 P(y_2)$$

Accordingly, in a motion equation expressed by this type of linear differential equation, the principle of superposition stands. Therefore, the general solution is expressed by the series expansion.

Both of a hypergeometric equation and confluent hypergeometric equation are expressed by the above type of second-order differential equations. A hypergeometric equation has a regular singularity at $x=0, 1, \infty$, and a confluent hypergeometric equation has a regular singularity at $x=0$ and has an irregular singularity at $x=\infty$. Various such equations are described (see Document B2).

Hypergeometric Equation $$x(1-x)y''(x) + [c-(a+b+1)x]y'(x) - aby(x) = 0$$

Confluent Hypergeometric Equation $$xy''(x) + [c-x]y'(x) - ay(x) = 0$$

By the function system having orthogonality and completeness, the mode of description for series expansion of a solution of a motion equation satisfied by state functions is positioned the same as expression by Hilbelt space. In quantum mechanics, by Hilbelt space expression, the description of the motion equation shifts to a matrix form. Therefore, for construction of a Hilbelt space, expansion by special functions having complete orthogonality is needed (see Document B1).

In mechanically describing perception, it is considered that base functions constructing the distribution function satisfy at least the differential equations selected below as motion equations, that is, express one aspect of perception by equations. That is, it is considered that they satisfy hypergeometric equations on the projection surface of the distribution function of the color and confluent hypergeometric equations on the projection surface of the distribution function of the texture. These linear differential equations are general terms for differential equations and are positioned as different types. With respect to these, by introducing the method of establishment of parameters and variable transforms, differential equations of types encompassing many equations can be derived. For example, the solution of a hypergeometric equation, that is, a hypergeometric function, can handle Chebyshev functions, Legendre functions, and so on as special cases of parameters. Further, the solution of a confluent hypergeometric equation, that is, a confluent hypergeometric function, can give a Bessel function or modified Bessel function, Hermite function, Laguerre function, and so on as special cases. Further, by a variable transform of a Bessel differential equation, a spherical Bessel function and modified spherical Bessel function are derived (see Document B2).

In actuality, suitably a Chebyshev function is used for a one-dimensional distribution function of color, and a spherical Bessel function is used for a one-dimensional distribution function of texture. Accordingly, if there is a differential equation of perception in the brain, the linear differential equation is satisfied. From the aspect of the hypergeometric function describing a Chebyshev polynomial function at one of these, that is, the projection surface of color, and from the aspect of the confluent hypergeometric function describing a Spherical Bessel function at the projection surface of the edge and texture of another, this may be said to correspond to description on two different projection surfaces. Further, the base functions of the differential equation which must be satisfied by a distribution function play a role of quasi definition of coordinates of a wave type signal processing system such as the brain by the Hilbelt space.

[Document B1] Schiff "Quantum Mechanics" (Third Edition, 1970), Chapter 6 "Matrix Formulation of Quantum Mechanics"

[Document B2] George Arfken, Mathematical Methods for Physicists, Vol. 3 "Special Functions and Integration Equations" (Second Edition, 1970; Japanese translation, 1978), Chapter 1 "Bessel Functions" and Chapter 3 "Special Functions"

<Hilbelt Space Expression of Distribution Functions>

1) Case of Color Histogram

Base Function $$\psi_n(x) = T_n(x) \quad \{\text{Math. 3}\}$$

Weight Function of Orthogonality $$w(x) = \frac{1}{\sqrt{1-x^2}} \quad \{\text{Math. 4}\}$$

Here, Chebyshev polynomials can be described analytically. They take values of n=0, 1, 2, . . . .

$T_n(x) = \cos(n \cos^{-1} x)$ $T_0(x) = 1$ $T_1(x) = x$ $T_2(x) = 2x^2 - 1$ $T_3(x) = 4x^3 - 3x$ $T_4(x) = 8x^4 - 8x^2 + 1$

. . .

$T_{n+1}(x) = 2 \times T_n(x) - T_{n-1}(x), n \geq 1$ {Math. 5}

Here, FIG. 1 is a graph of $T_1(x)$, $T_2(x)$, $T_3(x)$ in a Chebyshev polynomial $T_n(x)$.

The precise relationship of orthogonality including normalization conditions is given below:

$$\int_{-1}^{1} \frac{T_m(x)T_n(x)}{\sqrt{1-x^2}} dx = \begin{cases} 0, & m \neq n \\ \frac{\pi}{2}, & m = n \neq 0 \\ \pi, & m = n = 0 \end{cases} \quad \{\text{Math. 6}\}$$

The orthogonality of a Chebyshev polynomial function stresses a rising portion and a falling portion of a distribution function with extremely high density. That is, when handling a function system having the property of an event abruptly occurring and that event abruptly ending in a finite interval as in a histogram, the rising portion and falling portion have a very important property as the shape of that function, so unless that is correctly described, approximation is not possible in the true sense.

2) Case of Texture PDF

When a spherical Bessel function is extracted for one order, a function group scaled from the low frequency to high frequency according to the number of roots present in an interval of [0,a] exhibits orthogonality and forms a complete system concerning the roots. It is the 0-th order function that has a peak at the origin, therefore a single series expansion according to the root of the 0-th order function is carried out. At that time, the distribution function of the texture PDF must be spread separately to a right interval and a left interval of the peak.

2-1) Case of Single Series Expansion
Base Function $$\psi_n(x) = j_0\left(\alpha_{0n}\frac{x}{a}\right) \quad \{\text{Math. 7}\}$$

Figure 2:
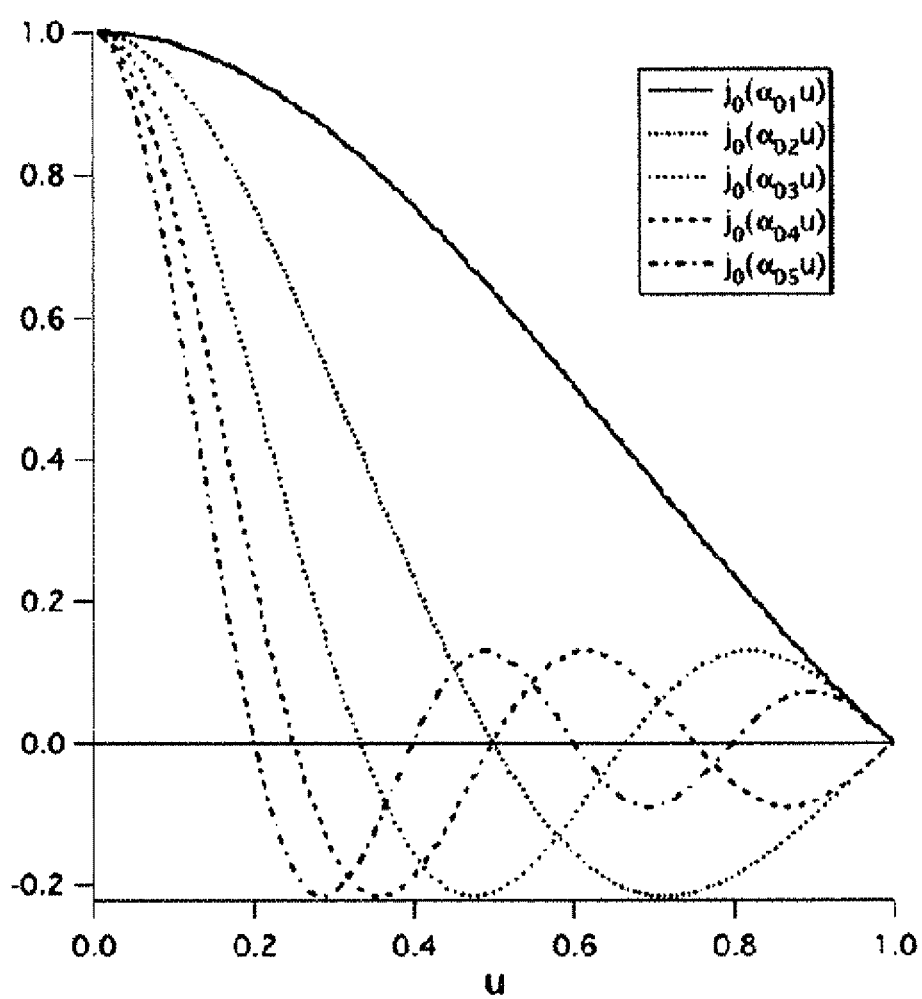
{FIG. 2} A graph of base functions n=1 to 5 concerning a root of a spherical Bessel function.

Here, FIG. 2 shows a graph of n=1 to 5.
Weight Function of Orthogonality $w(x) = x^2$ {Math. 8}

Here, spherical Bessel functions can be described analytically.

$j_0(x) = \frac{\sin x}{x}$   0-th order function   {Math. 9}

$j_1(x) = \frac{\sin x}{x^2} - \frac{\cos x}{x}$   1st order function $j_2(x) = \left(\frac{3}{x^3} - \frac{1}{x}\right)\sin x - \frac{3}{x^2}\cos x$   2nd order function $j_n(x) = (-1)^n x^n \left(\frac{d}{x dx}\right)^n \left(\frac{\sin x}{x}\right)$   n-th order function $\alpha_{nk}$ indicates the value of the root of the n-th function, and takes a value of k=1, 2, . . . .

$j_n(\alpha_{nk}) = 0$ {Math. 10}

Figure 3:
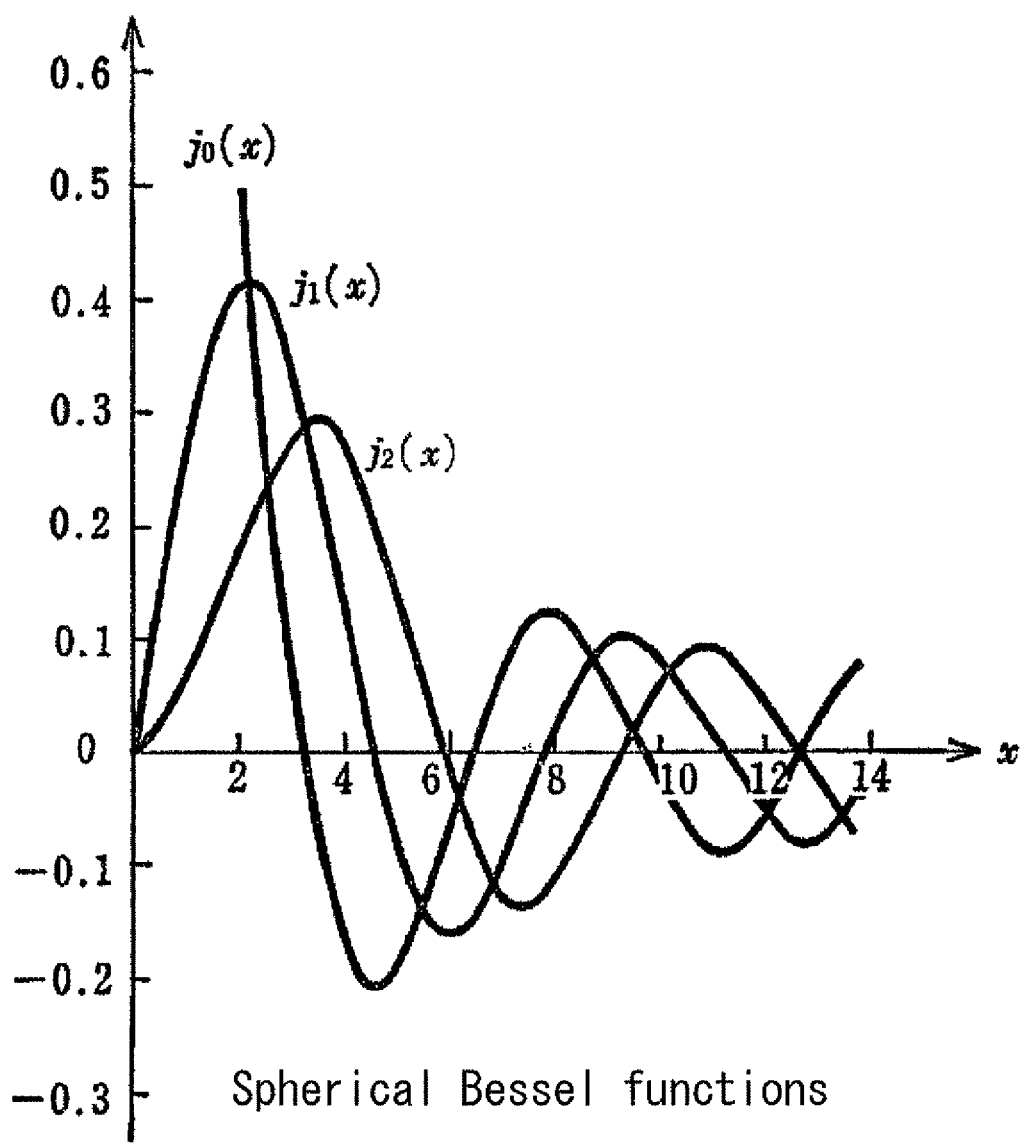
{FIG. 3} A graph of spherical Bessel functions $j_0(x)$, $j_1(x)$, and $j_2(x)$.

Here, FIG. 3 shows a graph of $j_0(x)$, $j_1(x)$, and $j_2(x)$ of a spherical Bessel function. The precise relationship of the orthogonality concerning the roots including the normalization conditions is given below.

$$\int_0^a j_n\left(\alpha_{np}\frac{\rho}{a}\right) j_n\left(\alpha_{nq}\frac{\rho}{a}\right) \rho^2 d\rho = \frac{a^3}{2}[j_{n+1}(\alpha_{np})]^2 \delta_{pq} \quad \{\text{Math. 11}\}$$

When the spherical Bessel function is an 0-th order function, this is a function having the maximum strength at the origin. Therefore, when approximating a distribution function having the maximum degree at the origin, the weight of the origin is always removed, and importance is attached to the shape of the lower slopes.

In this regard, the various Bessel functions are functions suitable for description in a case where light and waves diffuse from the origin toward the periphery or there is a singularity such as a light source at the origin. A spherical Bessel function is suitable for describing the wave motion of the radial component in a spherical coordinate system. In comparison with a Bessel function of a cylindrical coordinate system, the further from the origin, the faster the fall of its strength. The one-dimensional distribution function of the edge image to be handled now is close to the property of a spherical Bessel function in view of the rapid speed of the fall of its strength. This is because, even if considering a focusing process in which a photo is taken through a lens, light coming down from a semi-spherical surface is a spherical wave. The radial component of that is described by a Spherical Bessel function. No particular reason of anisotropy for using cylindrical coordinates is found.

In a spherical Bessel function, when using the 0-th function, there is always a peak at the origin. Therefore, in order to evaluate the shape of a distribution function having the property of a peak always appearing at the origin as in a histogram of an edge image, eliminating the weight of the origin and focusing on the properties of the lower slopes is a very fitting method. That achieves a role of forming the base for creating a linear relationship with the essence of the event.

2-2) Case of Double Series Expansion

A spherical Bessel function is usually a function describing motion in a radial direction, therefore is ordinarily defined in a positive region. However, by expanded definition to a negative region, orthogonality appear even between functions having different orders. This is because a spherical Bessel function has the property that an even number order becomes an even function and an odd number order becomes an odd function.

$$j_n(x)=(-1)^n j_n(-x) \quad \{\text{Math. 12}\}$$

Figure 4:
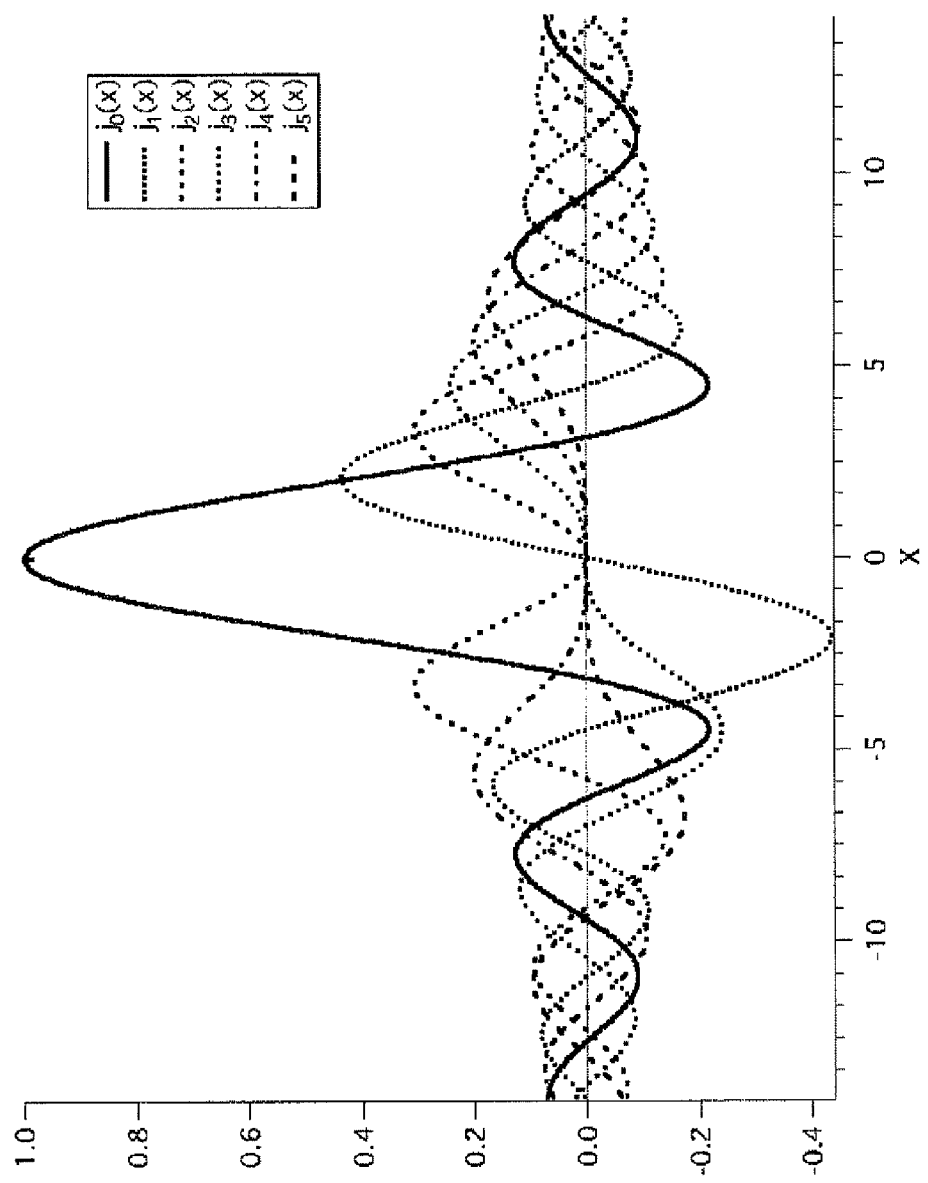
{FIG. 4} A graph of spherical Bessel functions $j_0(x)$ to $j_5(x)$ defined to spread to a negative region.

Here, FIG. 4 shows a graph of spherical Bessel functions $j_0(x)$ to $j_5(x)$ by expanded definition to a negative region.

Orthogonality concerning order of spherical Bessel function $$\int_{-\infty}^{\infty} j_m(x) j_n(x) dx = \frac{\pi}{2n+1} \delta_{mn}, \quad \{\text{Math. 13}\}$$
$$m, n \geq 0.$$

If considering the orthogonality concerning the order and the orthogonality concerning the root together, the positive region and negative region of a distribution function can be simultaneously expanded. Root expansion always has completeness, therefore a double series expansion of the order and root is carried out. For the present, one odd function extracting the component of asymmetry is satisfactory, therefore root expansion using two functions of the 0-th even function and the first order odd function is satisfactory.

$$f(x) = \sum_{n=0}^{1} \sum_{k=0}^{\infty} c_{nk} j_n\left(\alpha_{nk} \frac{x}{a}\right) \quad \{\text{Math. 14}\}$$

[5] Correspondence Between Expansion Coefficients and Mechanics

<Posing of Problem>

An expansion coefficient means that, among distribution functions, there are many components having waveforms and frequencies corresponding to the base functions. Here, there is the problem that "is an expansion coefficient $c_i$ itself suitable for a perceptual feature?"

<Tendency of Expansion Coefficients in Real Data>

The value of a coefficient $c_i$ obtained by actual expansion of a distribution function is easily directly affected by the absolute shape of the individual distribution function. Accordingly, as the value, the fluctuation due to the image is extremely large. When directly comparing expansion coefficients for the distribution functions of images giving the same adjectives with each other, a small correlation tendency is recognized, but the tendency of variation is stronger. Even if conducting learning by taking a statistical mean of the expansion coefficients among images given the same adjectives in order to use the expansion coefficients as models corresponding to the adjectives, in this tendency, most expansion coefficients vanish to zero, or even the other adjectives are converged to a common meaningless certain constant.

<Construction of Correspondence with Mechanics>

Here, the applicant sets the following hypothesis linking mechanics and an image system.

Mechanical System:

"Even when the motion state of each particle (momentum $p_i$) changes, there is a conserved quantity (energy E) characterizing the entire motion system."

Image System:

"Even when the pixel value distribution of each image (state component $c_i$) changes, there should be an invariant (I) characterizing the perception of the entire image."

| Mechanical system | | | Image system | | {Math. 15} |
|---|---|---|---|---|---|
| Coordinate | $q_i$ | ⇔ | $\psi_i(x)$ | Hilbelt space | |
| Momentum | $p_i$ | ⇔ | $c_i$ | State component of pixel value or edge | |
| Energy | $E = \sum_i \frac{p_i^2}{2m}$ | ⇔ | $I = \sum_{i,k} c_i c_k$ | Invariant of perception | |

This hypothesis includes, as the model, the mechanism that, when a human perceives a signal distribution of an image or an image reflected in the visual field of the outside world, he senses a certain kind of "field" energy of perception there, a neuronical state in the brain corresponding to that kind of field energy is instantaneously activated, and an adjective is called up.

The sum of the quadratic forms of the expansion coefficients means a possibility of extraction of features commonly provided among distribution functions of an image group calling up the same perception even when the distribution functions change in various ways. An operation taking this sum eases the demands on strict similarity of individual elements and enables groups of features which are similar as a whole to be combined. Therefore, the function of comparison of features which vaguely resemble each other in shape is derived.

<Regarding Quadratic Form and Additivity>

The reason for concluding that a perceptual invariant must take the quadratic form is deeply related to the theoretical background in the process of deriving a motion equation from action functions based on the principle of minimum action in theoretical physics and the process of construction of a hamiltonian. That is, when assuming that one side of the motion equation of the field of perception satisfies a linear differential equation, the integrand of that action function, that is, the Lagrangian, is required to provide a second order expression for the field of perception. This is because, a motion equation is derived by assuming that a total derivative of the first order of the action integral are equal to zero based on the variational principle, and the principle of superposition is kept by decrementing the order by 1 at that time (see Document A1). The mechanical invariant which is the first integral of the motion equation is called the integral of motion and maintains a constant value during motion. In the case of perception, this is considered to correspond to the same perception being continuously given even when the signal distribution of an image changes.

The integrals of motion include energy, momentum, and angular momentum. It is clarified by mechanics that all of these have the important property of additivity (see Document A2). Further, the signal distribution of an image which perception takes up deals with an image comprised of a number of pixels of the $10^6$ to $10^8$ order and a statistical group comprised of a group of hundreds or thousands of images, so statistical physics must be used.

According to statistical physics, in the integrals of additive motions, the conclusion is derived that after statistical averaging, the statistical nature of the entire system, that is, the statistical distribution of the system, is determined only by the energy. The momentum and the angular momentum are simply returned to only translation and uniform rotation of the system as a whole and are useless for description of the system (see Document A3). This situation matches with the fact that the expansion coefficients $c_i$ corresponding to the momentum derived from the distribution functions for describing perception, when the statistical mean is taken for an image group giving the same perception, tend to converge to a meaningless constant.

When summarizing the correspondence between distribution functions f and mechanical invariants, that is, quantities of the quadratic form having a dimension of energy in the same way as described above, Mechanical system Image system $$f=f(E)<=>I=I(f)$$

Here, a perceptual invariant is derived from the observed quantity, that is, the distribution function, therefore the expression becomes inverse to that of the mechanical system. Further, by an expanded definition of the perceptual invariant of the quadratic form as will be explained in the next section, various perceptions can be handled.

In this way, all perceptual invariants are provided with additivity and end up satisfying the requirement of additivity of the linear model of perception, so color, texture, and composition can all be handled on a common footing. That is, it becomes possible to additively handle all different features of the principal axis of perception. Note that, it is assumed that the perceptual invariants derived from composition are constructed by the same guidelines based on the same parameters.

Note that, in the process of reaching the conclusion of the necessity of making the perceptual invariants the quadratic form as explained above, a process of experimental trial and error was undergone, then it was judged that the above-explained theoretical background was involved. That is, even when experimentally preparing and testing out many possible conceivable indicators such as the absolute values and ratios of expansion coefficients, no array of images completely matching in sense with perception can be obtained. After repeated failure, an array with a high match with perception was first obtained by an expression of a sum of the quadratic form.

[Document A1] Landau and Lifshitz, Course of Theoretical Physics, Volume 2 "The Classical Theory of Fields" (Original Sixth Edition, 1973), Chapter 4 "The electromagnetic Field Equations", Section 27 "The action function of the electromagnetic field"

[Document A2] Landau and Lifshitz, Course of Theoretical Physics, Volume 1 "Mechanics" (Third Revised Edition, 1973), Chapter 1 "The Equations of Motion" and Chapter 2 "Conservation Laws"

[Document A3] Landau and Lifshitz, Course of Theoretical Physics, Volume 5 "Statistical Physics, Part 1" (Third Edition, 1976), Chapter 1 "The Fundamental Principles of Statistical Physics", Section 4 "The significance of energy"

[6] Quadratic Form Expression of Perceptual Invariants
<Combination of Two Base States>

In order to form a perceptual invariant of the quadratic form, returning to the viewpoint of shape recognition of a distribution function, the shape of a distribution function f is extracted according to a combined system of two base states $\psi_i$ and $\psi_k$. In general, it is assumed that any function $f^{(\alpha)}$ is expressed by expansion by n number of base functions.

$$f^{(\alpha)} = c_1^{(\alpha)}\psi_1^{(\alpha)} + c_2^{(\alpha)}\psi_2^{(\alpha)} + \ldots + c_n^{(\alpha)}\psi_n^{(\alpha)}$$

According to group theory, n*n number of base states $\psi_i\psi_k$ expressed by a direct product of a combined system are reducible expressions and can be decomposed into two base states expressed by $n(n+1)/2$ number of symmetric products and $n(n-1)/2$ number of antisymmetric products (see Document A4).

$$\text{Symmetric} \psi_i^{(\alpha)}\psi_k^{(\beta)} + \psi_k^{(\alpha)}\psi_i^{(\beta)}$$

$$\text{Antisymmetric} \psi_i^{(\alpha)}\psi_k^{(\beta)} - \psi_k^{(\alpha)}\psi_i^{(\beta)} (i \neq k, \alpha \neq \beta)(\alpha),(\beta)$$
$$= H, V, C \quad \{\text{Math. 16}\}$$

If performing series expansion on distribution functions of the hue plane (H), value plane (V), and chroma plane (C) by using the same base functions, the features of the shapes of the distribution functions in the same color planes can be measured by the expansion coefficients of waveform formed by the base functions of the symmetric products and can be measured also by the expansion coefficients of waveforms formed by the base functions of the antisymmetric products. These expansion coefficients based on the waveforms of the combined system are guaranteed to have mutual orthogonality of base states before combination, therefore the expansion coefficients based on the base states of the combined system can be expressed as matrix elements in the form of symmetric products and antisymmetric products.

A perceptual invariant is defined by taking a trace of the matrix. Note, usually, the trace indicates only a sum of diagonal elements. However, here, a new extension type trace taking a sum of non-diagonal elements in an oblique direction maintaining only a quantum number difference having constant row and column positions is defined. Due to this, at what kind of ratio the components of combined waveforms due to two base states maintaining a constant quantum number difference are present in distribution functions can be detected in a state taking the total sum over all possible combined waveforms. Between two distribution functions of different color planes, by what kind of ratio the combination of different base states having constant quantum numbers is present is evaluated by the two kinds of combined waveforms in the symmetric state and antisymmetric state of that combination.

$$I_{m-k-i}^{(\alpha)(\beta)+} = \sum_{\substack{i,k \\ m=k-i}} \left( c_i^{(\alpha)} c_k^{(\beta)} + c_k^{(\alpha)} c_i^{(\beta)} \right) \quad \{\text{Math. 17}\}$$

$$I_{m-k-i}^{(\alpha)(\beta)-} = \sum_{\substack{i,k \\ m=k-i}} \left( c_i^{(\alpha)} c_k^{(\beta)} - c_k^{(\alpha)} c_i^{(\beta)} \right)$$

Here, when taking $c_i$ in a Chebyshev expansion coefficient of the color histogram, $I_i$ becomes equal to $F_i$. When taking $c_i$ in a spherical Bessel expansion coefficient of the texture PDF, $I_i$ becomes equal to $G_i$. Note, the numbers i are assigned in order to the plurality of found invariant elements irrespective of symmetry or antisymmetry.

Here, the applicant will try and compare a perceptual invariant of the above definition with an invariant of a field in an electromagnetic field. According to the Document A5, as the invariants with respect to the Lorentz transformation of an electrical field E and a magnetic field H, there are the two types of a true scalar type and a false scalar type.

$$F_{ik}F^{ik} = H^2 - E^2 = inv.$$

$$e^{iklm}F_{ik}F_{lm} = \vec{E} \cdot \vec{H} = inv. \qquad \{\text{Math. 18}\}$$

These two are found by a trace of a quadratic form of a four-dimensional electromagnetic field tensor $F^{ik}$. The latter is accompanied with the completely antisymmetric unit tensor $e^{iklm}$, but the former is not accompanied with that. Note, the notation of the sum concerning the tensor is omitted by the Einstein Summation Convention.

Accordingly, even when shifting from one image to another image, the perceptual invariants giving the same perception become extremely similar to the invariants of the field at the time of conversion from one reference system to another reference system in an electromagnetic field. In the former section, the discussion was made by linking perceptual invariants with mechanical energy. However, rather, it is franker to consider that there are several kinds of "perceptual fields" not limited to two kinds and that the energy of the field is propagated through them. Further, the components of an electromagnetic field are the four dimensions of time and space. However, it is presumed that the components of perception include at least the order of elements necessary for describing a distribution function. However, naturally, it may be thought that, in learning in the process of growth of neuronical circuits in the human brain, an electrical signal circuit activated by the fields is constructed with respect to these perceptual fields or an energy level of a neuronical circuit which is instantaneously activated in terms of energy is acquired.

[Document A4] Landau and Lifshitz, Course of Theoretical Physics, Volume 3 "Quantum Mechanics (Non-Relativistic Theory)," (Third Revised Edition, 1977), Chapter 12 "The Theory of Symmetry," Section 94 "Representations of groups."

[Document A5] Landau and Lifshitz, Course of Theoretical Physics, Volume 2, "The Classical Theory of Fields" (Original Sixth Edition, 1973), Chapter 3 "Charges in Electromagnetic Fields", Section 23 "The electromagnetic field tensor", Section 24 "Lorentz transformation of the field", and Section 25 "Invariants of the field"

[First Embodiment]

(Hilbelt Space Expression of Color Histogram and Linear Sum of Perceptual Invariants)

Figure 5:
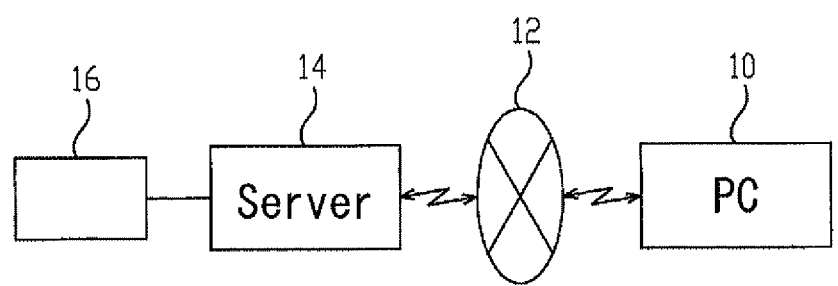
{FIG. 5} A block diagram showing an image sorting apparatus according to an embodiment.

Below, an explanation will be given of an image sorting apparatus according to a first embodiment with reference to the drawings. FIG. 5 is a block diagram showing an image sorting apparatus according to the embodiment. Here, the image sorting apparatus is realized by a personal computer 10. The personal computer 10 is connected to a digital camera or other computer, receives image data from the digital camera or other computer or receives image data from a memory card mounted in a memory card slot, and stores the data in a hard disk device (not shown). The personal computer 10 performs image sorting processing, explained below, on the stored image data.

An image sorting program may be loaded to the personal computer 10 from a CD-ROM or other storage medium storing the program or through a network 12 etc. When it is loaded through the network 12, a program read out from a hard disk device 16 connected to a server 14 is loaded. The personal computer 10 is configured by a CPU and peripheral circuits controlled by the CPU. The CPU performs the image sorting processing shown in the flow chart of FIG. 6 based on the program which the CPU installs.

<Processing of Searched Image>

Figure 6:
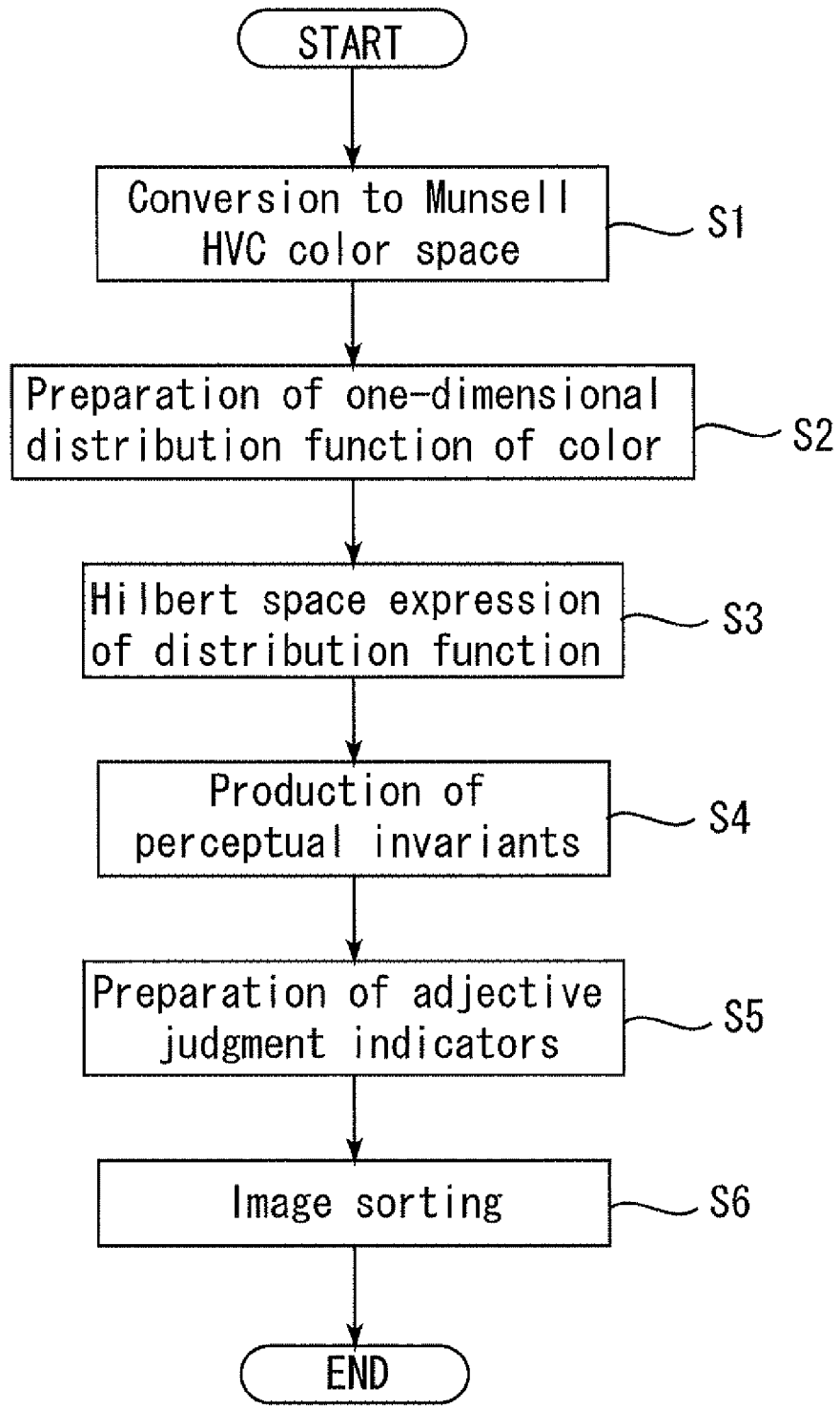
{FIG. 6} A flow chart showing processing in the image sorting apparatus according to the embodiment.

1. Conversion to Munsell HVC Color Space (FIG. 6, Step S1)

An input image is converted to a Munsell color space in which the human perceptual color uniformity is high. The Munsell color space is a color space indexed so that the hue H is divided into 100 degrees in a circle, the value V is distributed at levels from 0 to 10, and the chroma C is distributed at levels from 0 to about 25. It is color space designed so as to satisfy a perceptual uniformity such that a human perceives the color difference 2 of C as the equivalent color difference with respect to the color difference of V. In that, a region having a value of C not more than 1 and a region in which the value of V is 0.5 or less and 9.5 or more are defined as N (neutral hue). It is possible to convert from a color space expressed by an RGB space to an HVC color space by a numerical equation on an approximate basis through transformation to an XYZ space. This is realized by introducing an equation for correcting an insufficient color uniformity by utilizing the definition of the uniform color space L*a*b* or L*C*H*.

When an input image is for example an image expressed by an sRGB color space to which an output gamma characteristic is applied, first, it is returned back to linear tones, then is converted to an XYZ space according to the sRGB standard.

1-1. Conversion to linear tones $RGB$ {Math. 19}

$$R_{sRGB}^{linear} = \gamma^{-1}(R_{sRGB})$$

$$G_{sRGB}^{linear} = \gamma^{-1}(G_{sRGB})$$

$$B_{sRGB}^{linear} = \gamma^{-1}(B_{sRGB})$$

1-2. Conversion to $XYZ$ space $$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R_{sRGB}^{linear} \\ G_{sRGB}^{linear} \\ B_{sRGB}^{linear} \end{pmatrix}$$

1-3. Conversion to $M_1, M_2, M_3$ spaces $$H_1 = 11.6\left\{ \left(\frac{X}{X_0}\right)^{1/3} - \left(\frac{Y}{Y_0}\right)^{1/3} \right\}$$

$$H_2 = 11.6\left\{ \left(\frac{Y}{Y_0}\right)^{1/3} - \left(\frac{Z}{Z_0}\right)^{1/3} \right\}$$

$$H_3 = 11.6\left(\frac{Y}{Y_0}\right)^{1/3} - 1.6$$

$$M_1 = H_1$$

$$M_2 = 0.4 * H_2$$

$$M_3 = 0.23 * H_3$$

1-4. Conversion to $HVC$ space $$\overline{H} = \arctan(M_2 / M_1)$$

$$S_1 = \{8.88 + 0.966 * \cos(\overline{H})\} * M_1$$

$$S_2 = \{8.025 + 2.558 * \sin(\overline{H})\} * M_2$$

$$H = \arctan(S_2 / S_1)$$

$$V = 11.6\left(\frac{Y}{Y_0}\right)^{1/3} - 1.6$$

$$C = \sqrt{S_1^2 + S_2^2}$$

In the first embodiment, for the hue plane, a plane from which N (neutral) is separated is prepared.

2. Preparation of One-Dimensional Distribution Function of Color (FIG. 6, Step S2)

A histogram of each of the HVC planes is prepared. The bin number of the histograms may be set to about 200 for all of H, V, and C. At this time, as the hue plane, use is made of a plane from which N is separated. Accordingly, even when the histogram of the H plane is integrated by a hue circle, an area ratio classified to N is not included. N is usually distributed at random in the hue circle, therefore a disorderly uniform offset state distribution will be excluded from the histogram of the hue plane, and the original chromatic color histogram shape will remain. For convenience, when the value of the histogram is normalized by the pixel number, the histogram becomes a one-dimensional distribution function expressing the probability density of the pixel values. The schematically prepared distribution function is expressed as follows.

$$f(H), f(V), f(C)$$

3. Hilbelt Space Expression of Distribution Function (FIG. 6, Step S3)

3-1. Variable Transform

When the distribution area of the abscissa of the histogram is [a,b] and the distribution area of the ordinate is [fa,fb], variable transform is carried out for intervals in which the abscissa is contained in [−1,1] and in which the ordinate is contained in [−1,1]. For convenience only in this section, when expressed converting the variable of the abscissa from x to y and converting the variable of the ordinate from fx to fy, the transform equations become as follows.

Variable transform of abscissa: $y = \{x-(b+a)/2\}/\{(b-a)/2\}$

Variable transform of ordinate: $fy = \{fx-(fb+fa)/2\}/\{(fb-fa)/2\}$

The distribution area of the histogram of the hue plane is a hue circle, therefore a starting break point is set, and a distribution area making one circle from that and returning back to the same point is set. The starting point "a" is not a fixed point. The point at which the density of the distribution function becomes the minimum is searched for each of the images, and the break point is set there.

According to the method of definition of the variable transform of the ordinate, a certain constant factor is added to the series expansion coefficients shown below. If considering that the expansion coefficients correspond to momentum as explained in the outline, this corresponds to the constant factor remaining by the statistical mean of the image group being left as uniform translation of the entire system according to the method of selection of the Hilbelt space coordinate system of the entire image group system.

3-2. Series Expansion by Chebyshev Polynomials

The distribution area of the abscissa subjected to the variable transform explained above is expressed by x irrespective of H, V, and C. The distribution functions of HVC are expanded by the N number order of Chebyshev functions.

$$f(x) = \sum_{n=0}^{N-1} c_n T_n(x) \quad \{\text{Math. 20}\}$$

The expansion coefficients $c_n$ are found by the following equation by utilizing the orthogonality of the base functions.

$$c_n = \frac{2}{\pi} \int_{-1}^{1} \frac{f(x) T_n(x)}{\sqrt{1-x^2}} dx \quad \{\text{Math. 21}\}$$

Note, when n=0, specially, $c_o$ is made equal to $c_0/2$.
Here, the variable transform will be introduced.

$$x_k = \cos\left(\frac{\pi\left(k-\frac{1}{2}\right)}{N}\right), \quad \{\text{Math. 22}\}$$
$$k = 1, 2, \ldots, N$$

When performing this, the expansion coefficients are simply found as follows.

$$c_n = \frac{2}{N} \sum_{k=1}^{N} f(x_k) T_n(x_k) \quad \{\text{Math. 23}\}$$

When the number of bins of the color histogram is about 200, the order of expansion may be set so that N becomes equal to about 50.

2. Production of Perceptual Invariants (FIG. 6, Step S4)

A combined system of two Chebyshev base functions is used to extract the shapes of the distribution functions of the H, V, and C histograms. That is, the perception appearing due to structures taken by the HVC distribution functions is extracted as the feature.

With respect to the matrix elements formed by the quadratic form of expansion coefficients, the perceptual invariants are defined by the trace of the matrix elements having a constant quantum number difference. The quantum number difference "m" can be defined up to m=0, 1, 2, . . . , N/2 in the case of a symmetric state, while can be defined up to m=0, 1, 2, . . . , N/2−1 in the case of an antisymmetric state. An example of preparation where the quantum number difference is 0, 1, and 2 is shown. Here, with one exception, the definition is made after normalization so that all of the values of the invariants are contained in [−1,1]. Further, when the range of the sum exceeds the range of k=0, 1, . . . , N−1, the result is handled regarding that k=0 is annularly connected next to k=N−1.

Evaluation according to combined system of base functions in the same color plane $$F_{m=0}^{(\alpha)(\alpha)+} = \sum_{k=0}^{N-1} (c_k^{(\alpha)})^2 \quad \{\text{Math. 24}\}$$

$$F_{m=1}^{(\alpha)(\alpha)+} = \frac{\sum_{k=0}^{N-1} c_k^{(\alpha)} c_{k+1}^{(\alpha)}}{\sum_{k=0}^{N-1} (c_k^{(\alpha)})^2}$$

$$F_{m=2}^{(\alpha)(\alpha)+} = \frac{\sum_{k=0}^{N-1} c_k^{(\alpha)} c_{k+2}^{(\alpha)}}{\sum_{k=0}^{N-1} (c_k^{(\alpha)})^2}$$

Evaluation according to combined system of base functions between different color planes $$F^{(\alpha)(\beta)+}_{m=0} = \frac{\sum_{k=0}^{N-1} \frac{1}{2}(c_k^{(\alpha)} c_k^{(\beta)} + c_k^{(\alpha)} c_k^{(\beta)})}{\sqrt{\sum_{k=0}^{N-1} (c_k^{(\alpha)})^2} \sqrt{\sum_{k=0}^{N-1} (c_k^{(\beta)})^2}}$$ {Math. 25}

$$F^{(\alpha)(\beta)+}_{m=1} = \frac{\sum_{k=0}^{N-1} \frac{1}{2}(c_k^{(\alpha)} c_{k+1}^{(\beta)} + c_{k+1}^{(\alpha)} c_k^{(\beta)})}{\sqrt{\sum_{k=0}^{N-1} (c_k^{(\alpha)})^2} \sqrt{\sum_{k=0}^{N-1} (c_k^{(\beta)})^2}},$$

$$F^{(\alpha)(\beta)+}_{m=2} = \frac{\sum_{k=0}^{N-1} \frac{1}{2}(c_k^{(\alpha)} c_{k+2}^{(\beta)} + c_{k+2}^{(\alpha)} c_k^{(\beta)})}{\sqrt{\sum_{k=0}^{N-1} (c_k^{(\alpha)})^2} \sqrt{\sum_{k=0}^{N-1} (c_k^{(\beta)})^2}},$$

$$F^{(\alpha)(\beta)-}_{m=1} = \frac{\sum_{k=0}^{N-1} \frac{1}{2}(c_k^{(\alpha)} c_{k+1}^{(\beta)} - c_{k+1}^{(\alpha)} c_k^{(\beta)})}{\sqrt{\sum_{k=0}^{N-1} (c_k^{(\alpha)})^2} \sqrt{\sum_{k=0}^{N-1} (c_k^{(\beta)})^2}}$$

$$F^{(\alpha)(\beta)-}_{m=2} = \frac{\sum_{k=0}^{N-1} \frac{1}{2}(c_k^{(\alpha)} c_{k-2}^{(\beta)} - c_{k-2}^{(\alpha)} c_k^{(\beta)})}{\sqrt{\sum_{k=0}^{N-1} (c_k^{(\alpha)})^2} \sqrt{\sum_{k=0}^{N-1} (c_k^{(\beta)})^2}}$$

An invariant with a plus sign indicates a ratio of existence of signs of waveforms according to the symmetric state of the combined system occupied in the distribution functions of the image, while an invariant with a minus sign indicates a ratio of existence of signs of waveforms according to the antisymmetric state of the combined system occupied in distribution functions of the image.

Figure 7:
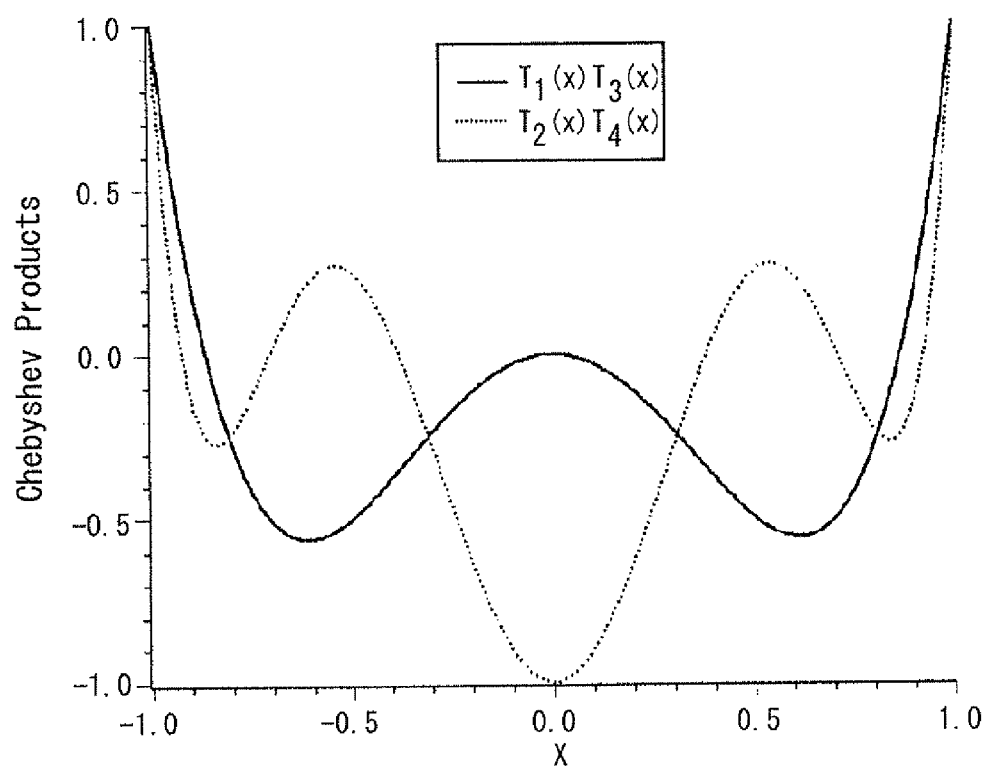
{FIG. 7} A waveform diagram of composite waves $T_1T_3$ and $T_2T_4$ in a symmetric state as one component of a target taking a trace of Fm=2 $(\alpha)(\alpha)+$.

A case where the value of an invariant is close to zero means that there is no component of that combined waveform at all, a case where it is close to +1 means that there many components in the form of that combined waveform as it is, and a case where it is close to −1 means that there are many components having waveforms obtained by inverting the signs of the combined waveforms. As an example, waveform diagrams of the combined waves $T_1T_3$ and $T_2T_4$ in the symmetric state (see FIG. 7), components covered when forming a trace of $Fm=2(\alpha)(\alpha)+$, are shown.

When a perceptual invariant having a quantum number difference different from zero between different color planes shows a significant value, the distribution function of a certain color plane and the distribution function of another color plane will always be accompanied with some sort of unique shape difference. Contrary to this, when a perceptual invariant having a quantum number difference of zero between different color planes shows a significant value, the shapes of the distribution functions of the two color planes will be extremely similar.

Only $Fm=0(\alpha)(\alpha)+$ cannot be normalized. The interval of the value of the distribution function is converted by variable transform to [−1,1], therefore the actual value becomes a value close to zero or a value from about 0.4 to about 1.5. The content meant by this value shows that the larger the value, the higher the ratio of expression by over-concentration to a certain base state among distribution functions, and the smaller the value, the higher the ratio of expression by dispersion to a variety of base states. For $Fm\neq 0(\alpha)(\alpha)+$ as well, in the same way, when the absolute value of the value is large, this means that the degree of over-concentration to a certain one combined waveform among base states of the combined system is high, and when the absolute value of the value is small, the expression is carried out with dispersion to many base states of the combined system or there are not many waveform components expressed by base states of this combined system.

The symmetric state and the antisymmetric state are in a conjugated relationship. When investigating the degree of alignment of an image group concerning invariants for perceptual invariants of the symmetric product and antisymmetric product having the same quantum number difference, it is unclear what perception the image groups have because the values distribute around zero in the symmetric product, but the values appear at both end portions in the distribution of indicators in the antisymmetric product. Further, the reverse to that is true as well. The image groups are unclear in the indicators of the antisymmetric product, but the values appear at both end portions in the distribution of indicators in the symmetric product. This fact is a natural conclusion when thinking in terms of equations as follows. That is, when the value of the symmetric product is zero, $c_i^{(\alpha)} c_k^{(\beta)} = -c_k^{(\alpha)} c_i^{(\beta)}$, therefore the result becomes the value of the antisymmetric product:

$$c_i^{(\alpha)} c_k^{(\beta)} - c_k^{(\alpha)} c_i^{(\beta)} = 2 c_i^{(\alpha)} c_k^{(\beta)} = -2 c_k^{(\alpha)} c_i^{(\beta)}$$

The largest value is easily taken either at the plus or minus side.

5. Preparation of Adjective Judgment Indicators (FIG. 6, Step S5)

5-1. Linear Combination of Perceptual Invariants

As the indicator for searching for a certain perceptual adjective (i), a new indicator $Q_i$ obtained by linear combination of perceptual invariants is prepared by utilizing the property of additivity of the perceptual invariants. The adjectives which can be expressed by the indicator $Q_i$ are not only single adjectives, but also pairs of adjectives provided with adjectives having exact opposite natures.

$$Q_i = \alpha_1 F_1 + \alpha_2 F_2 + \ldots$$

Here, the value of the linear combination parameter $\alpha_i$ is normalized so that $Q_i$ becomes the indicator in the range of [−1,1] again.

5-2. Setting of Parameters of Searched Adjectives

Linear combination parameters corresponding to predetermined adjectives are learned in advance, and model parameters thereof are set.

6. Image Sorting Processing (FIG. 6, Step S6)

Images are sorted based on an adjective judgment indicator. The adjective judgment indicator $Q_i$ is computed for each of the images of an input image database group. The images are then rearranged in the order of magnitude of the value of $Q_i$. The power distribution of the image group takes the form of a Gaussian distribution or Poisson distribution with respect to the judgment indicator $Q_i$, therefore an image showing specificity with respect to that adjective judgment indicator is proposed at both ends at a statistically significant level more than the other image groups.

A concrete example of what perception an extracted image actually gives is shown. The simplest linear combination is a case where the coefficient parameter is finite with respect to only one perceptual invariant, but all of the others become zero. Only the properties of these are shown. The method of determination when a plurality of coefficient parameters remain will be explained in the section of model learning explained later.

It was actually confirmed experimentally that perceptual invariants of the quadratic form projected to a Hilbelt space in which physical phenomena can be easily described in this way, continuing to act unwaveringly with respect to the change of the signal distribution of the image, and provided with an additive property exhibit an extremely deep connection and linearity with higher order adjective pairs of a general nature in color psychology (see Document C1). In order to show that deep connection, examples of terms of adjective pairs which can be obtained from the perceptual invariants will be described below.

A state of gradual transition of the perception axis was experimentally confirmed between images having the same type of perceptual invariants, but varied in the value of the quantum number difference. This becomes a method of description which is very fitting for the duality of adjectives. That is, among adjectives, with respect to rough class of "lively", there are the same order expressions of a finer class such as "flowery", "showy", and "noisy". That fine sorting capability becomes indispensable for perceptual retrieval.

In the effective quantum number difference range, when the non-diagonal components of the matrix elements become relatively small with respect to the values which can be taken by the diagonal components, that is, in comparison with $1\pm$, it is appropriate to think that there would no longer be any meaningful perceptual sorting capability. That is, when the distribution range of values of perceptual invariants of the trace of the matrix elements is wide, an array having high correspondence with perception is obtained. However, when that distribution range becomes small, the correspondence is no longer seen. This is confirmed experimentally as well.

[Document C1] The Color Science Association of Japan ed., Course of Color Science, vol. 1, "Color Science" (Asakura Publishing Co., Ltd., 2004), Chapter 3 "Psychology of Color", Section 3.2 "Measurement Method of Sense, Perception, Recognition", Table 3.4 "Adjective Pairs Frequently Used for Image Measurement of Color" and Section 3.4 "Recognition of Color", Table 3.13 "Comparison of Factor Analysis With Respect to Colors by Students of Japan and USA."

A concrete example will be shown below.

$$Fm=0(\alpha)(\alpha)+(\alpha)(\alpha)=HH\oplus VV\oplus CC\text{Static-Dynamic} \quad \{\text{Math. 26}\}$$

This is an additive mean of perceptual invariants produced in the three color planes. From the perceptual invariants, an array of perceptual images of the adjective pair "static-dynamic" is obtained. As "static" images, photos of distant scenery where it seems as if time has stopped for an instant cluster. As "dynamic" images, photos of many persons dancing in a festival and photos in which the bustling nature of a city is conveyed cluster.

Figure 8:
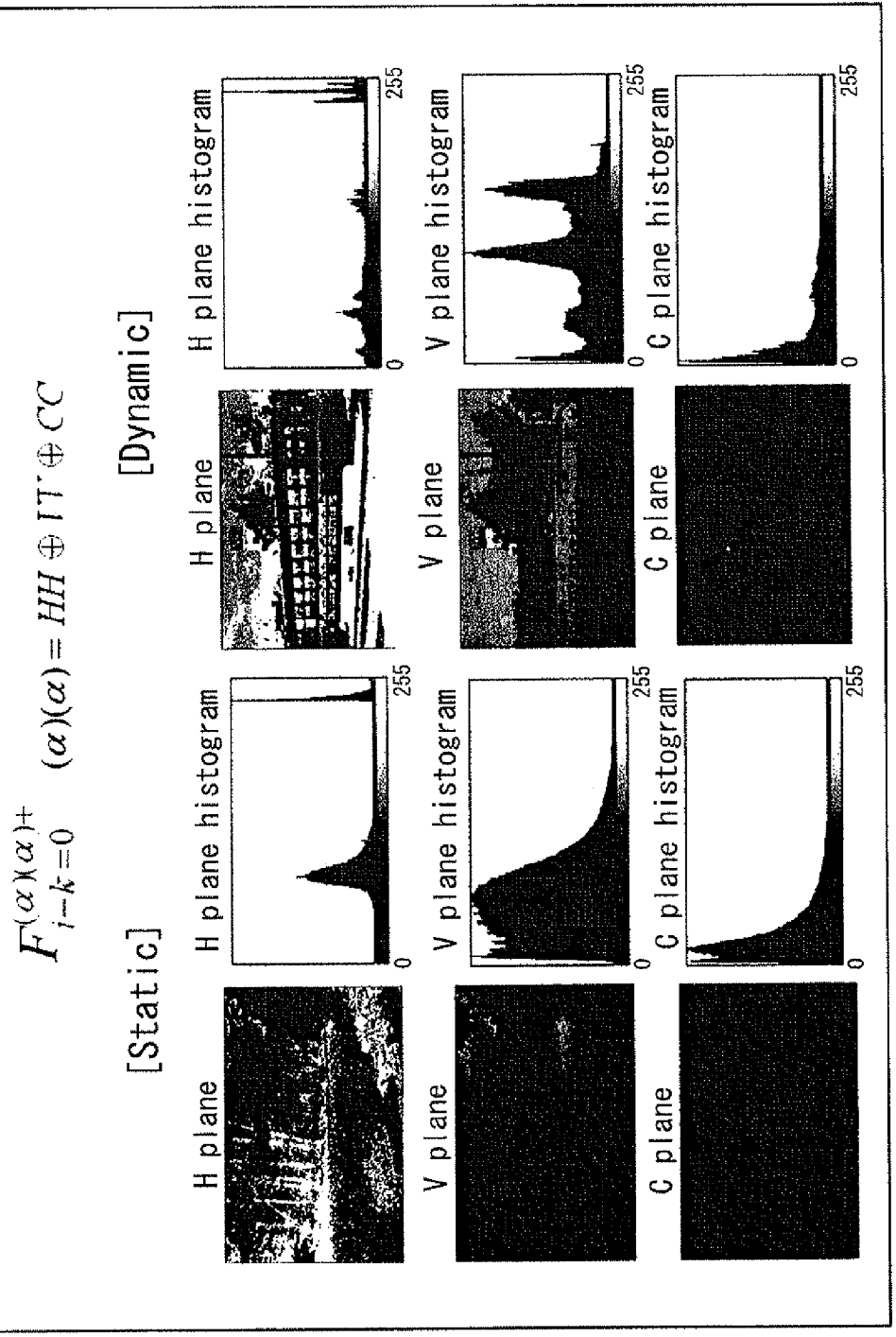
{FIG. 8} A diagram showing color histogram shapes of HVC planes of a "static" image and a "dynamic" image.

FIG. 8 shows an example of color histogram shapes of the HVC planes of images located near two ends of an image distribution. In the color histograms of a "static" image, all of the H, V, and C planes form groups exhibiting a shape like a single band structure bunched at the state component of one base function. In contrast, in a "dynamic" image, each of H, V, and C planes has many complex peak shapes and has a histogram structure which cannot be described by a simple waveform, so are dispersed.

$$Fm=0(\alpha)(\beta)+(\alpha)(\beta)=VC\text{"Closed-Open"} \quad \{\text{Math. 27}\}$$

From the perceptual invariants, an array of perceptual images having an adjective pair of "closed-open" is obtained. Images having much shade are clustered as "closed" images. As the other "open" images, many images having a little more brightness and spatial spread as a whole are clustered.

Figure 9:
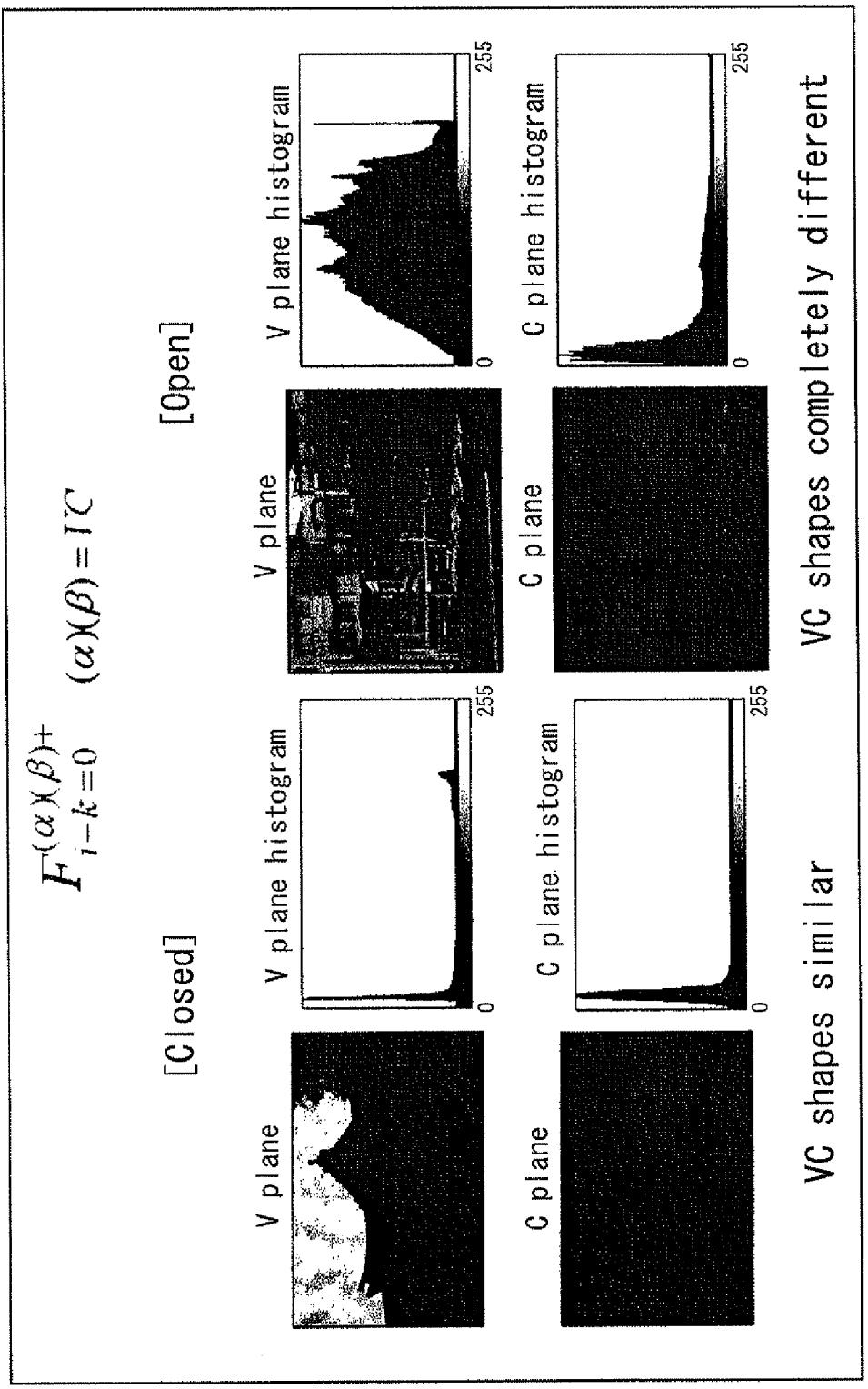
{FIG. 9} A diagram showing color histogram shapes of HVC planes of a "closed" image and an "open" image.

FIG. 9 shows an example of color histogram shapes of the HVC planes of images located near the two ends of the image distribution. In the color histograms of the "closed" image, the similarity of shapes is extremely high between V and C. The color histograms of the other "open" image exhibit completely different shapes at the V plane and the C plane.

$$Fm=0(\alpha)(\beta)-(\alpha)(\beta)=VC\text{"Excited-Calm"} \quad \{\text{Math. 28}\}$$

From the perceptual invariants, an array of perceptual images having an adjective pair of "excited-calm" is obtained. This adjective pair is positioned as having a conjugated relationship with the adjective pair of "closed-open" derived from the symmetric product. As "excited" images, many photos of autumn leaves comprised of colorful ginkgo trees and maple trees, photos of scenery catching the instant of the pink flash of the evening, and photos catching the instant of motion of clouds gathering cluster. As the other "calm" images, photos catching the instant when motion completely stops and further provided with deep colors cluster.

<Model Learning of Perceptual Adjectives>

The value of a perceptual invariant is uniquely determined from observed quantities of distribution functions of the image. To obtain correspondence with adjectives by learning in advance, it is necessary to determine the linear combination parameters for each adjective.

1) Least Square Method

One or more persons select images provided with an impression corresponding to certain adjective from a group of images for learning data. The function of square error for measuring the reproducibility of that is introduced, the linear combination parameters are assumed to be unknown, and each parameter is partially differentiated to find the local minimum point. In this way, each combination parameter is determined. This is fitting of coefficients by the least square method.

2) Determination from Positional Relationship in Gamut of Image Distribution

When a plurality of perceptual invariants are produced from distribution functions of a certain image, what position that image occupied among the perceptual invariants found also for all images of the image database group expresses the perception generated from that image. That is, a borderline at the end of the distribution of the image group with respect to each perceptual invariant can be regarded as the gamut which can be taken by a signal distribution of a natural image. An image located at the end of this gamut can be considered to generate an extremely important signal with respect to that invariant, while an image located at the center may have a property not related to that invariant. Accordingly, numerical values in the range of $[-1,1]$ may be set by using the position in the gamut at which that image exists as it is as the value of the linear combination parameter. Note that normalization among all linear combination parameters is carried out at the end.

As explained before, when a plurality of images are selected for learning with respect to one adjective, for the selected image group, the simply statistically averaged coordinate position in the gamut of each perceptual invariant may be made the learning result of the linear combination parameter with respect to that adjective. If image groups selected with respect to a certain perceptual invariant are dispersed and scattered, the value of the parameter $\alpha_i$ approaches zero by the statistical average. This means that the perceptual invariant is not connected with that adjective. Contrary to this, in a case where selected image groups gather in the same direction, even when these are statistically averaged, a value having meaning remains as the parameter $\alpha_i$, so that perceptual invariant is very important for that adjective. In this way, the perceptual invariant specially acting for a certain adjective is extremely simply derived. Note that, the method of model learning explained above can be commonly used in all embodiments which will be explained below.

[Second Embodiment]

(Hilbelt Space Expression of Texture PDF and Linear Sum of Perceptual Invariants)

Next, an explanation will be given of production of perceptual invariants according to a second embodiment. Note that, in the second embodiment, the method of production of the perceptual invariants in the first embodiment was modified to the following method.

<Processing for Searched Image>

1. Transformation to Munsell HVC Color Space

As the hue plane, a plane where N is not separated is prepared. The hue plane in an N region will behave like random noise in the hue plane. However, in the following edge extraction process, that plays a role as being detected as a feature different from the other chromatic hue.

In the method of obtaining one-dimensional coordinates in a hue circle, it is possible to use the origin of the Munsell color circle, that is, red, as the start point, go around once, and make the end point red again after passing through purple. However, more desirably, in the same way as the first embodiment, it is possible to make a cut at the point at which the degree of distribution of hue becomes the minimum in each image and set the start point and end point there. This is because, by performing this, the hue circle is split and therefore the signal strength fluctuates at the two ends and the adverse influence due to excessive evaluation of an edge component when extracting an edge in a color plane is suppressed to the lowest limit.

2. Preparation of Edge Image 2-1. Multiplex Resolution Transform and Edge Extraction 1) Wavelet Transform A wavelet transform is used to project an image to a frequency space expressed by multiplex resolution, and high frequency edge components of the H, V, and C color planes are extracted. Here, as the edge components, use is made of the wavelet decomposed high frequency subbands LH, HL, and HH as they are. When schematically describing this situation, when decomposed to a resolution of M stages, the result becomes as follows:

$$V_{ij}(\vec{x}) = \text{Wavelet}_{(i,j)}\{S(\vec{x})\}\{ \quad \{\text{Math. 29}\}$$

i=1, 2, . . . , M (resolution)
j=LL, LH, HL, HH

Note that, the LL component is sequentially decomposed to high frequency subbands having a low resolution, therefore the finally remaining LL component becomes only the lowest resolution one. As the wavelet transform, use is made of for example the following 5/3 filter.

<Wavelet Transform: Analysis/Decomposition Process>

High pass component: $d[n] = x[2n+1] - (x[2n+2] + x[2n])/2$

Low pass component: $s[n] = x[2n] + (d[n] + d[n-1])/4$

The one-dimensional wavelet transform as defined above is performed by independently performing two-dimensional separation type filter processing in the horizontal direction and vertical direction for wavelet decomposition. The coefficients "s" are collected at the L plane, and the coefficients "d" are collected at the H plane.

2) Laplacian Pyramid

Further, as another method of multiplex resolution transformation, other than wavelet transform, there is also the method of using a Laplacian pyramid. When forming a Laplacian pyramid, a vertical and horizontal (½)*(½) reduced image is formed once and returned back to an image having the original size by bilinear scaling, then the difference between this and the image before the reduction is taken to thereby obtain a high frequency image (Laplacian component) having that resolution. Note that, smoothening for preventing aliasing may be performed before forming the reduced image as well. When successively repeating this, a Laplacian pyramid in which high frequency images are linked can be formed. In the same way as the case of the wavelet transform, only one low frequency image (Gaussian component) remains at the lowest resolution.

It is disclosed in Document D1 that a histogram of signal values of a high frequency band produced by multiplex resolution transformation in this way (called a probability density function and abbreviated as PDF) exhibits Gaussian distribution or Laplacian distribution. In general, the distribution shape of a PDF can be approximated by a symmetric generalized Gaussian.

The value of the stage number M of the multiplex resolution transformation may be decomposed up to one giving a pixel number of an extent where the histogram of the PDF of each band does not become rough. For example, it may be decomposed to about five stages for an image of the Quad VGA size (1280×960), may be decomposed to about three stages for an image of the QVGA size (320×240), and may be decomposed to about seven stages for an image of 20,000,000 pixels.

Figure 10:
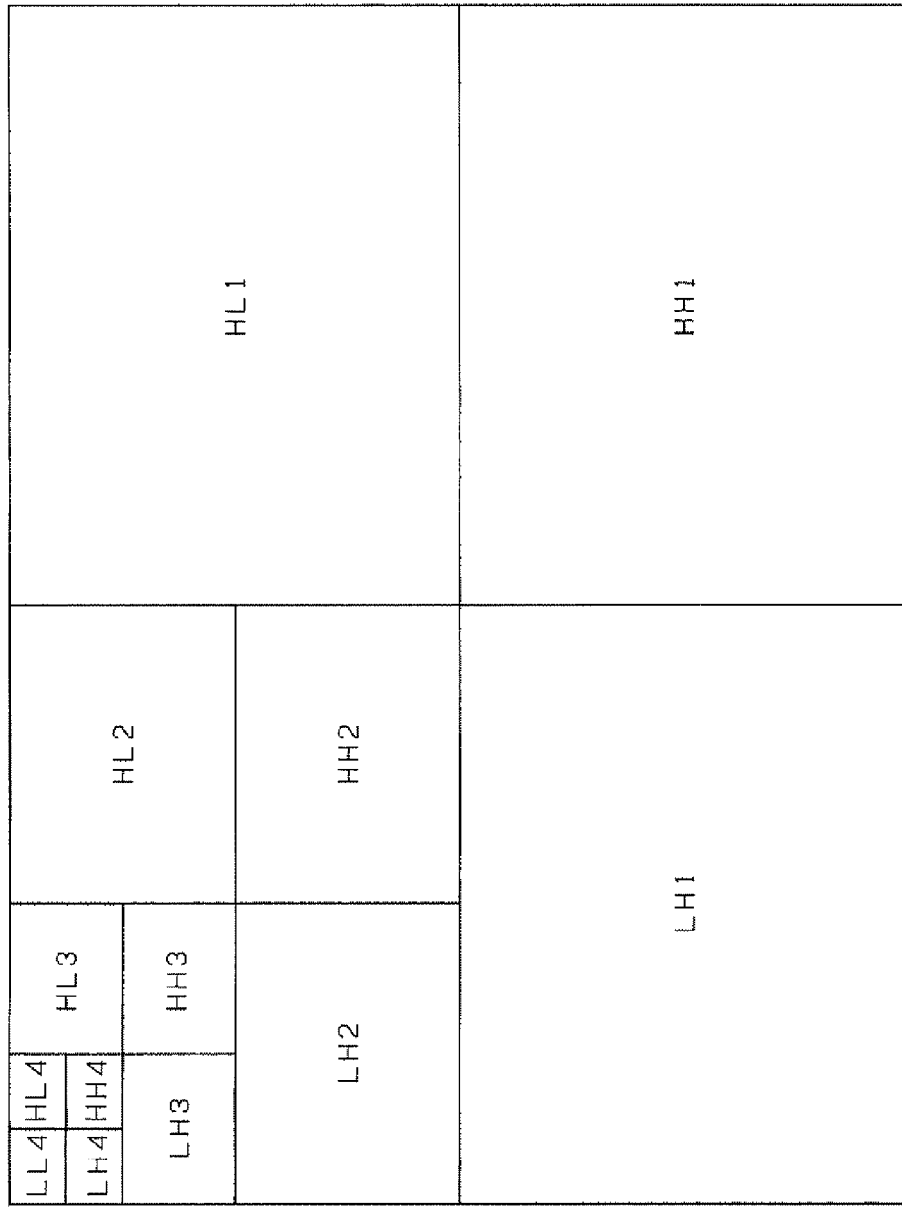
{FIG. 10} A diagram showing a situation of subband division by a four-stage wavelet transform.

Note that, FIG. 10 is a diagram showing the situation of subband decomposition by a four-stage wavelet transform. For example, in the first-stage wavelet transform, data of the high pass component and low pass component are extracted for all rows in the horizontal direction first for image data in real space. As a result, data of the high pass component and low pass component of half the number of images is extracted in the horizontal direction. For those, for example, the high pass component is stored at the right side of a memory region in which the image data of the real space was stored, and the low pass component is stored at the left side.

Next, for the data of the high pass component stored at the right side of the memory region and data of the low pass component stored at the left side, the data of the high pass component and the low pass component are extracted for all columns in the vertical direction. As a result, from the high pass component at the right side of the memory region and the low pass component at the left side, data of the high pass component and low pass component are further extracted. Among those, the high pass component is stored at the lower side of the memory region where the data was stored and the low pass component is stored at the upper side.

As a result, the data extracted as the high pass component in the vertical direction from the data extracted as the high pass component in the horizontal direction is expressed as HH, the data extracted as the low pass component in the vertical direction from the data extracted as the high pass component in the horizontal direction is expressed as HL, the data extracted as the high pass component in the vertical direction from the data extracted as the low pass component in the horizontal direction is expressed as LH, and the data extracted as the low pass component in the vertical direction from the data extracted as the low pass component in the horizontal direction is expressed as LL. Note, the vertical direction and horizontal direction are independent. Therefore, even when the order of extraction is changed, the results are equivalent.

Next, in the second-stage wavelet transform, the high pass component and low pass component are extracted in the same way for the data LL extracted as the low pass component in the vertical direction from the data extracted as the low pass component in the horizontal direction by the first-stage wavelet transform. By repeatedly performing this up to the fourth stage, the result becomes as shown in FIG. 10.

[Document D1] Michael Gormish, "Source coding with channel, distortion, and complexity constraints," Doctor thesis, Stanford Univ., March 1994, Chapter 5: "Quantifization and Computation-Rate-Distortion".

2-2. Multiplex Resolution Synthesis

The high frequency subbands extracted as explained above express information concerning edge, texture, and contrast at each resolution scale. In order to comprehensively handle this information, multiplex resolution inverse transformation by only high frequency subbands is carried out and edge synthesis is carried out. Namely, the low frequency subband LLM with the lowest resolution is excluded and the values are all set to zero, then the remaining subbands are sequentially processed by an inverse wavelet transform. When schematically describing this situation, the following equation stands where a synthesized edge component having the same resolution as that of the input image is E:

$$E(\vec{x}) = \sum_{\substack{i=LH,HL,HH \\ j=M,M-1,\ldots,2,1}} Wavelet^{-1}\{V_{ij}(\vec{x})\} \quad \{\text{Math. 30}\}$$

In this synthesis stage, the information of edge, texture, and contrast of different levels will be propagated to the other levels by taking the spatial position relationships into account. Note that, when a Laplacian pyramid is used, the Gaussian plane with the lowest resolution is set to zero, and the remaining Laplacian images are combined one after another.

3. Preparation of One-Dimensional Distribution Function of Synthesized Edges

Histograms (PDF) of the synthesized edge images extracted from HVC color planes are prepared. The bin numbers of the histograms may be set to about −128 to 128 while straddling the origin for all of H, V, and C. Note, assume that each of the HVC color planes is expressed by tones of about 200 bins.

A PDF is a histogram of the edge strength, therefore a distribution having approximately the same degree integration area on the positive and negative sides and exhibiting the peak at the origin is obtained. In general, in the case of a memoryless source having no correlation between resolutions, the edges exhibiting symmetric PDF distribution shapes at each level are combined while keeping their symmetric PDF distribution shapes as they are even when combined. However, in a case where there is correlation between resolutions, the situation of that correlation may be projected in the form of a PDF distribution shape.

In this way, the PDF of each high frequency subband surface can usually be approximated to the generalized Gaussian: $\exp(-|x|^\alpha)$. However, the correlation of spatial contrast is reflected in the successively synthesized edge planes, so the PDF changes to a variety of shapes including asymmetry.

It was experimentally confirmed that such a characteristic shape of the PDF distribution of the synthesized edges appeared in substantially that shape when synthesizing about three stages' worth of edge components from the lowest resolution. Accordingly, when desiring to keep things simple, even without performing the synthesis down to the last real resolution, the PDF distribution shape at the middle stage of synthesis may be evaluated.

For convenience, when normalizing values of histograms by the pixel number, the result becomes a one-dimensional distribution function expressing the probability density of the pixel values. The diagrammatically prepared distribution function is expressed as follows. The reason for use of the Laplacian notation Δ is that the synthesis edge image describes the aspect of the second order differentiation of the pixel values of the original image.

$$f(\Delta H), f(\Delta V), f(\Delta C)$$

4. Hilbelt Space Expression of Distribution Function

The distribution function of the synthesized edge image is processed by series expansion by spherical Bessel functions to make it possible to evaluate the shape by the expansion coefficients. In the second embodiment, the right expansion and the left expansion are individually carried out. However, left and right simultaneous expansion is carried out in a third embodiment which will be explained later. At that time, in the second embodiment, expansion by the root of the 0-th order spherical Bessel function is carried out. The outermost point of the expansion zone may be fixed and the number of roots included in that may be increased so as to deal with the formation of base functions having high frequency components.

4-1. Variable Transform

For the portion at the right side from the peak of a histogram, the distribution area of the abscissa is defined as [a,b] (a<b), and the distribution area of the ordinate is defined as [fa,fb]. The variable transform is carried out for the intervals containing the abscissa in [0,1] and containing the ordinate in [0,1]. For the portion on the left side from the peak of the histogram, in the same way, the distribution area of the abscissa is defined as [b,a](b<a), the distribution area of the ordinate is defined as [fa,fb], and the same transform is carried out. Usually, the values of a to 0 and fa to 0 are taken. For convenience only in this section, when expressing the transformation of the variable of the abscissa from x to y and the variable of the ordinate from fx to fy, the transform equations become as follows.

Variable transform of abscissa: $y=|x-a|/|b-a|$

Variable transform of ordinate: $fy=(fx-fa)/(fb-fa)$ 4-2. Series Expansion by Root of Spherical Bessel Functions The distribution area of the abscissa subjected to the variable transform explained above is expressed by x irrespective of ΔH, ΔV, and ΔC. The distribution functions of the HVC color planes are expanded by base functions according to the roots of N number of 0-th order spherical Bessel functions. The notation "a" used here means the outermost point which becomes the expansion target of the distribution area unlike the explanation hitherto.

$$f(x) = \sum_{n=1}^{N} c_n j_0\left(\alpha_{0n}\frac{x}{a}\right) \qquad \{\text{Math. 31}\}$$

The expansion coefficients $c_n$ are found by the following equation by utilizing the orthogonality of the base functions.

$$c_n = \frac{2}{a^3[j_1(\alpha_{0n})]^2} \int_0^a f(x) j_0\left(\alpha_{0n}\frac{x}{a}\right) x^2 dx \qquad \{\text{Math. 32}\}$$

Here, $\alpha_{nm}$ means the value of the m-th zero point of the n-th order function.

$$j_n(\alpha_{nm})=0 \qquad \{\text{Math. 33}\}$$

The root of the 0-th order function can be given analytically.

$$\alpha_{0m}=nm, m=1,2,3,\ldots$$

Accordingly, at the m-th base function of the 0-th order function used for the series expansion, there are m number of zero points (roots) in an interval of [0,a]. That is, the base function obtained by setting "a" at the position of the first zero point of the 0-th order spherical Bessel function is used as the base function having the lowest frequency in that order. That function is reduced toward the direction of the origin. This is stopped when the second zero point reaches the position of "a". The result is defined as the base function having the second lowest frequency in that order. This is successively repeated to produce base functions of high frequency in the interval in the distribution area [0,a] and thereby form a complete set. This is exactly the same for the case of an n-th order function as well.

The spherical Bessel functions form a complete set concerning root expansion. Therefore, when a value of N with a sufficient size is taken, the original function can be completely reproduced. When the number of bins of the histogram is about 128 at one side, the order of the expansion may be set to about 100.

5. Production of Perceptual Invariants

A combined system of two base functions is used to extract the shapes of the distribution functions of the texture PDFs of the HVC planes. That is, the perception appearing due to the structure taken by the distribution functions of the HVC combined edge image is extracted as the feature.

Right expansion and left expansion were carried out on one distribution function obtained from the edge components in the same color plane by using the same base functions. Therefore, in the method of formation of invariants of the quadratic form, the number of types increased to about two times or more than the case of the first embodiment. Below, an example of the method of formation of the invariants when the quantum number difference is 0 and 1 in the case of the symmetric product and the method of formation when the quantum number difference is 1 in the case of the antisymmetric product will be shown. By the same production method, the symmetric product can be defined up to when the quantum number difference is m=0, 1, ..., N/2, and the antisymmetric product can be defined up to when the quantum number difference is m=1, 2, ..., N/2−1.

When considering the right interval and left interval of the distribution function as different quadrants, a combined system can be formed from a combination of two base functions of same quadrant of the three planes H, V, and C in the same way as the first embodiment. Further, a combined system can be formed from the combination of two base functions between two quadrants as well. The former handles only the radial direction, therefore is given notation "r". The latter is given the notation "z" in the meaning of straddling zero. The expansion coefficient on the right side is defined as $c_k^{(\alpha+)}$, and the left side expansion coefficient is defined as $c_k^{(\alpha-)}$.

Here, with one exception, the definition is made after normalization so that all of the values of the invariants are contained in [−1,1]. Further, when the range of the sum exceeds the range of k=1, ..., N, the result is handled while regarding that k=1 is annularly connected next to k=N. The color planes are defined as $(\alpha)$, $(\beta)$=H, V, C.

Evaluation According to Combined System of Base Functions in the Same Color Plane 1) Combination in Same Quadrant $$G_{r,m=0}^{(\alpha)(\alpha)+} = \sum_{k=1}^{N} \frac{1}{2}\left[(c_k^{(\alpha+)})^2 + (c_k^{(\alpha-)})^2\right] \qquad \{\text{Math. 34}\}$$

$$G_{r,m=1}^{(\alpha)(\alpha)+} = \frac{\sum_{k=1}^{N} \frac{1}{2}[c_k^{(\alpha+)}c_{k+1}^{(\alpha+)} + c_k^{(\alpha-)}c_{k+1}^{(\alpha-)}]}{\sum_{k=1}^{N} \frac{1}{2}\left[(c_k^{(\alpha+)})^2 + (c_k^{(\alpha-)})^2\right]}$$

2) Combination of Different Quadrants $$G_{z,m=0}^{(\alpha)(\alpha)+} = \frac{\sum_{k=1}^{N} c_k^{(\alpha+)} c_k^{(\alpha-)}}{\sqrt{\sum_{k=1}^{N}(c_k^{(\alpha+)})^2} \sqrt{\sum_{k=1}^{N}(c_k^{(\alpha-)})^2}} \qquad \{\text{Math. 35}\}$$

$$G_{r,m=1}^{(\alpha)(\alpha)+} = \frac{\sum_{k=1}^{N} \frac{1}{2}[c_k^{(\alpha+)} c_{k+1}^{(\alpha-)} + c_{k+1}^{(\alpha+)} c_k^{(\alpha-)}]}{\sqrt{\sum_{k=1}^{N}(c_k^{(\alpha+)})^2} \sqrt{\sum_{k=1}^{N}(c_k^{(\alpha-)})^2}},$$

$$G_{z,m=1}^{(\alpha)(\alpha)-} = \frac{\sum_{k=1}^{N} \frac{1}{2}[c_k^{(\alpha+)} c_{k+1}^{(\alpha-)} - c_{k+1}^{(\alpha+)} c_k^{(\alpha-)}]}{\sqrt{\sum_{k=1}^{N}(c_k^{(\alpha+)})^2} \sqrt{\sum_{k=1}^{N}(c_k^{(\alpha-)})^2}}$$

Evaluation According to Combined System of Base Functions Between Different Color Planes 1) Combination in Same Quadrant $$G_{r,m=0}^{(\alpha)(\beta)+} = \frac{\frac{1}{2}\sum_{k=1}^{N}\left[c_k^{(\alpha+)} c_k^{(\beta+)} + c_k^{(\alpha-)} c_k^{(\beta-)}\right]}{\frac{1}{2}\left[\sqrt{\sum_{k=1}^{N}(c_k^{(\alpha+)})^2}\sqrt{\sum_{k=1}^{N}(c_k^{(\beta+)})^2} + \sqrt{\sum_{k=1}^{N}(c_k^{(\alpha-)})^2}\sqrt{\sum_{k=1}^{N}(c_k^{(\beta-)})^2}\right]} \qquad \{\text{Math. 36}\}$$

$$G_{r,m=1}^{(\alpha)(\beta)-} = \frac{\frac{1}{4}\left[\sum_{k=1}^{N}\left[c_k^{(\alpha+)}c_{k+1}^{(\beta+)} + c_{k+1}^{(\alpha+)}c_k^{(\beta+)}\right] + \sum_{k=1}^{N}\left[c_k^{(\alpha-)}c_{k-1}^{(\beta-)} + c_{k+1}^{(\alpha-)}c_k^{(\beta-)}\right]\right]}{\frac{1}{2}\left[\sqrt{\sum_{k=1}^{N}(c_k^{(\alpha-)})^2}\sqrt{\sum_{k=1}^{N}(c_k^{(\beta-)})^2} + \sqrt{\sum_{k=1}^{N}(c_k^{(\alpha)})^2}\sqrt{\sum_{k=1}^{N}(c_k^{(\beta-)})^2}\right]},$$

$$G_{r,m=1}^{(\alpha)(\beta)-} = \frac{\frac{1}{4}\left[\sum_{k=1}^{N}\left[c_k^{(\alpha+)}c_{k+1}^{(\beta+)} - c_{k+1}^{(\alpha+)}c_k^{(\beta+)}\right] + \sum_{k=1}^{N}\left[c_k^{(\alpha-)}c_{k-1}^{(\beta-)} - c_{k+1}^{(\alpha-)}c_k^{(\beta-)}\right]\right]}{\frac{1}{2}\left[\sqrt{\sum_{k=1}^{N}(c_k^{(\alpha-)})^2}\sqrt{\sum_{k=1}^{N}(c_k^{(\beta+)})^2} + \sqrt{\sum_{k=1}^{N}(c_k^{(\alpha-)})^2}\sqrt{\sum_{k=1}^{N}(c_k^{(\beta)})^2}\right]}$$

2) Combination of Different Quadrants $$G_{z,m=0}^{(\alpha)(\beta)+} = \frac{\frac{1}{2}\sum_{k=1}^{N}\left[c_k^{(\alpha+)}c_k^{(\beta-)} + c_k^{(\alpha+)}c_k^{(\beta)}\right]}{\frac{1}{2}\left[\sqrt{\sum_{k=1}^{N}(c_k^{(\alpha+)})^2}\sqrt{\sum_{k=1}^{N}(c_k^{(\beta-)})^2} + \sqrt{\sum_{k=1}^{N}(c_k^{(\alpha+)})^2}\sqrt{\sum_{k=1}^{N}(c_k^{(\beta-)})^2}\right]}$$

$$G_{z,m=1}^{(\alpha)(\beta)+} = \frac{\frac{1}{4}\left[\sum_{k=1}^{N}\left[c_k^{(\alpha+)}c_{k+1}^{(\beta-)} + c_{k+1}^{(\alpha+)}c_k^{(\beta-)}\right] + \sum_{k=1}^{N}\left[c_k^{(\alpha-)}c_{k+1}^{(\beta+)} + c_{k+1}^{(\alpha-)}c_k^{(\beta+)}\right]\right]}{\frac{1}{2}\left[\sqrt{\sum_{k=1}^{N}(c_k^{(\alpha+)})^2}\sqrt{\sum_{k=1}^{N}(c_k^{(\beta-)})^2} + \sqrt{\sum_{k=1}^{N}(c_k^{(\alpha+)})^2}\sqrt{\sum_{k=1}^{N}(c_k^{(\beta-)})^2}\right]},$$

$$G_{z,m=1}^{(\alpha)(\beta)-} = \frac{\frac{1}{4}\left[\sum_{k=1}^{N}\left[c_k^{(\alpha+)}c_{k+1}^{(\beta-)} - c_{k+1}^{(\alpha+)}c_k^{(\beta-)}\right] + \sum_{k=1}^{N}\left[c_k^{(\alpha-)}c_{k+1}^{(\beta+)} - c_{k+1}^{(\alpha-)}c_k^{(\beta+)}\right]\right]}{\frac{1}{2}\left[\sqrt{\sum_{k=1}^{N}(c_k^{(\alpha+)})^2}\sqrt{\sum_{k=1}^{N}(c_k^{(\beta-)})^2} + \sqrt{\sum_{k=1}^{N}(c_k^{(\alpha+)})^2}\sqrt{\sum_{k=1}^{N}(c_k^{(\beta-)})^2}\right]}$$

{Math. 37}

The values which can be taken by the invariants and their properties are exactly the same as the content explained in the first embodiment, so are omitted here.

6. Preparation of Adjective Judgment Indicators 6-1. Linear Combination of Perceptual Invariants As the indicator for searching for a certain perceptual adjective (i), a new indicator $Q_i$ obtained by linear combination of perceptual invariants is prepared by utilizing the property of additivity of the perceptual invariants. The adjectives which can be expressed by the indicator $Q_i$ are not only single adjectives, but also pairs of adjectives provided with adjectives having exact opposite natures.

$$Q_i = \beta_1 G_1 + \beta_2 G_2 + \ldots$$

Here, the value of the linear combination parameter $\beta_i$ is normalized so that the $Q_i$ becomes the indicator in the range of $[-1,1]$ again.

6-2. Setting of Parameters of Searched Adjectives

Linear combination parameters corresponding to predetermined adjectives are learned in advance, and model parameters thereof are set.

7. Image Sorting Process

Based on the adjective judgment indicator, images are sorted in the same way as the first embodiment. Below, what perception the extracted image actually gives will be shown by mentioning a concrete example. In the same way as the first embodiment, in the case of the texture as well, from this perceptual invariant, an array of images which are deeply related to the higher order adjective pair used in color psychology and having linearity could be obtained.

If observing the properties of perceptual invariants as a whole, by combining the base functions of different quadrants, invariants including antisymmetric elements of distribution functions include considerably strong emotional elements. On the other hand, when combining the base functions in the same quadrant, separation such as with the multiplicity or singularity of the object structure of images is possible, but the considerably neutral aspects are also strong. Below, adjectives will be assigned and examples given mainly for the case of combining different quadrants.

The situation differs slightly from the time of the distribution function of color of the first embodiment in that at the time of an edge distribution function, a large value remains even when the elements of the nondiagonal components are separated from the diagonal regions. In the former case, when the elements are separated from the diagonal regions, the strength rapidly falls as a short distance correlation. Compared with this, the latter has the property of a long distance correlation. This can be interpreted as showing that the number of emotions induced by the distribution structure of the texture is greater than the number of emotions induced by the distribution structure of color.

Figure 11:
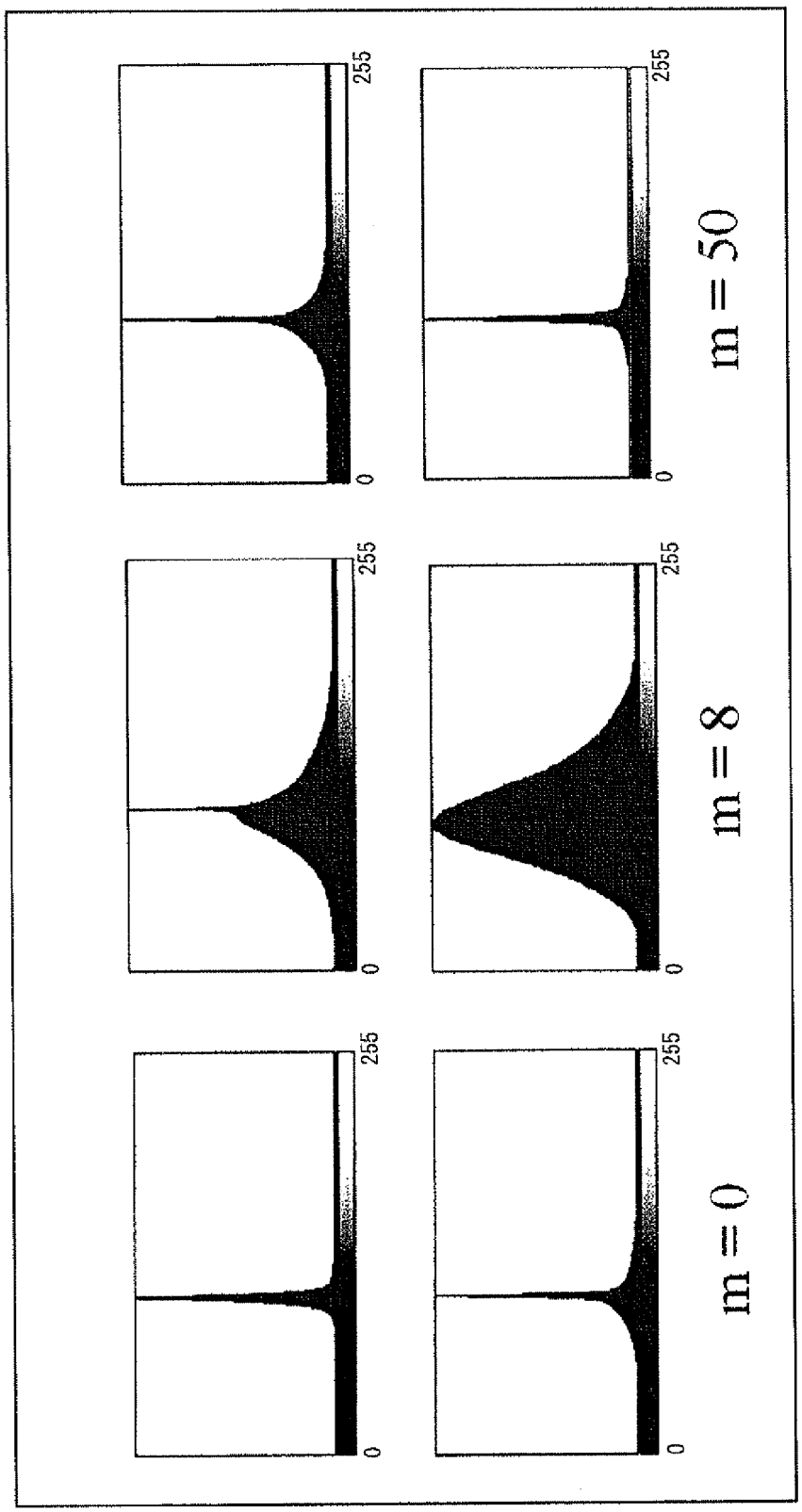
{FIG. 11} An example showing what shape of distribution function corresponds to the two extreme ends of an ordered image group distribution when the order of expansion N is 100 and a quantum number difference m is shifted in a case where a predetermined additive mean is taken for perceptual invariants Gz,m $(\alpha)(\alpha)+$.

FIG. 11 is an example showing what kind of shape of distribution function corresponds to the two extreme ends of the arrayed image group distribution in the case of taking the additive mean For the perceptual invariant $$G_{z,m(\alpha)(\alpha)+(\alpha)(\alpha)} = VV \oplus CC \qquad \{\text{Math. 38}\}$$

in the case of taking the additive mean when the order of the expansion is N=100 and the quantum number difference "m" is shifted to m=0, 8, and 50. The top row shows the states of the distribution functions of the edge images of the V planes of the images positioned at first ends, while the bottom row shows the similar states of the images positioned at the other ends.

As the trend in the image group corresponding to FIG. 11, at the top level of m=0, images having largish elements in the images and giving a "rich" impression tend to cluster, while at the bottom level, images giving a "mysterious" impression tend to cluster. Further, from m=8, at the top level, complex images where two objects are superposed front and back and there are two elements of the background and a main subject cluster, while at the bottom level, integrated images of fine texture structures such as the leaves of trees and grass captured over the entire surface cluster.

$$Gz,m=0(\alpha)(\beta)+(\alpha)(\beta)=VC\text{"Bustling,flowery-lonely,tidy"} \quad \{\text{Math. 39}\}$$

From this perceptual invariant, perceptual images combining two adjective pairs of "bustling-lonely" and "flowery-tidy" are sorted. "Bustling and flowery" images include images of scenes in which many large size structures and small size structure are contained. On the other hand, "lonely, tidy" images include many images in which blackish colored structure or dark shaded scenes are contained with a specific weight of area with a certain extent of visual impact.

$$Gz,m=4(\alpha)(\beta)-(\alpha)(\beta)=VC\text{"Homey-grand"} \quad \{\text{Math. 40}\}$$

From this perceptual invariant, perceptual images of the adjective pair "homey-grand" are sorted. For "homey" images, many images accompanied with trees and shade are clustered. For "grand" images, photos of grand, distinctive scenery bathed in pink color, orange color, yellow color, etc., images accompanied with strings of strange clouds, images with steam or mist rising etc. are clustered.

Figure 12:
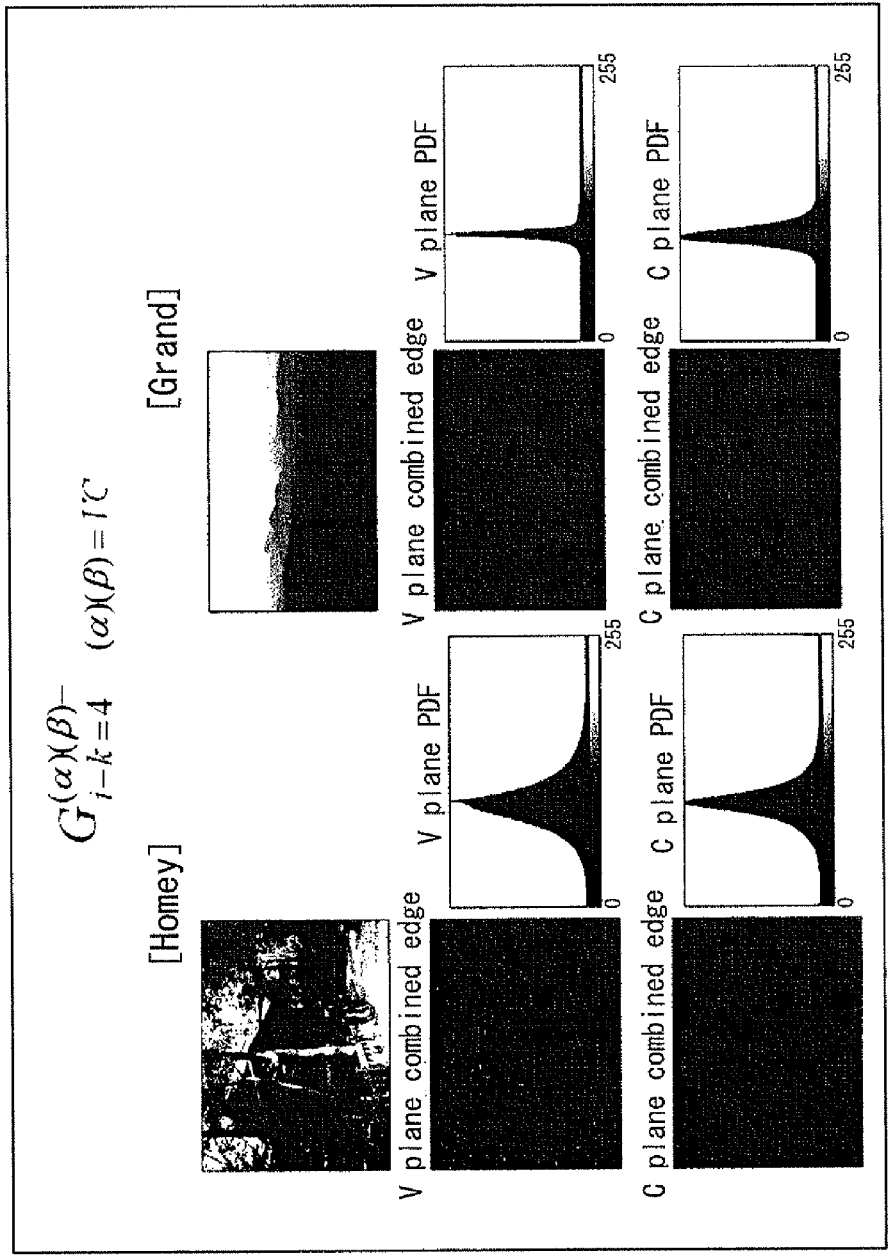
{FIG. 12} A diagram showing color histogram shapes of HVC planes of a "homey" image and a "grand" image.

FIG. 12 shows the edge images and distribution functions of typical examples of images selected at the two ends. If explaining the shapes of the distribution functions, as shown at the left side of FIG. 12, if both the V plane and C plane have many edges or texture, a "homey" impression is given. On the other hand, as shown at the right side of FIG. 12, if the distribution function of the V plane edge image exhibits a strong value at a slight frequency, that is, if the distribution function has low lower slopes, the original picture was accompanied with image structures distinctively split by for example ridgelines of mountains etc. and with changes in the chroma plane woven into this along with a bold contrast of at least the change in contrast of the value component to thereby give a grand impression.

$$Gz,m=0(\alpha)(\alpha)+(\alpha)(\alpha)=HH \quad \{\text{Math. 41}\}$$

"Summer and daytime scenes—autumn/spring and evening scenes"

From this perceptual invariant, adjective pairs are difficult to apply, but images are clearly divided into pairs of images of "summer and daytime scenes" and "autumn/spring and evening scenes". Images of "summer and daytime scenes" have large areas of green and blue and are strong in contrast. Images of "autumn/spring and evening scenes" mostly include warm colors and are somewhat poor in change.

[Third Embodiment]
(Hilbelt Space Expression of Texture PDF and Linear Sum of Perceptual Invariants)

Next, a third embodiment will be explained. In the second embodiment, the histogram of the overall edge image was expanded divided into the right side and left side, but simultaneous left-right expansion facilitates discussion of symmetry and is therefore preferable, so below just the points to change will be explained. The perceptual invariants obtained from this are more easily linked with perception than in the second embodiment and are believed to be more orderly.

4. Hilbelt Space Expression of Distribution Function

The double series of root expansion by the even function of the 0th order spherical Bessel function and root expansion by the odd function of the 1st order spherical Bessel function is used for expression of the distribution function by Hilbelt space expression. This being the case, the symmetrical components of the distribution function shape are all clustered at the expansion coefficients of the 0th order function, while the antisymmetric components are all clustered at the expansion coefficients of the 1st order function. Note that it is also possible to develop this further and perform double series expansion to an infinite order.

4-1. Variable Transform

The distance from the peak position "p" of the histogram to the final point of the distribution region broadened to the furthest ends of the right side and left side is made "r". The distribution region of the abscissa becomes [−r+p, r+p]. This abscissa is converted in the interval of [−1,1] by a variable transform.

Variable transform of abscissa: $y=(x-p)/r$

The ordinate is similar to that in the second embodiment.

4-2. Double Series Expansion by Root and Order of Spherical Bessel Functions

The distribution functions of the HVC color planes are expanded by the base functions using the roots of n number of 0th and 1st order spherical Bessel functions. The symbol "a" used here, in the same way as the second embodiment, means the outermost contour point covered by expansion of the distribution region.

$$f(x) = \sum_{n=0}^{1} \sum_{k=1}^{N} c_{nk} j_n\left(\alpha_{nk} \frac{x}{a}\right) \quad \{\text{Math. 42}\}$$

The expansion coefficients $c_{nk}$ are found by the following equation utilizing the orthogonality of base functions.

$$c_{nk} = \frac{1}{a^3 [j_{n+1}(\alpha_{nk})]^2} \int_{-a}^{a} f(x) j_n\left(\alpha_{nk}\frac{x}{a}\right) x^2 \, dx \quad \{\text{Math. 43}\}$$

Here, in deriving the equation for calculation of the expansion coefficients, the product of the 0-th order and 1st order functions is an odd function no matter how much the internal variables are scaled, so use is made of the property that if considering the even function nature of $\rho^2$ and integrating this at the left-right symmetric intervals, the integrated value becomes zero. That is, the relationship of orthogonality relating to the order, only in relation to the definition between even order and odd order functions, stands not only when the weight function is 1, but also when the weight of any even function is added. However, the constant factors of normalization change, but in the case of $\rho^2$, are already given by the relationship using the roots (described in part explaining general theory).

5. Production of Perceptual Invariants

If using double expansion coefficients $c_{nk}$ as single vectors and treating them the same as single expansion coefficients, it is possible to construct perceptual invariants $G_i$ of forms exactly the same as the perceptual invariants $F_i$ of color of the first embodiment. Therefore, it is enough to replace F with G. However, the range taken by the sum becomes double so k=1, 2, ..., N, N+1, ..., 2N is changed to. It is possible to use the thus found perceptual invariants to sort an image in the same way as the first and second embodiments.

[Fourth Embodiment]
(Linear Sum of Perceptual Invariants of Color and Texture)

Next, a fourth embodiment will be explained. The perceptual invariants $F_i$ derived from one-dimensional distribution functions relating to the color signal distribution of images shown in the first embodiment and the perceptual invariants $G_i$ derived from one-dimensional distribution functions relating to the color signal distribution of edge images shown in the second and third embodiments are quantities of exactly the same dimensions and have additive properties, so linear combination enables the two to be treated on the same footing. This is not limited to one-dimensional distribution functions. For two-dimensional distribution functions of the color signal distribution itself of images including elements of composition and further higher order perception elements as well, if constructing perceptual invariants by the same guidelines, a completely common footing is established and it becomes possible to explain the property of the higher concepts remaining strongest in the hierarchical structure of adjectives by utilizing a linear model of perception.

<Processing for Searched Image>
1. Conversion to Munsell HVC Color Space

In this fourth embodiment, two hue planes are prepared: a plane from which N is separated and a plane where it isn't. The rest of the processing is similar to the first to third embodiments.

5. Preparation of Adjective Judgment Indicators $$Q_i = \alpha_1 G_1 + \alpha_2 G_2 + \ldots + \beta_1 G_1 + \beta_2 G_2 + \ldots$$

<Learning of Perceptual Adjective Model>

The exact same technique as in the first embodiment was used to determine the linear combination parameters.

Here, the applicant will once more summarize the explanation given up to here and further explain overall the theory for the derivation of the new concept. After that, the applicant will explain fifth to seventh embodiments for realizing this.

[1] Picture of Formulation of Perception
<Basic Concept>

The picture of formulation of perception can be considered as follows: Every image emits common energy elements for a certain perception. This is perceived by the brain.

<Shape Characteristics of Distribution Function>

Figure 13:
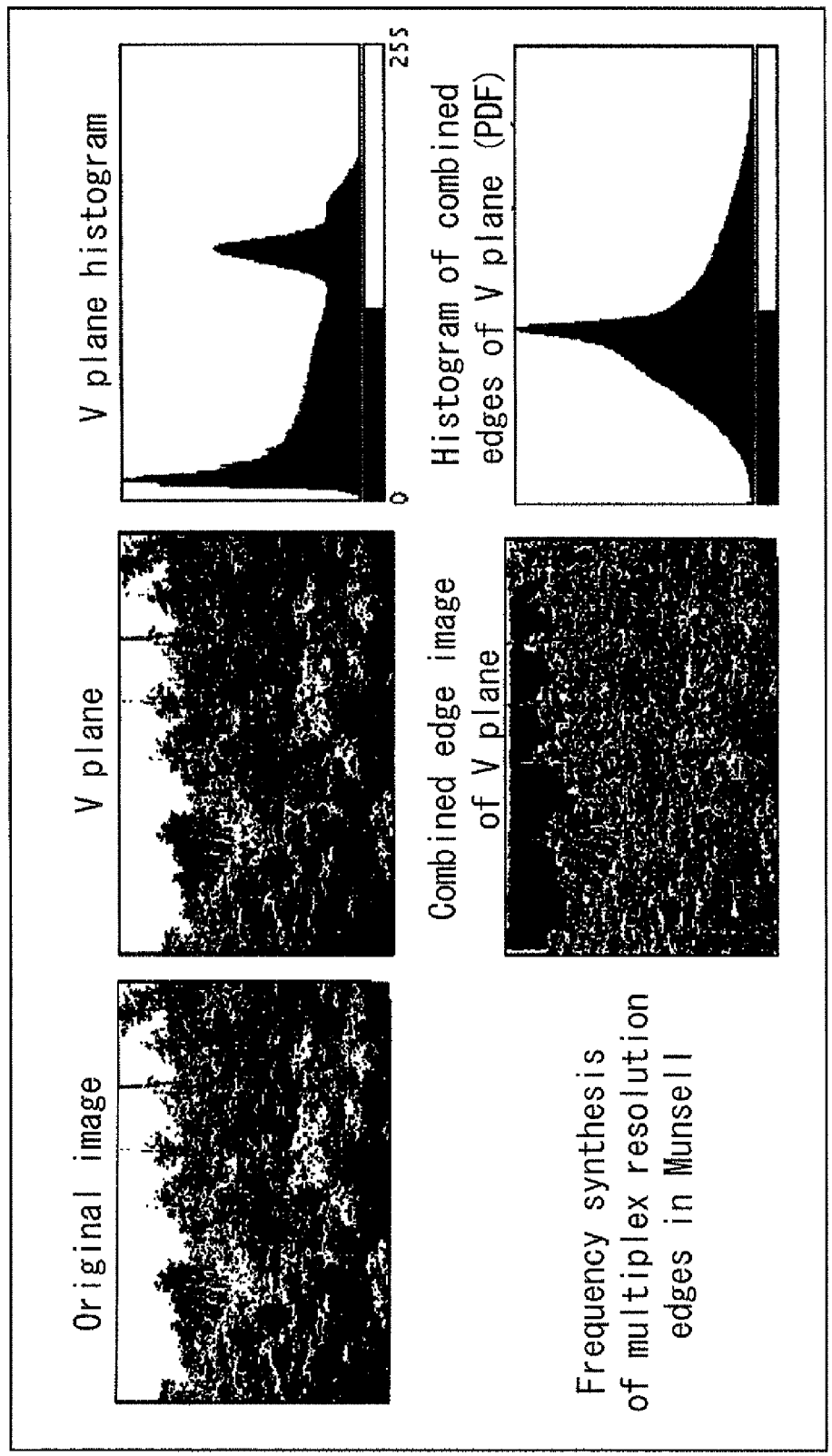
{FIG. 13} A diagram showing distribution functions of color and texture.

FIG. 13 is a view showing the distribution functions of color and texture. As explained up to here, the perception of an image and the shapes of the distribution functions are very deeply correlated. Vaguely similar shapes tend to give rise to the same perception. The applicant introduced physical techniques to quantify the shape recognition of these distribution functions.

<Quantum Mechanics Techniques>

The content explained up to here used quantum mechanics to attempt description. That is, it can be summarized as follows:

1) The distribution function f is projected into Hilbelt space to express the momentum p.
2) Group theory is used to construct additive energy $E_n$ of the quadratic form The method taken here actually also includes the introduction of concepts of quantum mechanics and description of the state taken by a many-body system of an image having a large number of pixels and a large number of levels by statistical mechanics through a distribution function f.

<Meaning in Statistical Physics>

The meaning of the above method of description is the transformation from a quantity of a microscopic property of the signal value $S(x,y)$ of an image to a quantity of a macroscopic property of perception. That is, by obtaining the statistical mean of the microscopic quantities, only the mechanical invariants of momentum, angular momentum, and energy remain as effective components. Among these in particular, by obtaining the statistical mean of the image group, only energy plays a role in characterizing the valid image system. Due to the action of the statistical group, the image system is summarized in information to the form of the structure of an energy band. By reducing the information volume of the image system in this way, microscopic properties are converted to macroscopic properties. The method of description of statistical mechanics plays a bridging role for description of the statistical properties.

Below, the state of reduction of information will be shown. The composition system is incomplete, but is described including predictions.

| Image signal $S(x, y)$ | Subsystem information $f(p, q)$ | Energy information |
|---|---|---|
| $\sim 10^{23}$ | Color: $(256)^3 \sim 10^7$ | $\sim 2000$ |
| | Texture: $(\pm 256)^3 \sim 10^8$ | $\sim 2000$ |
| | Composition: pixel number about $10^7$ | $(\sim 2000)$ |

Here, even if the variables p and q are comprised of the independent variables p1, p2, ..., pi, ..., q1, q2, ..., qi, ..., these are used as symbols representing the same.

<Description by Density Matrix of Quantum Statistics>

In mechanical description, it is necessary to consider what corresponds to the position coordinate q and the momentum p for an image signal $S(x,y)$. Before that, the applicant will explain the relation between an image system and quantum statistics.

Perception is an unknown hamiltonian system and handles a mechanical system formed by a statistical ensemble. As is known in statistical mechanics, there is no such thing as a wave function describing a macroscopic system as a whole (see Document E1). An image system also describes a macroscopic system.

A quantum mechanics-like description based on a set of incomplete data relating to a system is performed using a density matrix. A density matrix may be used to calculate the expected value of any quantity. The density matrix relating to the coordinates is expressed by $$\rho(q,q') = \Sigma_{m,n} w_{m,n} \psi_m^*(q') \psi_n(q)$$

If assuming that a subsystem relating to a certain aspect of an image is in a state completely described by a wave function $\psi$, the wave function $\psi$ can be expanded by a function $\psi_n(q)$ creating a complete system.

$$\psi = \Sigma_n c_n \psi_n$$

If inserting this into the formula of the density matrix, it is possible to derive a density matrix in an energy expression:

$$c_m^* c_n \rightarrow w_{mn}$$

The diagonal components of the density matrix expressed by the energy express the stationary state. The nondiagonal components express the nonstationary state. An image captures the dynamism of a certain instant. This is not always limited to a stationary state. Therefore, the energy level derived from a density matrix has to consider the nondiagonal components as well. This means that the description of the nondiagonal components is dependent on the method of selection of the wave functions describing the density matrix. Selection of the wave function system in which the stationary state of the diagonal components is described as compactly as possible is a suitable selection in describing perception. In statistical physics, usually the stationary state is considered, therefore the probability in the n-th stationary state is written as $w_n=w_{nn}$.

The statistical mean also calculates the expected value due to the stationary state. However, for the perception of an image, it is necessary to consider not only the stationary state, but also the nonstationary state. Therefore, the statistical mean must also calculate the expected value considering both the stationary state and the nonstationary state.

In dealing with the vagueness of perception of several image groups giving the same perception, in the description of perception, there is the method of obtaining the diagonal sum of all stationary states to thereby treat the stationary states as a single energy level state ($E_0$) and, further, for the nonstationary states as well, similarly obtaining the slanted sum of the nondiagonal components and thereby utilizing the energy level ($E_n$) of the extent of the distance from the stationary state to the nonstationary state for the description. The statistical distribution of the excitation probability to the energy level is expressed by $w_n=w(E_n)$. From a physical meaning, if the value of n becomes larger, it can be said that a more dynamic state of motion in the image system, that is, an image state in the process of change with a large energy transition width, is described. This discussion applies as is for definition in the process of constructing an energy matrix.

Note that if defining energy and expressing the density of states distribution by $\rho(E_n)$, together with the excitation probability $w(E_n)$ to the energy level, the actual probability distribution of the energy is expressed by $\rho(E_n)w(E_n)$.

[Document E] Landau and Lifshitz, Course of Theoretical Physics, Volume 5, "Statistical Physics Part 1" (Third Revised Edition, 1976), Chapter 1 "Fundamental Principles of Statistics", Chapter 2 "Thermodynamic Quantities", and Chapter 3 "The Gibbs Distribution"

[Document E1] Landau and Lifshitz, Course of Theoretical Physics, Volume 5, "Statistical Physics Part 1" (Third Revised Edition, 1976), Chapter 1 "Fundamental Principles of Statistical Physics", Section 5 "The statistical matrix"

[2] Regarding Relation Between Distribution Functions and Perception

<Subsystems and Distribution Functions>

In describing perception, it is important to find the statistical distribution for subsystems. The mechanical variables q of coordinates and p of momenta in perception are not limited to just single ones such as defined in mechanics. As a subsystem of perception, this is positioned as a system wherein, when projecting a certain aspect of an image to describe the property of the image, considerably highly independent aspects are captured.

As a major class of these aspects, the three axes of color, texture, and composition may be considered. However, the same image is used as the basis for projection, so these are not completely independent. However, in defining information of an image, if the distribution functions of these three aspects are defined, enough information is provided for description of the statistical properties.

Here, the applicant will stop at a simple description of the mechanical system, Furthermore, the applicant will consider a not completely independent method of description for when advanced description becomes necessary. In a certain sense, this is closely related to the relation between nonrelativistic descriptions and relativistic descriptions in physics. That is, in nonrelativistic descriptions, the position coordinate system and the spin coordinate system are described as completely independent systems, but in relativistic descriptions, differentiation is impossible. It is necessary to shift to a spinor description of a coordinate system of a mix of position coordinates and spin coordinates. The situation resembles this. These subsystems are individually described, then combined to describe the perception of the image system as a whole.

<Description of Distribution Functions and Mechanical Variables of Subsystems>

For each subsystem, the image variables corresponding to the mechanical variables of the position coordinate q and the momentum p are defined differently. Color expresses the distribution of signal values having an interval width of "zero to a positive finite value" and describes the distribution of the original signal itself, so a function satisfying the linear differential equation suitable for that description is any function included in hypergeometric functions. Texture expresses the distribution of the signal values having an interval width distance of a "negative finite value to a positive finite value" extracting the edge components and describes the distribution of another aspect minus one of the types of information of the original signal, so a function satisfying the linear differential equation suitable for that description is any function included in confluent hypergeometric functions. The composition expresses the distribution of the two-dimensional signal values having an interval width of a "zero to a positive finite value" and describes the distribution of the original signal itself, so a function satisfying the linear differential equation suitable for that description is any function included in hypergeometric functions.

A system described by a hypergeometric function and confluent hypergeometric function can be considered to obtain a grasp of subsystems with different aspects. That is, a hypergeometric function, which is expressed by a differential equation having three singular points, is suitable for expressing the distribution of the signal values of an image. As image signals arriving at the argument of the distribution function, image signals comprised of values of zero or more like pixel values are suitable for description of properties which may be homogeneously distributed. On the other hand, a confluent hypergeometric function, which is expressed by a differential equation having two singular points among these converged to one point and thereby having a total of two singular points, is suitable for describing aspects where the amount of information relating to a signal of an image is reduced by one. As image signals arriving at the argument of the distribution function, image signals straddling positive and negative values such as edge signal values where one piece of information is dropped by a differentiation operation are suitable for description of properties localized near zero.

<Picture of Variable Separation of Mechanical Variables>

The aspects of a subsystem of an image are described by drawing a picture corresponding to a coordinate system with variable separation in the description of physical particles in physics. One hypergeometric function suitable for description of the one-dimensional distribution function of color is a Chebyshev function. This function forms a complete system by a single series of an even function and an odd function, so if grasping the even function as the angular momentum 0 and the odd function as the angular momentum 1, it is possible to consider that it describes the spin coordinate of a spin 1 of the same Bose particles as light. Therefore, the one-dimensional distribution function of color can be considered to describe a spin-type wave function among the wave functions.

One confluent hypergeometric function suitable for description of the one-dimensional distribution function of texture is the spherical Bessel function. Among the radial direction wave functions normally defined in a positive region, a spherical Bessel function is the only function among Bessel functions which enable expanded definition to the negative region. Therefore, the one-dimensional distribution function of texture can be grasped as describing a radial direction wave function among the wave functions. A radial direction wave function can be described by the double series of two series relating to the order and root of even functions and odd functions, so it is possible to assign angular momentums 0, 1, 2, 3, . . . from the smaller ones up. These can be linked with what are called the s, p, d, f, . . . orbits in atomic orbits.

As hypergeometric functions suitable for description of the two-dimensional distribution functions of composition, associated Legendre functions or the composite products of these with Fourier functions, that is, spherical harmonics, may be considered. Therefore, the two-dimensional distribution function of the composition can be considered to describe a wave function corresponding to the two-dimensional coordinates of the zenith angle and azimuth angle in a spherical coordinate representation.

<Set of Observation Data and Distribution Functions>

A certain aspect of the image information is described by the distribution function f(p,q). The relationship between the data observed as image information and distribution functions is as follows. That is, the relationship is like color: a distribution function taking the histogram and eliminating information relating to the pixel positions, texture: a distribution function taking the histogram of the aspects of the edges and eliminating information relating to the pixel positions, and composition: a distribution function taking the area mean and reducing the number of pixels, that is, information relating to the pixel positions. If combining these three distribution functions, the statistical nature of the image S(x,y) is substantially accurately reflected. The probability of separate images differing in impression being expressed by the same values is low. Here, it cannot be said across the board that what are called pixel positions correspond to the position coordinates q of the mechanical variables p and q. The fact that correspondence can be defined for two spaces each for color and texture will be explained below.

<Coordinate Space and Momentum Space>
(A) Aspects of Lower Order Space
(A-1) Color The Munsell color space can be viewed as a momentum space expressing the strength distribution of color.

Color histogram=$f_1(p)$ (A-2) Texture

The color space of HVC color planes of an edge image synthesizing multiplex resolution edges can be viewed as a momentum space expressing the strength distribution of the edges.

Texture PDF=$f_3(p)$ (B) Aspects of Higher Order Space
(B-1) Color

When converting a color histogram by Chebyshev conversion, the original color histogram side can be viewed as the position coordinate q and the Chebyshev expansion coefficient side can be viewed as the momentum p. It is necessary to express the probability density as the distribution function projected in a higher order momentum space. A negative value will not be taken, so the expansion coefficient side becomes a power spectrum of the coefficient multiplied by itself.

Color histogram=$f_2(q)=f_1(p)$

Chebyshev spectrum=$f_2(p)$ (B-2) Texture

When converting a texture PDF by spherical Bessel conversion, the original PDF side can be viewed as the position coordinate q, while the spherical Bessel expansion coefficient side can be viewed as the momentum p. As a distribution function of the higher order momentum space, a power spectrum is taken.

Texture PDF=$f_4(q)=f_3(p)$

Spherical Bessel spectrum=$f_4(p)$

Figure 14:
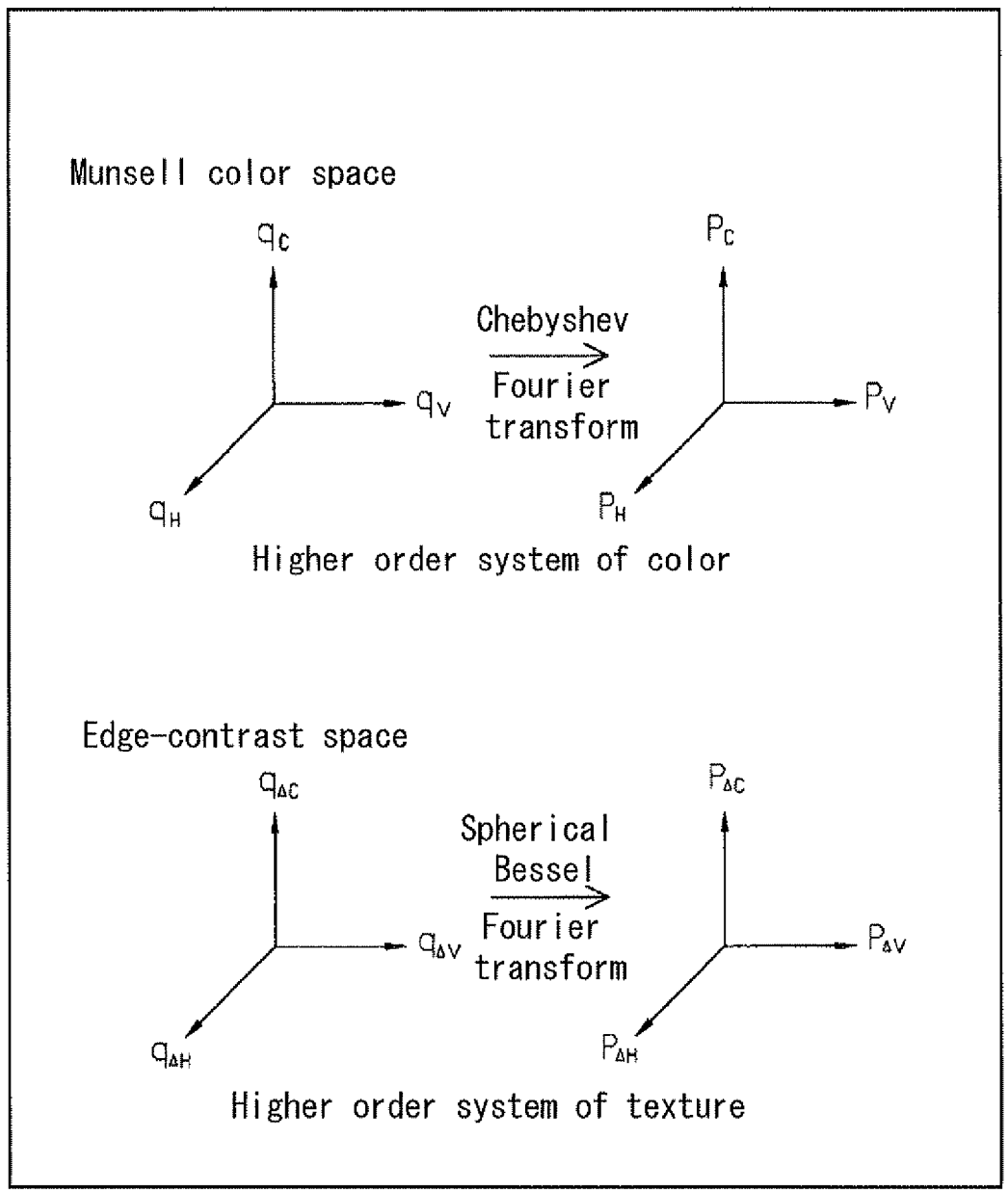
{FIG. 14} A conceptual diagram showing a high order momentum space in a case applying a Fourier transform.

FIG. 14 is a conceptual view for facilitating the understanding of the relationship among these. These distribution functions are used for calculation of the entropy of the subsystems defined later. Note that when creating a quadratic form by energy construction, unlike the description of mechanical energy at the usual Cartesian coordinates (x,y,z) (($p_x^2+p_y^2+p_z^2)/(2m)$), in addition to the correlation inside the color planes corresponding to this, there is meaning in creating elements of correlation between color planes for evaluation. This is because Munsell HVC are not completely independent components. However, the Munsell HVC color space is designed as a uniform color space becoming uniform for psychological quantities, so there is no need for coefficients between second order terms of these.

<Two Meanings Relating to Statistical Mean>

There are two meanings to the statistical mean for deriving the statistic properties of an image system. That is, one is the point of the vast amount of information on the color, texture, and composition becoming reduced to a macroscopic quantity by the statistical mean. Further, another is that in the sense that a large number of model image groups give the same perception, obtaining the image group mean gives a definite value.

The former simultaneously includes a quantum mechanics-like averaging operation and a statistics-like averaging operation accompanying the process of conversion from a microscopic quantity to a macroscopic quantity. The latter is positioned as including a statistics-like averaging operation which determines a quantity corresponding to the mean value of the fluctuation of a macroscopic quantity so as to finally determine the statistical property. Therefore, the former creates signals working macroscopically on the brain through the visual system, while the latter performs the role of determining the average-like elements of distribution of actions in the brain of the sensation received by a person.

[3] Description of Perception and Gibb's Distribution
<Fluctuations in Energy Due to Image Ensemble>

The method of finding the statistical properties of common perceptions of a large number of image ensembles corresponds to the Gibb's distribution (canonical distribution) of statistical physics. That is, this is a method of description of a system considering the fluctuation of energy. On the other hand, the method of describing the statistical properties of one image corresponds to a micro-canonical distribution. This is a method of description of a system ignoring the fluctuation of energy.

The momentum and angular momentum of a closed system (single image) is related to uniform translation and uniform rotation of the system as a whole. They do not describe the statistical properties of the system. However, they have meaning in the sense of differentiation from the uniform translation and rotation of another image. That is, if adopting a coordinate system in which the translation and rotation of the closed system of one image are at rest, then what determines the statistical properties of one image would be only the energy. When described by a common coordinate system with other images, these image groups will differ in momentum and angular momentum as well, so they will be recognized as different images. However, when describing the macroscopic property, that is, perception, common to a large number of images, the momentum and the angular momentum are information disappearing to a mean zero or constant value when the amount taken by the statistical mean of the image ensemble increases.

<Description of Vagueness of Perception and Phase Space>

Figure 15:
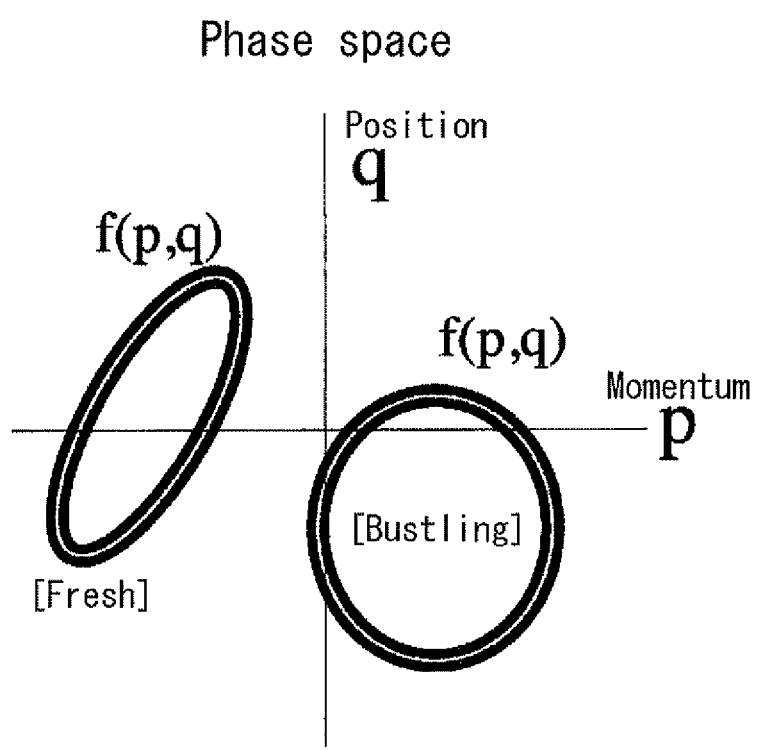
{FIG. 15} A diagram showing a perceptual group in a phase space.

FIG. 15 is a picture showing perception groups in a phase space. The description of perception is also an issue of how to quantitatively describe vagueness. As a picture of a statistical physics-like method of description, it is considered that the orbit of a phase space where a distribution function satisfies certain conditions describes a state distribution calling up the same perception. The "certain conditions" express the orbit on the phase space where the condition of the mechanical invariant of energy being constrained to a certain value is satisfied. The vagueness of perception is described as a set of images with distribution functions which can take various states, but which are on orbits in a blurred range on the same phase space. That is, even if the individual energy elements derived from distribution functions are not the same, if the sum of these satisfy the same condition, it is considered that the same perception is called up. Further, this has fluctuation of energy, so corresponds to a group of perceptions with the same trajectories of constant widths on the phase space. This state is drawn so as to spread by the bold lines in FIG. 15.

In general, the log of a distribution function is the integral of the mechanical invariant of motion. It is described by the integral of additive motion. That is, a distribution function of a composite system expressing the probability of the distribution function of one subsystem and the distribution function of another subsystem simultaneously taking that state is expressed by a product of the distribution function of the subsystem and the log of that has an additive property. The integral of such additive motion, as known in mechanics, corresponds to only energy, momentum, and angular momentum. Therefore, the log of a distribution function can be described by a linear combination of the constant term $\alpha$ and the constant coefficients $\beta$, $\gamma$, and $\delta$ relating to the same (see Document E2=Document A3).

[Document E2] Landau and Lifshitz, Course of Theoretical Physics, Volume 5, "Statistical Physics Part 1" (Third Revised Edition, 1976), Chapter 1 "Fundamental Principles of Statistical Physics", Section 4 "The significance of energy"

<Phase Space Orbit of Small-Number Model>

When the population images of an image ensemble calling up the same perception are statistically sufficiently large in number, the constraining condition becomes only energy. This is derived from the fact that in the description of statistical properties, only energy remains as the only additive motion integral (see Document E2=Document A3).

However, when these are small in number, as the impressions of the corresponding perception, a further stronger constraining condition matching the fine distribution state of these small number of models becomes necessary. The factors playing a role as additional constraining conditions for this are the other mechanical invariants of momentum and angular momentum. The orbits on a phase space where, in addition to energy, momentum and angular momentum also satisfy certain conditions become the range of distribution having a perceptual action common to these small-number model images. As the extreme of a small-number model, there is a single image similar image retrieval.

<Representation of Momentum and Uncertainty Principle>

Figure 16:
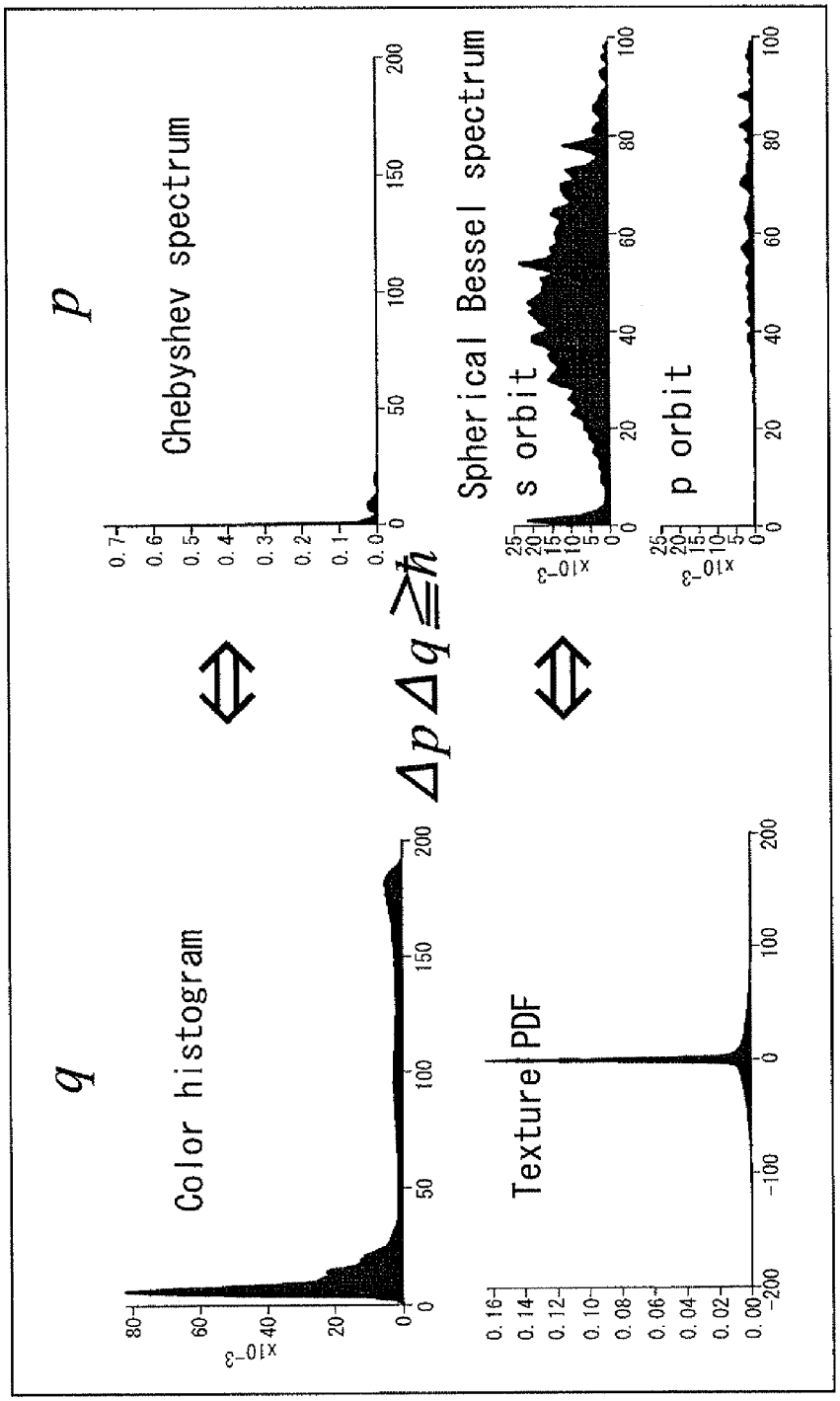
{FIG. 16} A diagram explaining a relationship in which the relationship between a position and momentum is uncertain.

FIG. 16 is a view for explaining the state where the relationship between position and momentum satisfies the uncertainty principle by projection into the higher order space relating to the color and texture of an image system. That is, as in the case of the texture PDF illustrated in FIG. 16, if there is a sharp peak relating to the position and the certainty precision of the position coordinates is high, if trying to realize that waveform in a momentum space transformed by a spherical Bessel Fourier transform, this cannot be achieved unless broadly superposing all sorts of frequencies in large numbers, so momentum becomes uncertain and an extremely broad distribution. On the other hand, as in the case of the color histogram illustrated in FIG. 16, when the momentum space of the Chebyshev Fourier spectrum is expressed extremely concentratedly, if expressing this in real space, the wave of a certain frequency, in this case, a low frequency wave, will be spread broadly over the entire space in the distribution expressed. Therefore, the position will become uncertain and the spread large. That is, it can be said that the relationship describes the fact that even in an image system, if attempting frequency analysis, so long as no waveform of a sufficient interval width is found in real space, the frequency component contained there will no longer be able to identified.

The uncertainty relation that it is not possible to simultaneously realize by certain widths or more a wave function at position and a wave function at momentum through the concept of a Fourier transform extended between position and momentum is none other than the principle of uncertainty discussed in quantum mechanics. This principle of quantum mechanics is explained in for example Document F1.

The value of the Planck's constant h, in an image system, is related to the concepts of a bin of a histogram defining the tone width in relation to the quantization of the tone direction and of 1 pixel defining the pixel interval in relation to the quantization of the space direction. Therefore, if reducing the number of tones of the image system and generating a reduced image, the value of Planck's constant has to be changed to match with the method of quantization of the system and changes depending on the situation considered. This point differs from the situation of handling uniformly for the entire system regardless of the subsystem such as with physical constants. However, the Planck's constant in an image system is treated as an intrinsic value in the subsystem with the defined quantization width projecting a certain aspect.

[Document F1] Landau and Lifshitz, Course of Theoretical Physics, Volume 3 "Quantum Mechanics (Non-Relativistic Theory)," (Third Revised Edition, 1977), Chapter 2 "Energy and Momentum," Section 16 "Uncertainty relations."

<Phase Space and Quantum Statistics>

The orbit in a phase space, a basic concept in statistical physics, enables the introduction of the concept of the number of states as a quantum mechanical approach. Image perception can be quantified by the number of states of a quantity observed from an image or the density of states defining these and expressing the density.

In quantum theory, in a phase space, if it becomes possible to define the number of quantum states of the amounts of uncertainty of both momentum and coordinates divided by the Planck's constant, as a macroscopic property, the concept of entropy, which is an additive quantity expressed by its log, inevitably statistically appears. Through this concept of entropy, the level density of the energy spectrum of a macroscopic system is determined. This is theoretically grounded in statistical physics. The fact that, along with the increase in the number of particles (here, in an image system, corresponding to the number of pixels or the number of tones), the level interval exponentially declines and a continuous energy band structure results, can be explained (see Document E3).

The applicant engaged in actual experiments to calculate the continuous energy levels $E_n$. As a result, an image array relating to energy elements exhibiting almost similar properties was found with the adjoining energy levels. For images of certain properties among these, a switch in order began which reached far distances in the distribution of the energy elements. If looking at the state of this property in order from one end to another of the energy level, at the high energy level, an image array of completely different properties from the low energy level is obtained. This shows the property of an energy band structure of the states between levels not being able to be differentiated as the energy level density is made higher. Note that relating to the Boltzmann constant linked with the relationship of entropy and the Planck's constant as well, this can be treated as an intrinsic value in a subsystem projecting a certain aspect, but in general the definition differs between different subsystems.

[Document E3] Landau and Lifshitz, Course of Theoretical Physics, Volume 5, "Statistical Physics Part 1" (Third Revised Edition, 1976), Chapter 1 "Fundamental Principles of Statistical Physics", Section 7 "Entropy"

<Statistical Ensembles and Band Structure of Energy Levels>

This is attributable to the abnormal fineness of the level distribution in a spectrum of energy eigenvalues of a macroscopic body (here, an image) (see Document E1). Therefore, an image system is reduced in information in the form of the structure of an energy band.

Here, the similarity between the theoretical structures of physicality and perception will be explained. The difference of the properties of pure iron and iron alloys is expressed as a difference of the electron energy band structures (see Documents G1, G2, and G3). Alternatively, how the differences in properties of the ferromagnetic materials of iron, nickel, and cobalt arise can be described by elucidating the electron structures. The same applies for the differences between paramagnetic metals and ferromagnetic metals and the differences in properties of the paramagnetic metals of aluminum, copper, etc. Further, the types of substances includes 118 types of elements when alone and also their compounds and alloys etc. The number ranges from the thousands to ten thousand or more in order. For example, if calculating the number of combinations of two to three elements among these 118 elements, this order of a number is obtained. The number of elements and the basis of their properties are defined by the radial direction wave function s, p, d, f orbits which can exist as atomic orbits and the degeneracy number of the states.

Similarly, there are 473 representative perceptual adjectives in Japanese expressing color emotions. It may be considered that there are similarly thousands to ten thousand or more classes of feelings in the mind which cannot be classified by these words but are slightly different. The meanings of these 473 representative words do not always clearly differ in meanings. There are many expressions which express fine differences. For example, for "bustling", there are the different expressions "busy", "flowery", and "flourishing". On the other hand, there are also groups of adjectives which are considerably different in main class such as "refreshing" and "bustling". In this way, adjectives have a duality of main classes and fine classes.

Such a property of duality also exists in the properties of substances. For example, if looking at the Periodic Table of Elements, at the top in the vertical axial direction, there are light electron systems with radial direction wave functions packed in the order of the "s" orbit and "p" orbit, at the middle region, there are transition metal systems with "d" orbits packed, and at the bottom, there are heavy electron systems with "f" orbits packed, while in the horizontal direction, elements with degeneracy number of electrons of these orbits differing by one each are arranged. As the properties of the substances, elements present in the same column in the vertical direction exhibit extremely similar properties chemically. Elements exhibit close properties even when present adjoining in the horizontal direction. When these substances aggregate as a large ensemble extending as solids to the Avogadro's Number (~10 ^23), they statistically take an energy band structure. Large differences in properties and small differences in properties can be expressed as the differences in the density of states distribution.

Therefore, for perception as well, description by such an energy band model is the optimum method of expression. Note that if expressing the duality of adjectives on a phase space, perceptions which differ in major classes are considered to express differences in state distributions between ones which largely differ in orbit, while perceptions which differ only in fine classes are considered to express difference in state distributions between ones which are considerably close in orbits.

[Document G1] Masako Akai, Hisazumi Akai and Junjiro Kanamori, "Electronic Structure of Impurities in Ferromagnetic Iron. I. s, p Valence Impurities," Journal of Physical Society of Japan, Vol. 54, No. 11, November, 1985, pp. 4246-4256.

[Document G2] Masako Akai, Hisazumi Akai and Junjiro Kanamori, "Electronic Structure of Impurities in Ferromagnetic Iron. II. 3d and 4d Impurities," Journal of Physical Society of Japan, Vol. 54, No. 11, November, 1985, pp. 4257-4264.

[Document G3] Masako Akai, Hisazumi Akai and Junjiro Kanamori, "Electronic Structure of Impurities in Ferromagnetic Iron. III. Light Interstitials," Journal of Physical Society of Japan, Vol. 56, No. 3, November, 1987, pp. 1064-1077.

[4] Description of Macroscopic Quantities

<Picture Model of Energy Level>

It is possible to define energy based on the definitions of momentum and position in respective subspaces defined by projections into subsystems. Further, it is also possible to define the other mechanical invariant of angular momentum. As the methods of construction of energy, the case of projection into a lower order subspace and the case of projection into a higher order subspace are introduced for the principal axes of perception. In the case of projection to a lower order subspace, the method is adopted of proposing a model Hamiltonian of energy. In the case of projection to a higher subspace, the method is adopted of constructing an energy matrix and defining energy eigenvalues form the stationary state to the nonstationary state.

The energy level in a lower order subspace captures the energy of the field created by the mean field approximation of statistical physics as a discrete energy level. That is, discrete scalar invariants are constructed. The energy level in a higher order subspace captures the process of gradual separation from the stationary state of diagonal components of an energy matrix to the nonstationary state of nondiagonal components as a continuous energy level. That is, continuous vector invariants are constructed.

<Lower Order Invariants of Color>

Consider that the Munsell H, V, and C values themselves express momentum.

The model hamiltonian is constructed as follows.

$$H=(H+V+C)^2$$

This expresses the mechanical energy expressing the strength of the value of color. Alternatively, it expresses the energy of the field.

For the equation $$H|\psi_n> = E_n|\psi_n>$$

the energy eigenvalues $E_n$ are found.

In calculating the energy eigenvalues, mean field approximation of statistical physicals is used.

Momenta are broken down into the mean terms and the fluctuation terms. The fluctuation terms are also described by the mean fluctuation. That is, as the fluctuation terms, the standard deviations are taken. They has the same dimension of momentum p as the mean values.

$$\sqrt{<(H-<H>)^2>} \sim = \sigma_H$$

$$\sqrt{<(V-<V>)^2>} \sim = \sigma_V$$

$$\sqrt{<(C-<C>)^2>} \sim = \sigma_C$$

The mean values and standard deviation values of these momenta are found from the distribution function f(p) expressing the momentum distribution. That is, they are found from the color histograms f(H), f(V), and f(C) of H, V, and C.

$$\begin{aligned} H &= (H+V+C)^2 \\ &= ((<H>+(H-<H>)+(<V>+(V-<V>)+ \\ &\quad <C>+(C-<C>))^2 \\ &\sim = ((<H>+\sigma_H)+(<V>+\sigma_V)+(<C>+\sigma_C))^2 \\ &= (<H><H>+<V><V>+<C><C>)+ \\ &\quad 2(<H><V>+<V><C>+<C><H>)+ \\ &\quad 2(<H>\sigma_H+<V>\sigma_V+<C>\sigma_C)+ \\ &\quad 2(<H>\sigma_V+<V>\sigma_C+<C>\sigma_H)+ \\ &\quad 2(\sigma_H<V>+\sigma_V<C>+\sigma_C<H>)+ \\ &\quad (\sigma_H\sigma_H+\sigma_V\sigma_V+\sigma_C\sigma_C)+ \\ &\quad 2(\sigma_H\sigma_V+\sigma_V\sigma_C+\sigma_C\sigma_H) \end{aligned}$$

In this way, elements derived as quadratic forms resembling a hamiltonian in mean field and fluctuation field correspond to the energy elements one to one and create discrete energy levels. Depending on the individual image, the values taken by these energy elements will differ, but between image groups having a certain perception, certain energy elements act as factors acting strongly in common. This can be seen if investigating the distribution of image groups.

In general, as will be understood if obtaining the color histogram of an image, the distribution of momentum has a strong fluctuating nature of changing extremely randomly depending on the image. Even if taking the statistical mean for an image group having the same perception, elements of common factors will not remain much at all. However, if observing the distribution in the state of the form of energy of the quadratic form, factors acting in common in an image group having the same perception easily remain. For example, the image of "killer scenery" has a high probability of having a mean value <V> and mean chroma <C> of simultaneously small values. The mechanical energy of <V><C> often exhibits a small value. However, in a certain case, sometimes the value of <V> appears large. At this time, the <C> side exhibits a smaller value resulting in a balance. At this time, if separately obtaining the statistical means for <V> and <C>, the momentum means of these will easily end up disappearing as information in the mean values of general images. This state is shown below.

| Momentum p | | Energy $E_n$ |
|---|---|---|
| Histogram H | Statistical mean | <V><C> |
| Value V | => | <V><V> |
| Chroma C | Residual information | <H>$\sigma_V$ |
| | | $\sigma_C\sigma_C$ |
| | | ... |
| (Random distribution) | | (Simultaneous sorting) |

1) Momentum

As the elements $p_n$ of momentum, the following may be mentioned.

<H>,<V>,<C>,$\sigma_H,\sigma_V,\sigma_C$

Note that the parts of σ may also be treated as elements $M_n$ of angular momentum.

2) Energy

As the elements $E_n$ of energy, the following may be mentioned. Regarding the energy elements $E_n$, different types of energy elements are calculated, so as symbols for differentiating these, the following abbreviation symbols are used to express their states. For the α-plane, the symbol "a" is used, for the β-plane, the symbol "b" is used, for the mean value, the symbol "m" is used, and for the standard deviation value, the symbol "s" is used.

(α)(α)

amam:<H><H>,<V><V>,<C><C>, amas:<H>$\sigma_H$,<V>$\sigma_V$,<C>$\sigma_C$, asas:$\sigma_H\sigma_H,\sigma_V\sigma_V,\sigma_C\sigma_C$, (α)(β)

ambm:<H><V>,<V><C>,<C><H>, ambs:<H>$\sigma_V$,<V>$\sigma_C$,<C>$\sigma_H$, asbm:$\sigma_H$<V>,$\sigma_V$<C>,$\sigma_C$<H>, asbs:$\sigma_H\sigma_V,\sigma_V\sigma_C,\sigma_C\sigma_H$ Regarding the lower order invariants of color, if considering the points to watch described below, the term accompanying <H> is separated into two elements. Therefore, as the energy elements of the lower order invariants of color, 21+5=26 types of scalar invariants are derived. These respectively correspond to the discrete energy levels $E_n$ and express the values of $E_n$ themselves. These are macroscopic quantities reduced by the lower order subsystem of color.

3) Special Matters in Case of Lower Order Invariants of Color

The hue H is expressed by the neutral N and other hue circle H(≠N) when converted to a Munsell color space. The distribution function f(H), as explained in the first embodiment, uses histograms divided into hue circle histogram bins and N histogram bins. Further, when calculating the mean value by the hue circle, in the same way as defining the starting point of the hue circle at the time of the Chebyshev expansion in the first embodiment, a cut is made at the point in the hue circle where the distribution function becomes smallest. In the region smaller than that value, the value is extended large to secure the region in the form of adding the value of the $2\pi$ angular component to the end up at the largest value side of the angle of the hue circle and the mean Munsell hue value is calculated on that axis. When that value exceeds the range of original Munsell hue values, a value corresponding to the $2\pi$ angular component is subtracted to restore the original.

To express the hue circle, <H> is divided into two components by complex number expression so as realize the description. Further, at this time, the neutral part remaining in the hue circle expresses the ratio after subtracting the neutral component remaining at the hue circle due to the size of the absolute value of the complex number.

$$<H>=(1-\text{pop}(N))\exp(2\pi i <H(\neq N)>/100)$$

$\sigma_H$ is the spread width for only the distribution functions in the hue circle. Therefore, it remains a single component. These strengths are also linked with the size of the absolute value of <H> and are evaluated by multiplication of the frequency ratio remaining at the hue circle. That is, when all flow into neutral, it is defined that $\sigma_H$ becomes zero in all cases.

$$\sigma_H = (1-\text{pop}(N))\sigma_{H(\neq N)}$$

<Lower Order Invariants of Texture>

As the edge plane expressing texture, the synthesized edge plane explained in the second embodiment obtained by converting the Munsell HVC planes by a multiplex resolution transform and synthesizing just the high frequency subband images by inverse transform is utilized. The edge strengths of the edge plane edges are expressed schematically as $\Delta H$, $\Delta V$, $\Delta C$ using the Laplacian symbol $\Delta$.

This time, consider that the values of the edge strengths $\Delta H$, $\Delta V$, and $\Delta C$ of the HVC planes express momentum.

The model Hamiltonian is constructed as follows:

$$H=(\Delta H+\Delta V+\Delta C)^2$$

This expresses the mechanical energy expressing the strength of the value of the edge components of color or the energy of the field.

The energy eigen values $E_n$ are found by mean field approximation in the same way as the time of the lower order invariants of color. The mean value and standard deviation value of momentum are found from the distribution function f(p) expressing the momentum distribution. That is, they are found from the histograms f($\Delta H$), f($\Delta V$), and f($\Delta C$) of the edge strengths of $\Delta H$, $\Delta V$, and $\Delta C$. The lower order invariants of texture are found by a similar procedure as with the lower order invariants of color.

1) Momentum

As the elements $p_n$ of momentum, the following may be mentioned.

$$<\Delta H>,<\Delta V>,<\Delta C>,\sigma_{\Delta H},\sigma_{\Delta V},\sigma_{\Delta C}$$

Note that the parts of $\sigma$ may also be treated as elements $M_n$ of angular momentum.

2) Energy

As the elements $E_n$ of energy, the following may be mentioned. Regarding the energy elements $E_n$, different types of energy elements are derived, so as symbols for differentiating these, the following abbreviation symbols are used to express their states. For the $\alpha$-plane, the symbol "a" is used, for the $\beta$-plane, the symbol "b" is used, for the mean value, the symbol "m" is used, and for the standard deviation value, the symbol "s" is used.

amam:<$\Delta H$><$\Delta H$>,<$\Delta V$><$\Delta V$>,<$\Delta C$><$\Delta C$>, amas:<$\Delta H$>$\sigma_{\Delta H}$,<$\Delta V$>$\sigma_{\Delta V}$,<$\Delta C$>$\sigma_{\Delta C}$, asas:$\sigma_{\Delta H}\sigma_{\Delta H},\sigma_{\Delta V}\sigma_{\Delta V},\sigma_{\Delta C}\sigma_{\Delta C}$, $(\alpha)(\beta)$ ambm:<$\Delta H$><$\Delta V$>,<$\Delta V$><$\Delta C$>,<$\Delta C$><$\Delta H$>, ambs:<$\Delta H$>$\sigma_{\Delta V}$,<$\Delta V$>$\sigma_{\Delta C}$,<$\Delta C$>$\sigma_{\Delta H}$, asbm:$\sigma_{\Delta H}$<$\Delta V$>,$\sigma_{\Delta V}$<$\Delta C$>,$\sigma_{\Delta C}$<$\Delta H$>, asbs:$\sigma_{\Delta H}\sigma_{\Delta V},\sigma_{\Delta V}\sigma_{\Delta C},\sigma_{\Delta C}\sigma_{\Delta H}$, As the energy elements of the lower order invariants of texture, 21 types of scalar invariants are derived. These respectively correspond to the discrete energy levels $E_n$ and express the values of $E_n$ themselves. These are macroscopic quantities reduced by the lower order subsystem of texture.

3) Special Matters in Case of Lower Order Invariants of Texture

The edge components of a hue plane are assumed to take the edges of the color plane expressed by a Munsell value taking the 0 point as the origin of the hue circle at all times. The reason is that, experimentally, it was learned that rather than changing the cut point of the hue circle to the point where the distribution function becomes smallest for each image, fixed observation at the origin of the Munsell value the same as the spectrum distribution of a rainbow color is preferable for the edges of the hue plane. Further, neutral is not treated separately. It is made the hue plane distributed at any point of the hue circle. Accordingly, the neutral component acts like random noise on the hue plane.

<Higher Order Invariants of Color>

The distribution function of color is expanded by Chebyshev expansion. The variable x takes values of H, V, and C.

$$f^{(\alpha)}(x) = \sum_{n=0}^{2N-1} c_n^{(\alpha)} T_n(x) \quad \{\text{Math. 44}\}$$

$$(\alpha) = H, V, C_o$$

In deriving the mechanical invariants of momentum, angular momentum, and energy from a distribution function, the components enabling independent evaluation of shape are drawn out as much as possible for describing the shape of the distribution function. That is, in constructing the energy and angular momentum, the distribution function f(x) inverted axially to f(−x) is added to the consideration. In the case of color, the physical meaning of axial inversion corresponds to tone inversion. For this reason, the concept of angular momentum is introduced. That is, the base function group is divided into subgroups by the difference in properties of even functions and odd functions. The respective subgroups are assigned angular momentum quantum numbers.

In Chebyshev bases, the even number bases are even functions which satisfy the relationship of $\psi(-x)=\psi(x)$, while the odd number bases are odd functions which satisfy the relationship of $\psi(-x)=-\psi(x)$. Therefore, the even function group is assigned the angular momentum quantum number $l=0$, while the odd function group is assigned the angular momentum quantum number $l=1$. By axial inversion $x \to -x$, the odd number angular momentum quantum number base functions invert in sign, while the even number angular momentum quantum number base functions do not change in sign. Such a property relating to axial inversion of wave functions in angular momentum units is called "parity" in quantum mechanics. The base functions of the even functions have even parity and remain unchanged for axial inversion, while the base functions of the odd functions have odd parity and invert in sign for axial inversion.

If considering that this angular momentum quantum number describes a spin system, color describes a system of a spin angular momentum quantum number $s=1$. A Chebyshev function is defined by only a single series expansion. The even functions and the odd functions respectively describe the states of spin 0 and spin 1. By axial inversion, it is possible to create a state where the parity of the state of the spin 1 inverts. A Chebyshev function is suitable for description of the system of the Bose particles "spin 1".

When considering independent components, first the elements $p_n$ of momentum, the elements $M_n$ of angular momentum, and the elements $E_n$ of energy when not axially inverting the angular momentum describing the system are constructed, then approximately double the elements obtained by axially inverting the angular momentum are derived. At this time, when linearly combining all elements, the linear combination coefficients are derived from the viewpoint of whether they describe meaningful independent components. That is, when only the sign of an element changes, if changing the sign of the linear combination coefficient, the same system is described, so this is meaningless. In general, momentum falls under this category, but for angular momentum and energy, separate independent components can be derived. Giving a specific example, the number $2N$ of the expansion coefficients is made $2N$. That is, N is made 100.

1) Momentum

As the elements $p_n$ of momentum, the following may be mentioned.

$$c_n^{(\alpha)}$$

where, $(\alpha)=H, V, C$.

When $2N=200$, the number of elements of momentum, since there are three planes worth, becomes $200 \times 3 = 600$ 2) Angular Momentum Below, when considering $c_n$ divided into subgroups of angular momentum units, the expansion coefficients of the angular momentum quantum number $l=0$ are expressed as $c_{0n}$ and the expansion coefficients of the angular momentum quantum number $l=1$ are expressed as $c_{1n}$. Therefore, the number of elements of the expansion coefficients are divided into halves of N number of elements each. The numbers of the elements of the subgroup are assumed to be counted as $n=1, 2, \ldots, N$. As the elements $M_n$ of the angular momentum, the following may be mentioned.

$$0*(c_{01}^{(\alpha)}+c_{02}^{(\alpha)}+\ldots+c_{0N}^{(\alpha)})+1*(c_{11}^{(\alpha)}+c_{12}^{(\alpha)}+\ldots+c_{1N}^{(\alpha)})=(c_{11}^{(\alpha)}+c_{12}^{(\alpha)}+\ldots+c_{1N}^{(\alpha)})$$

where, $(\alpha)=H, V, C$.

When the angular momentum only exists up to $l=1$, the independent component becomes just the above mentioned "1". The reason is that the axis of angular momentum is inverted. This is because it only describes the same system as $$0*(c_{01}^{(\alpha)}+c_{02}^{(\alpha)}+\ldots+c_{0N}^{(\alpha)})-1*(c_{11}^{(\alpha)}+c_{12}^{(\alpha)}+\ldots+c_{1N}^{(\alpha)})=(c_{11}^{(\alpha)}+c_{12}^{(\alpha)}+\ldots+c_{1N}^{(\alpha)})$$

In this way, the first order sum of the odd function expansion coefficients can become a macroscopic parameter for evaluating the asymmetry of a distribution function. The classical definition of angular momentum is $M=r \times p$. If compared with this, the above definition obtains the product of the subsums of momentum in the coordinate space having the angular momentum quantum number of the Hilbert space coordinates as the distance from the origin to thereby describe the moment of the distribution function. The number of elements of angular momentum, since there are three planes' worth, becomes $1 \times 3 = 3$.

3) Energy

The product of the $\alpha$ plane and $\beta$ plane momenta is taken to construct the mechanical energy. The product $c_m^* c_n$ of momentum, in group theory, creates a matrix called a direct product or Kronecker product. Two systems of product matrices expressed by the same base functions can be broken down into two smaller dimension expressions by reducible expressions. That is, they can be broken down into symmetric product and antisymmetric product matrix expressions. A symmetric product energy matrix (i, k) can be constructed from the product of the ($\alpha$) plane and ($\alpha$) plane.

$$c_i^{(\alpha)} c_k^{(\alpha)} + c_k^{(\alpha)} c_i^{(\alpha)}$$

Further, symmetric product and antisymmetric product energy matrices (i, k) can be constructed from the product of the ($\alpha$) plane and ($\beta$) plane.

$$c_i^{(\alpha)} c_k^{(\beta)} + c_k^{(\alpha)} c_i^{(\beta)}$$

$$c_i^{(\alpha)} c_k^{(\beta)} - c_k^{(\alpha)} c_i^{(\beta)}$$

Note that these are all square matrices with exactly the number of base functions arranged vertically and horizontally.

To calculate the eigenvalues of the energy, the diagonal sum, that is, the trace, is taken. The stationary state energy eigenvalue is a pure diagonal sum. This is the energy element $E_n$ in the case where $n=0$, that is, $i=k$. To calculate the non-stationary state energy eigenvalues, an expanded trace obtaining the sum of the matrix elements separated from the diagonal components by exactly $n=i=k$ is defined. This differs from a normal trace, so the symbol Sp' is used. At this time, the number of elements taken by a trace is always defined to become the same as the number of elements of the diagonal sum. The group of base functions used for one of the products necessarily constructs base functions forming a complete system at one time. This is a requirement set as a rule when decomposing this to a symmetric product and antisymmetric product. For this reason, when performing an operation obtaining the sum for a group of matrix elements satisfying n=i−k, for the elements ending up sticking out at the ends of the matrix, if defining the size of the matrices or submatrices being considered as "N", the slanted sum is taken for exactly the remaining number of elements in the opposite region across the diagonal components in the matrices so that n+N=i−k. In this way, the energy elements $E_n$ are successively calculated. Note that specific examples were already given in the first embodiment and the third embodiment.

The number of energy elements is exactly the number corresponding to half of the expansion coefficients of the base functions for one energy matrix. The reason for making it half is that the components sticking out from the matrix are shifted by exactly a number equal to the matrix width and incorporated once more, so when these are successively smoothed, the result is a double definition, so it is effective to reduce them to half. That is, by obtaining an expanded trace, the two-dimensional matrix elements are reduced to numbers of energy elements of half of the number of one-dimensional elements forming the rows and columns.

Next, consider the state of inversion of the axis of angular momentum. The definitions of the above three energy matrices draw a picture of the front by the product of the front surface and front surface of the ($\alpha$) plane and ($\alpha$) plane and the ($\alpha$) plane and ($\beta$) plane. As opposed to this, by axially inverting one distribution function for this, it is possible to construct a back surface (−$\alpha$) plane or (−$\beta$) plane. By making one the front surface and the other the back surface when preparing a matrix product, it becomes possible to draw a picture of the back. Due to this, it becomes possible to derive the independent energy elements. That is, the concept of parity is introduced to construct the base functions of an independent combined system. Note that parity is a concept which does not appear in classical mechanics.

Here, from the product of the ($\alpha$) plane and (−$\alpha$) plane, symmetric product and antisymmetric product energy matrices (i,k) can be constructed.

$$c_i^{(\alpha)}c_k^{(-\alpha)}+c_k^{(\alpha)}c_i^{(-\alpha)}$$

$$c_i^{(\alpha)}c_k^{(-\alpha)}-c_k^{(\alpha)}c_i^{(-\alpha)}$$

Further, from the product of the ($\alpha$) plane and (−$\beta$) plane, symmetric product and antisymmetric product energy matrices (i,k) can be constructed.

$$c_i^{(\alpha)}c_k^{(-\beta)}+c_k^{(\alpha)}c_i^{(-\beta)}$$

$$c_i^{(\alpha)}c_k^{(-\beta)}-c_k^{(\alpha)}c_i^{(-\beta)}$$

The elements of these energy matrices construct energy matrices where the sign inverts like $c_k^{(-\alpha)}=-c_k^{(\alpha)}$ only when the k in $c_k^{(-\alpha)}$ corresponds to an odd function, while construct ones where the sign does not change like when $c_k^{(-\alpha)}=c_k^{(\alpha)}$ when the k corresponds to an even function. In this way, in taking a similar expanded trace as the matrix of the picture of the front in the matrix of the picture of the back inverted in sign at some of the elements, the independent components can be derived as individually appearing energy elements.

In obtaining the expanded trace of the energy matrix of the picture of the front and the expanded trace of the energy matrix of the picture of the back, two ways may be considered for the arrangement of the base functions when a subgroup can be defined by angular momentum. That is, the first is the method of arranging them in the order of the lowest angular momentum quantum number first.

$$\vec{\psi}=(\psi_{01},\psi_{02},\psi_{03},\ldots,\psi_{0N},\psi_{11},\psi_{12},\psi_{13},\ldots,\psi_{1N})=(\psi_1,\psi_2,\ldots,\psi_i,\ldots,\psi_{2N}) \quad \{\text{Math. 45}\}$$

The second is the method of arranging them in the order of the lowest principal quantum number first.

$$\vec{\psi}=(\psi_{01},\psi_{11},\psi_{02},\psi_{12},\psi_{03},\psi_{13},\ldots,\psi_{0N},\psi_{1N})=(\psi_1,\psi_2,\ldots,\psi_i,\ldots,\psi_{2N}) \quad \{\text{Math. 46}\}$$

If successively giving the $\psi_i$ one-dimensional indicator and creating a symmetric product and antisymmetric product $\psi_i\psi_k\pm\psi_k\psi_i$ as the two-dimensional matrix products, the i and k of the first term and the second term are switched across the diagonal components. If arranging these energy matrices one more time divided into submatrices in angular momentum units, the result becomes equivalent to obtain an expanded trace satisfying n=i−k in a submatrix. However, when expressing i and k using the two indicators of the angular momentum quantum number and the principal quantum number, in the case of the first method of arrangement, the i and k of the principal quantum numbers are expressed switched in the submatrix of the combination of the same angular momentum quantum number, but when employing the second method of arrangement, the expression becomes slightly different from that, so caution is required. That is, when exchanging i and k with elements of a submatrix present at a nondiagonal position of the same distance, when the $\psi_i$ side of the $\psi_i\psi_k$ of the first term is an angular momentum quantum number larger than the $\psi_k$ side, the principal quantum number of $\psi$ coming at the right side by exactly n=i−k has to be expressed as k+1 incremented by "1" from the principal quantum number at the $\psi_i$ side. After this, no matter with which method of rearrangement, an operation is performed for combining the elements in submatrix units between two submatrices with switched elements so as to obtain the submatrix expression.

It was learned experimentally that when creating the product of the ($\alpha$) plane and ($\alpha$) plane, the first method of arrangement is superior, while when creating the product of the ($\alpha$) plane and ($\beta$) plane, the second method of arrangement is superior. This assumes that the first method of arrangement treats different angular momentum quantum numbers as completely independent systems and means that in the same plane, this is satisfied by expansion of base functions of completely orthogonal systems. The other second method of arrangement expresses that even with different angular momentum quantum numbers, description by base functions of close principal quantum numbers can describe a state where these are closely interrelated. This is believed due to the fact that HVC planes do not describe completely independent systems.

As the method of combining such submatrices, it is necessary to take the sum among the submatrices so that the expanded trace smooths all base functions forming a complete system. That is, when the elements of momentum are divided into two subgroups of angular momentum quantum numbers comprised of a 0 and 1 system, the energy matrix can be considered divided into two submatrices expressing inherent states of angular momentum and two submatrices expressing mixed states of angular momentum. At this time, as the method of obtaining the expanded trace smoothing these for forming a complete system, there are the case of connecting the traces of two diagonal submatrices and the case of connecting the traces of two nondiagonal submatrices. Thinking about energy matrices in angular momentum units in this way clarifies the physical meaning. This situation can be shown schematically below:

{Math. 47}
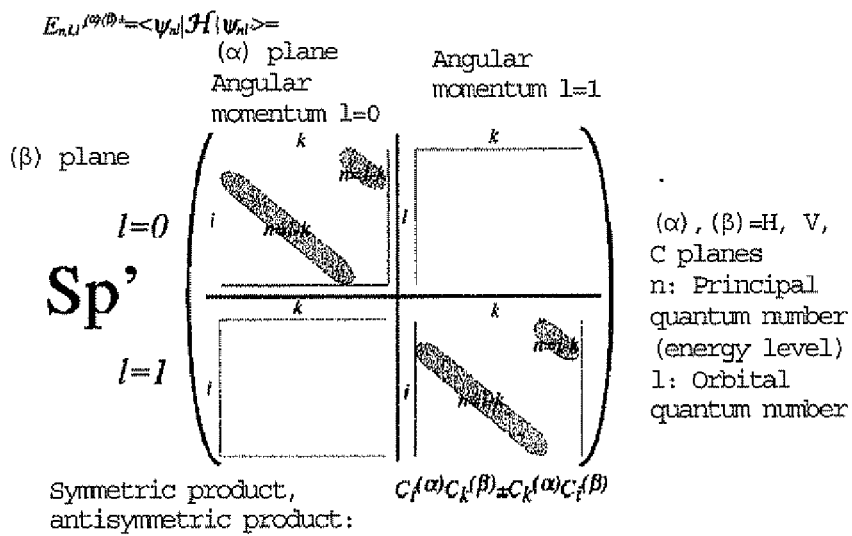

When the same suffix appears, the sum is taken for these. A specific example of the submatrix sum for actually dividing an energy matrix into angular momentum submatrices and combining the expanded traces will be shown. Below, this will be shown in the form of a combined system of two base functions forming a submatrix. The sum of one submatrix and another submatrix is also simultaneously shown. These submatrices are obtained by just replacing these base functions $\psi_{ik}$ with $c_{ik}$. Therefore, if each submatrix is defined by (i,k), to calculate the energy elements $E_n$, a trace is obtained for the matrix elements satisfying n=i−k in the respective submatrices.

Different types of energy elements are calculated in subgroup units executing traces for the energy elements $E_n$, so their states are expressed by the following abbreviated symbols as symbols for differentiating these. For the α plane, the symbol "a" is used, for the β plane, "b", for a combination of angular momentum of the inherent state of (l,l')=(0,0)+(1,1) the symbol 00, for the combination of angular momentum of the mixed state of (l,l')=(0,1)+(1,0), the symbol 01, for a symmetric matrix, the plus "p" symbol, for an antisymmetric matrix, the minus "m" symbol, for the standard state of the coordinate axis of the angular momentum, the "e" symbol, and for the inverted state of the coordinate axis of the angular momentum, the "i" symbol. For the coordinate axes of angular momentum, the standard state and inverted state are simultaneously described using the ± symbol. The axial inversion operation for angular momentum for describing the picture of the back is performed only on one base function forming the matrix, so only the odd functions at one color plane side are inverted in sign. The components which end up disappearing through these operations are not described (α)(α)

a0a0p,e/i:$\psi_{0i}^{(\alpha)}\psi_{0k}^{(\alpha)}+\psi_{0k}^{(\alpha)}\psi_{0i}^{(\alpha)})\pm(\psi_{1i}^{(\alpha)}\psi_{1k}^{(\alpha)}+\psi_{1k}^{(\alpha)}\psi_{1i}^{(\alpha)})$ a0a1p,e:$(\psi_{0i}^{(\alpha)}\psi_{1k}^{(\alpha)}+\psi_{0k}^{(\alpha)}\psi_{1i}^{(\alpha)})+(\psi_{1i}^{(\alpha)}\psi_{0k}^{(\alpha)}+\psi_{1k}^{(\alpha)}\psi_{0i}^{(\alpha)})$ a0a1m,i:−$(\psi_{0i}^{(\alpha)}\psi_{1k}^{(\alpha)}-\psi_{0k}^{(\alpha)}\psi_{1i}^{(\alpha)})+(\psi_{1i}^{(\alpha)}\psi_{0k}^{(\alpha)}-\psi_{1k}^{(\alpha)}\psi_{0i}^{(\alpha)})$ (i≠k)

(α)(β)

a0b0p,e/i:$(\psi_{0i}^{(\alpha)}\psi_{0k}^{(\beta)}+\psi_{0k}^{(\alpha)}\psi_{0i}^{(\beta)})\pm(\psi_{1i}^{(\alpha)}\psi_{1k}^{(\beta)}+\psi_{1k}^{(\alpha)}\psi_{1i}^{(\beta)})$ a0b0m,e/i:$(\psi_{0i}^{(\alpha)}\psi_{0k}^{(\beta)}+\psi_{0k}^{(\alpha)}\psi_{0i}^{(\beta)})\pm(\psi_{1i}^{(\alpha)}\psi_{1k}^{(\beta)}-\psi_{1k}^{(\alpha)}\psi_{1i}^{(\beta)})$ (i≠k)

a0b1p,e/i:$(\psi_{0i}^{(\alpha)}\psi_{1k}^{(\beta)}+\psi_{0k+1}^{(\alpha)}\psi_{1i}^{(\beta)})+(\psi_{1i}^{(\alpha)}\psi_{0,k+1}^{(\beta)}+\psi_{1k}^{(\alpha)}\psi_{0i}^{(\beta)})$ a0b1m,e/i:±$(\psi_{0i}^{(\alpha)}\psi_{1k}^{(\beta)}-\psi_{0,k+1}^{(\alpha)}\psi_{1i}^{(\beta)})+(\psi_{1i}^{(\alpha)}\psi_{0,k+1}^{(\beta)}-\psi_{1k}^{(\alpha)}\psi_{0i}^{(\beta)})$ When 2N=200, the submatrices surrounded by parentheses are comprised of 100×100, so from these types, the number of energy elements $E_n$ defined by the traces becomes 50. The number of types defined above are four types for products between the same color planes and eight types for products between different color planes. Furthermore, as the methods of obtaining (α)(α), since there are HH, VV, and CC, there are the three types, while as the methods of obtaining (α)(β), there are the three types of HV, VC, and CH. Therefore, the number of energy elements of the system where angular momentum is described by "0" and "1" becomes (3×4+3×8)× 50=36×50=1800. As the energy band, for 36 types, diagrams are drawn having 50 energy levels for each.

The applicant performed actual experiments on this using images. As a result, by expressing an energy matrix by submatrices in units of angular momentum and making the submatrices of an inherent state having the same angular momentum quantum numbers appear at the diagonal positions and making submatrices of a mixed state having different angular momentum quantum numbers (hybridization terms) appear at the nondiagonal positions, it was possible to obtain results consistent with the physical meaning. That is, if comparing the state of image array relating to energy elements produced from the diagonal submatrix and the state of image array relating to energy elements produced from the nondiagonal submatrix, it was learned that with the mixed state of nondiagonal components, there is the ability to capture extremely dynamic photos such as scenes of clouds gushing forth from mountain ranges.

<Higher Order Invariants of Texture>

The distribution function of texture is expanded by spherical Bessel expansion. A spherical Bessel function is defined expanded to the negative region as well and is expanded to a double series of the root and order forming a complete system. A spherical Bessel function expresses the radial direction wave function, the expansion relating to the root corresponds to the principal quantum number n, while the expansion relating to the order corresponds to the orbital quantum number (orbital angular momentum quantum number) l. Consider two cases, one where the expansion coefficient of the orbital quantum number is l=0, 1 and one where it is l=0, 1, 2, 3. In atomic physics, the orbits corresponding to l=0, 1, 2, and 3 are separately named the s orbit, p orbit, d orbit, and f orbit in that order. Further, these orbits create the Periodic Table of Elements. The d orbit corresponds to the transition metals, while the f orbit corresponds to description of the electron systems of the lanthanides and actinides. If considering the correspondence with the electron systems describing physical properties, even with an image system describing perception, it is considered sufficient to expand to the f orbit. The variable x takes values of ΔH, ΔV, and ΔC.

Case of Expansion by s and p Orbits $$f^{(a)}(x) = \sum_{l=0}^{1}\sum_{n=1}^{N} c_{ln}^{(\alpha)} j_l\left(\alpha_{ln}\frac{x}{a}\right) \quad (\alpha) = H, V, C_o \qquad \{\text{Math. 48}\}$$

Case of Expansion by s, p, d, and f Orbits $$f^{(a)}(x) = \sum_{l=0}^{3}\sum_{n=1}^{N} c_{ln}^{(\alpha)} j_l\left(\alpha_{ln}\frac{x}{a}\right) \quad (\alpha) = H, V, C_o \qquad \{\text{Math. 49}\}$$

Note that here, (α) is used for expressing the difference of the color planes, but the $\alpha_{ln}$ in a spherical Bessel function is used for expressing the position of the root. The position of the zero point generally cannot be expressed analytically, but Smirnov "A Course of Higher Mathematics" describes an equation for approximation of the zero point of a Bessel function. If starting from this, modifying the approximation equation to one for expressing the zero point of a spherical Bessel function, leaving the first term as it is, and introducing a ½ correction coefficient for the second term, it is leaned that approximation of all zero points is possible with an error of within 3%, so the following equation is used for calculating the p orbit and higher expansion coefficients.

$$\alpha_{ln} = \pi\left(\frac{l}{2}+n\right) - \frac{l(l+1)}{\pi(l+2n)} \quad \{\text{Math. 50}\}$$

In deriving the mechanical invariants of momentum, angular momentum, and energy from the distribution function, the components enabling independent shape evaluation are derived to the possible extent for describing the shape of the distribution function. That is, in the same way as the case of color, when constructing the energy or angular momentum, the distribution function f(x) inverted axially to f(−x) is added to the consideration. In the case of texture, the physical meaning of axial inversion corresponds to the inversion of signs of the edges. An axial inversion operation corresponds to an operation inverting the parity of angular momentum. In a spherical Bessel function, the angular momentum quantum numbers are classified into subgroups by the difference in properties of the even functions and odd functions of the group of base functions. Orbital quantum numbers are assigned to the respective subgroups.

In spherical Bessel base functions, base functions having even number orbital quantum numbers are even functions and satisfy the relation $\psi(-x)=\psi(x)$, while base functions having odd number orbital quantum numbers are odd functions and satisfy the relation $\psi(-x)=-\psi(x)$. By axial inversion $x \rightarrow -x$, the base functions of the odd number orbital quantum numbers invert in sign, while the base functions of the even number orbital quantum numbers remain unchanged in sign.

Accordingly, the wave functions of the s and d orbits have even parity, while the wave functions of the p and f orbits have odd parity. In general, the group of base functions expressed by spherical Bessel functions have parity, expressed by $(-1)^l$, using the angular momentum quantum number l with respect to the inversion of the coordinate axis.

In the same way as the above, when considering independent components, first, the elements $p_n$ of momentum, the elements $M_n$ of angular momentum, and the elements $E_n$ of energy in the case of not inverting the axis of angular momentum describing the system, then the approximately double elements after axial inversion of angular momentum of these are derived. Giving a specific example, the number N of expansion coefficients is made 100.

1) Momentum

As the elements $p_n$ of momentum, the following may be mentioned.

$$c_{ln}^{(\alpha)}$$

where, $(\alpha)$=H, V, and C

In the case of expansion by the s and p orbits, when N=100, the number of elements of momentum, since there are three planes' worth, becomes 2×100×3=600. In the case of expansion by the s, p, d, and f orbits, when N=100, the number of elements of momentum, since there are three planes' worth, becomes 4×100×3=1200.

2) Angular Momentum

As the elements $M_n$ of angular momentum, the following may be mentioned.

(Case of Expansion of s and p Orbits)

This is exactly the same as the case of Chebyshev expansion of color. That is, $$(c_{11}^{(\alpha)}+c_{12}(\alpha)+\ldots+c_{1N}^{(\alpha)})$$

where, $(\alpha)$=H,V,C.

The number of elements of angular momentum, since there are three planes' worth, becomes 1×3=3.

(Case of Expansion by s, p, d, and f Orbits)

$$1(c_{11}^{(\alpha)}+c_{12}^{(\alpha)}+\ldots c_{1N}^{(\alpha)})+2(c_{21}^{(\alpha)}+c_{22}^{(\alpha)}+\ldots c_{2N}^{(\alpha)})+3(c_{31}^{(\alpha)}+c_{32}^{(\alpha)}+\ldots c_{3N}^{(\alpha)})$$

If inverting the axis of angular momentum, another independent component appears.

$$-1(c_{11}^{(\alpha)}+c_{12}^{(\alpha)}+\ldots c_{1N}^{(\alpha)})+2(c_{21}^{(\alpha)}+c_{22}^{(\alpha)}+\ldots c_{2N}^{(\alpha)})-3(c_{31}^{(\alpha)}+c_{32}^{(\alpha)}+\ldots c_{3N}^{(\alpha)})$$

The number of elements of angular momentum, since there are three planes' worth, becomes 2×3=6.

In this way, the linear sum of expansion coefficients of odd functions gives a macroscopic indicator for evaluating how much the asymmetry of a distribution function spreads to the outside and if it shows that property. Furthermore, the linear sum of expansion coefficients of even functions gives a macroscopic indicator for evaluating how much a distribution function pulls in its tail at the outside. These overall properties of spread can become macroscopic quantities stored as angular momentum.

3) Energy

As the elements $E_n$ of the energy, the following may be mentioned.

(Case of Expansion by s and p Orbits)

This is exactly the same as the case of Chebyshev expansion of color. Therefore, when N=100, the submatrices enclosed by the parentheses are comprised of 100×100, so from these types, the number of energy elements $E_n$ defined by the traces becomes 50. Therefore, in exactly the same way as the case of color, the number of energy elements of the system where angular momentum is described by "0" and "1" becomes (3×4+3×8)×50=36×50=1800. As the energy band, for 36 types, diagrams are drawn having 50 energy levels for each.

(Case of Expansion by s, p, d, and f Orbits)

There are the following four methods for connecting the energy submatrices of the angular momentum units to form a complete system. The first bundling method expresses the inherent state of angular momentum. The second to fourth bundling methods express the mixed state of angular momentum. The "mixed state" is the state where the angular momentum forms a mixed orbit. For example, between sd, a subgroup called sd hybridization is formed. The matrix diagrams expressing the state forming the following four expansion traces are shown in FIGS. 17(a) to (d). These are defined as encompassing the case of only the s and p orbits. That is, when eliminating expansion by the d, f orbits, the equations become the same as expansion by the s, p orbits.

$$s^2+p^2+d^2+f^2$$

$$sp+ps+df+fd$$

$$sd+ds+pf+fp$$

$$sf+fs+pd+dp$$

A specific example of the submatrix sum for actually dividing an energy matrix into angular momentum submatrices and combining the expanded traces will be shown. For a combination of angular momentum of the inherent state of a (l,l')=(0,0)+(1,1)+(2,2)+(3,3), the symbol 00 is used, for the combination of angular momentum of the mixed state of (l,l')=(0,1)+(1,0)+(2,3)+(3,2), the symbol 01 is used, for the combination of angular momentum of the mixed state of (l,l')=(0,2)+(2,0)+(1,3)+(3,1), the symbol 02 is used, and for the combination of angular momentum of the mixed state of (l,l')=(0,3)+(3,0)+(1,2)+(2,1), the symbol 03 is used.

(α)(α)

$$a0a0p, e/i: (\psi_{0i}^{(\alpha)}\psi_{0k}^{(\alpha)} + \psi_{0k}^{(\alpha)}\psi_{0i}^{(\alpha)}) \pm (\psi_{1i}^{(\alpha)}\psi_{1k}^{(\alpha)} + \psi_{1k}^{(\alpha)}\psi_{1i}^{(\alpha)}) + (\psi_{2i}^{(\alpha)}\psi_{2k}^{(\alpha)} + \psi_{2k}^{(\alpha)}\psi_{2i}^{(\alpha)}) \pm (\psi_{3i}^{(\alpha)}\psi_{3k}^{(\alpha)} + \psi_{3k}^{(\alpha)}\psi_{3i}^{(\alpha)})$$

$$a0a1p, e: (\psi_{0i}^{(\alpha)}\psi_{1k}^{(\alpha)} + \psi_{0k}^{(\alpha)}\psi_{1i}^{(\alpha)}) + (\psi_{1i}^{(\alpha)}\psi_{0k}^{(\alpha)} + \psi_{1k}^{(\alpha)}\psi_{0i}^{(\alpha)}) + (\psi_{2i}^{(\alpha)}\psi_{3k}^{(\alpha)} + \psi_{2k}^{(\alpha)}\psi_{3i}^{(\alpha)}) + (\psi_{3i}^{(\alpha)}\psi_{2k}^{(\alpha)} + \psi_{3k}^{(\alpha)}\psi_{2i}^{(\alpha)})$$

$$a0a1m, i: -(\psi_{0i}^{(\alpha)}\psi_{1k}^{(\alpha)} - \psi_{0k}^{(\alpha)}\psi_{1i}^{(\alpha)}) + (\psi_{1i}^{(\alpha)}\psi_{0k}^{(\alpha)} - \psi_{1k}^{(\alpha)}\psi_{0i}^{(\alpha)}) - (\psi_{2i}^{(\alpha)}\psi_{3k}^{(\alpha)} - \psi_{2k}^{(\alpha)}\psi_{3i}^{(\alpha)}) + (\psi_{3i}^{(\alpha)}\psi_{2k}^{(\alpha)} - \psi_{3k}^{(\alpha)}\psi_{2i}^{(\alpha)})(i \neq k)$$

$$a0a2p, e/i: (\psi_{0i}^{(\alpha)}\psi_{2k}^{(\alpha)} + \psi_{0k}^{(\alpha)}\psi_{2i}^{(\alpha)}) + (\psi_{2i}^{(\alpha)}\psi_{0k}^{(\alpha)} + \psi_{2k}^{(\alpha)}\psi_{0i}^{(\alpha)}) \pm (\psi_{1i}^{(\alpha)}\psi_{3k}^{(\alpha)} + \psi_{1k}^{(\alpha)}\psi_{3i}^{(\alpha)}) \pm (\psi_{3i}^{(\alpha)}\psi_{1k}^{(\alpha)} + \psi_{3k}^{(\alpha)}\psi_{1i}^{(\alpha)})$$

$$a0a3p, e: (\psi_{0i}^{(\alpha)}\psi_{3k}^{(\alpha)} + \psi_{0k}^{(\alpha)}\psi_{3i}^{(\alpha)}) + (\psi_{3i}^{(\alpha)}\psi_{0k}^{(\alpha)} + \psi_{3k}^{(\alpha)}\psi_{0i}^{(\alpha)}) + (\psi_{1i}^{(\alpha)}\psi_{2k}^{(\alpha)} + \psi_{1k}^{(\alpha)}\psi_{2i}^{(\alpha)}) + (\psi_{2i}^{(\alpha)}\psi_{1k}^{(\alpha)} + \psi_{2k}^{(\alpha)}\psi_{1i}^{(\alpha)})$$

$$a0a3m, i: -(\psi_{0i}^{(\alpha)}\psi_{3k}^{(\alpha)} - \psi_{0k}^{(\alpha)}\psi_{3i}^{(\alpha)}) + (\psi_{3i}^{(\alpha)}\psi_{0k}^{(\alpha)} - \psi_{3k}^{(\alpha)}\psi_{0i}^{(\alpha)}) + (\psi_{1i}^{(\alpha)}\psi_{2k}^{(\alpha)} - \psi_{1k}^{(\alpha)}\psi_{2i}^{(\alpha)}) - (\psi_{2i}^{(\alpha)}\psi_{1k}^{(\alpha)} - \psi_{2k}^{(\alpha)}\psi_{1i}^{(\alpha)})(i \neq k)$$

(α)(β)

$$a0b0p, e/i: (\psi_{0i}^{(\alpha)}\psi_{0k}^{(\beta)} + \psi_{0k}^{(\alpha)}\psi_{0i}^{(\beta)}) \pm (\psi_{1i}^{(\alpha)}\psi_{1k}^{(\beta)} + \psi_{1k}^{(\alpha)}\psi_{1i}^{(\beta)}) + (\psi_{2i}^{(\alpha)}\psi_{2k}^{(\beta)} + \psi_{2k}^{(\alpha)}\psi_{2i}^{(\beta)}) \pm (\psi_{3i}^{(\alpha)}\psi_{3k}^{(\beta)} + \psi_{3k}^{(\alpha)}\psi_{3i}^{(\beta)})$$

$$a0b0m, e/i: (\psi_{0i}^{(\alpha)}\psi_{0k}^{(\beta)} - \psi_{0k}^{(\alpha)}\psi_{0i}^{(\beta)}) \pm (\psi_{1i}^{(\alpha)}\psi_{1k}^{(\beta)} - \psi_{1k}^{(\alpha)}\psi_{1i}^{(\beta)}) + (\psi_{2i}^{(\alpha)}\psi_{2k}^{(\beta)} - \psi_{2k}^{(\alpha)}\psi_{2i}^{(\beta)}) \pm (\psi_{3i}^{(\alpha)}\psi_{3k}^{(\beta)} - \psi_{3k}^{(\alpha)}\psi_{3i}^{(\beta)})(i \neq k)$$

$$a0b1p, e/i: \pm(\psi_{0i}^{(\alpha)}\psi_{1k}^{(\beta)} + \psi_{0,k+1}^{(\alpha)}\psi_{1i}^{(\beta)}) + (\psi_{1i}^{(\alpha)}\psi_{0,k+1}^{(\beta)} + \psi_{1k}^{(\alpha)}\psi_{0i}^{(\beta)}) \pm (\psi_{2i}^{(\alpha)}\psi_{3k}^{(\beta)} + \psi_{2,k+1}^{(\alpha)}\psi_{3i}^{(\beta)}) + (\psi_{3i}^{(\alpha)}\psi_{2,k+1}^{(\beta)} + \psi_{3k}^{(\alpha)}\psi_{2i}^{(\beta)})$$

$$a0b1m, e/i: \pm(\psi_{0i}^{(\alpha)}\psi_{1k}^{(\beta)} - \psi_{0,k+1}^{(\alpha)}\psi_{1i}^{(\beta)}) + (\psi_{1i}^{(\alpha)}\psi_{0,k+1}^{(\beta)} - \psi_{1k}^{(\alpha)}\psi_{0i}^{(\beta)}) \pm (\psi_{2i}^{(\alpha)}\psi_{3k}^{(\beta)} - \psi_{2,k+1}^{(\alpha)}\psi_{3i}^{(\beta)}) + (\psi_{3i}^{(\alpha)}\psi_{2,k+1}^{(\beta)} - \psi_{3k}^{(\alpha)}\psi_{2i}^{(\beta)})$$

$$a0b2p, e/i: (\psi_{0i}^{(\alpha)}\psi_{2k}^{(\beta)} + \psi_{0,k+1}^{(\alpha)}\psi_{2i}^{(\beta)}) + (\psi_{2i}^{(\alpha)}\psi_{0,k+1}^{(\beta)} + \psi_{2k}^{(\alpha)}\psi_{0i}^{(\beta)}) \pm (\psi_{1i}^{(\alpha)}\psi_{3k}^{(\beta)} + \psi_{1,k+1}^{(\alpha)}\psi_{3i}^{(\beta)}) + (\psi_{3i}^{(\alpha)}\psi_{1,k+1}^{(\beta)} + \psi_{3k}^{(\alpha)}\psi_{1i}^{(\beta)})$$

$$a0b2m, e/i: (\psi_{0i}^{(\alpha)}\psi_{2k}^{(\beta)} - \psi_{0,k+1}^{(\alpha)}\psi_{2i}^{(\beta)}) + (\psi_{2i}^{(\alpha)}\psi_{0,k+1}^{(\beta)} - \psi_{2k}^{(\alpha)}\psi_{0i}^{(\beta)}) \pm (\psi_{1i}^{(\alpha)}\psi_{3k}^{(\beta)} - \psi_{1,k+1}^{(\alpha)}\psi_{3i}^{(\beta)}) \pm (\psi_{3i}^{(\alpha)}\psi_{1,k+1}^{(\beta)} - \psi_{3k}^{(\alpha)}\psi_{1i}^{(\beta)})$$

$$a0b3p, e/i: \pm(\psi_{0i}^{(\alpha)}\psi_{3k}^{(\beta)} - \psi_{1,k+1}^{(\alpha)}\psi_{3i}^{(\beta)}) + (\psi_{3i}^{(\alpha)}\psi_{0,k+1}^{(\beta)} + \psi_{3k}^{(\alpha)}\psi_{0i}^{(\beta)}) + (\psi_{1i}^{(\alpha)}\psi_{2k}^{(\beta)} + \psi_{1,k+1}^{(\alpha)}\psi_{2i}^{(\beta)}) \pm (\psi_{2i}^{(\alpha)}\psi_{1,k+1}^{(\beta)} + \psi_{2k}^{(\alpha)}\psi_{1i}^{(\beta)})$$

$$a0b3p, e/i: \pm(\psi_{0i}^{(\alpha)}\psi_{3k}^{(\beta)} - \psi_{0,k+1}^{(\alpha)}\psi_{3i}^{(\beta)}) + (\psi_{3i}^{(\alpha)}\psi_{0,k+1}^{(\beta)} + \psi_{3k}^{(\alpha)}\psi_{0i}^{(\beta)}) + (\psi_{1i}^{(\alpha)}\psi_{2k}^{(\beta)} - \psi_{1,k+1}^{(\alpha)}\psi_{2i}^{(\beta)}) \pm (\psi_{2i}^{(\alpha)}\psi_{1,k+1}^{(\beta)} - \psi_{2k}^{(\alpha)}\psi_{1i}^{(\beta)})$$

When N=100, the submatrices enclosed by the parentheses are comprised of 100×100, so from these types, the number of energy elements $E_n$ defined by the traces becomes 50. The number of types defined above is eight types in the case of a product between the same color planes and 16 types in the case of a product between different color planes. Furthermore, as the methods for obtaining (α) (α), there are HH, VV, and CC, so there are three types. As the methods for obtaining (α) (β), there are the three types of HV, VC, and CH. Therefore, the number of energy elements of the system where angular momentum is described by 0, 1, 2, and 3 becomes (3×8+3×16)×50=72×50=3600. As the energy band, for 72 types, diagrams are drawn having 50 energy levels for each.

<Correction of Relativistic Effect of Hamiltonian>

1) Combined Energy of Higher Order System of Color and Texture

Color is assumed to be a spin coordinate system, while texture is assumed to be a radial direction positional coordinate system. In a nonrelativistic description, the spin coordinate system and the positional coordinate system are independent and the spin angular momentum and the orbit angular momentum act individually as stored amounts, but in a relativistic description, there is no longer a distinction between the spin coordinates and positional coordinates. The effect of the relativistic effect need not be described by a spinor description. It can be incorporated to a certain extent if adding the energy of spin-orbit interaction to the hamiltonian of the nonrelativistic description (see Document F2). Therefore, it is possible to construct energy elements $E_n$ by the inner product of the spin angular momentum S defined by the higher order system of color and the orbit angular momentum L defined by the higher order system of texture. However, for the angular momentum M defined by the subsystems, the symbol S is used for the higher order subsystem of color and the symbol L is used for the higher order subsystem of texture.

$$H = -\vec{L} \cdot \vec{S}$$

$$\vec{S} = (S^{(H)}, S^{(V)}, S^{(C)})$$

$$\vec{L} = (L^{(H)}, L^{(V)}, L^{(C)}) \quad \{\text{Math. 51}\}$$

The above definition in the case of assuming (α)=H, V, and C are independent is the inner product of the (α) plane and the (α) plane. The number of energy elements in the case of not considering the axial inversion of angular momentum is just one. However, HVC are not independent in certain aspects, so in general they are the inner product of the (α) plane and the (β) plane. The following three energy elements can be defined.

$$H_1^{(\alpha)(\alpha)} = -(L^{(H)}S^{(H)} + L^{(V)}S^{(V)} + L^{(C)}S^{(C)})$$

$$H_2^{(\alpha)(\beta)} = -(L^{(H)}S^{(V)} + L^{(V)}S^{(C)} + L^{(C)}S^{(H)})$$

$$H_3^{(\alpha)(\beta)} = -(L^{(H)}S^{(C)} + L^{(V)}S^{(H)} + L^{(C)}S^{(V)}) \quad \{\text{Math. 52}\}$$

Even when axially inverting the angular momentum, it is sufficient to similarly define the separate L' vector and S' vector (=S vector) and add the next hamiltonian as well. As the number of energy elements, together with the above, the result becomes double the number, that is, six.

$$H = -\vec{L}' \cdot \vec{S}' = -\vec{L}' \cdot \vec{S} \quad \{\text{Math. 53}\}$$

2) Combined Energy of Lower Order System of Color and Texture

The spreads $\sigma_H$, $\sigma_V$, and $\sigma_C$ in the positional coordinate direction of momentum introduced in a lower order system of color can also be grasped as angular momentum. Similarly, the spreads $\sigma_{\Delta H}$, $\sigma_{\Delta V}$, $\sigma_{\Delta C}$ of momentum introduced in a lower order system of texture can be grasped as angular momentum. Therefore, in the same way as the case of a higher order system, the energy of spin-orbit interaction can be defined.

$$H = -\vec{L} \cdot \vec{S}$$

$$\vec{S} = (\sigma_H, \sigma_V, \sigma_C)$$

$$\vec{L} = (\sigma_{\Delta H}, \sigma_{\Delta V}, \sigma_{\Delta C}) \quad \{\text{Math. 54}\}$$

In a lower order system, even if inverting the axis of angular momentum, the same system as the original is just expressed, so the number of energy elements becomes three.

[Document F2] Landau and Lifshitz, Course of Theoretical Physics, Volume 3 "Quantum Mechanics (Non-Relativistic Theory)," (Third Revised Edition, 1977), Chapter 10 "The Atom," Section 72 "Fine structure of atomic levels,"

<Addition of Internal Energy of Rotation>

1) Rotational Energy of Higher Order System of Color

In the same way as the above-mentioned spin-orbit interaction, it is possible to define a spin-spin interaction corresponding to the rotational energy of the spin system.

$$H = \vec{S} \cdot \vec{S}$$

$$\vec{S} = (S^{(H)}, S^{(V)}, S^{(C)}) \qquad \{\text{Math. 55}\}$$

As the combinations when assuming $(\alpha)$=H, V, C are not independent, the following two energy elements can be defined.

$$H_1^{(\alpha)(\alpha)} = S^{(H)}S^{(H)} + S^{(V)}S^{(V)} + S^{(C)}S^{(C)}$$

$$H_2^{(\alpha)(\beta)} = S^{(H)}S^{(V)} + S^{(V)}S^{(C)} + S^{(C)}S^{(H)} \qquad \{\text{Math. 56}\}$$

2) Rotational Energy of Lower Order System of Color

The lower order system is already introduced as the quadratic form of the fluctuation term of the model hamiltonian, that is, the product of σ and σ.

3) Rotational Energy of Higher Order System of Texture

In the same way as the above spin-spin interaction, it is possible to define the rotational energy by the orbital angular momentum of the coordinate system.

$$H = \vec{L} \cdot \vec{L}$$

$$\vec{L} = (L^{(H)}, L^{(V)}, L^{(C)}) \qquad \{\text{Math. 57}\}$$

As the combinations when assuming $(\alpha)$=H, V, C are not independent, the following two energy elements can be defined.

$$H_1^{(\alpha)(\alpha)} = L^{(H)}L^{(H)} + L^{(V)}L^{(V)} + L^{(C)}L^{(C)}$$

$$H_2^{(\alpha)(\beta)} = L^{(H)}L^{(V)} + L^{(V)}L^{(C)} + L^{(C)}L^{(H)} \qquad \{\text{Math. 58}\}$$

When expanding s, p, d, and f, an independent angular momentum L' vector is defined for the coordinate axial inversion. As the method of combination, in addition to inversion of one angular momentum, independent energy elements result even when inverting both angular momentums. Therefore, the number of energy elements becomes the three times greater six.

$$H = \vec{L} \cdot \vec{L}'$$

$$H = \vec{L}' \cdot \vec{L}' \qquad \{\text{Math. 59}\}$$

4) Rotational Energy of Lower Order of Texture

This was already introduced in the same way as the lower order of color.

<Linear Model of Perception>

The thus defined mechanical invariants are all provided with additive properties, so it is also possible to describe them by combining all by linear combination without dividing up the world between different dimensional spaces of projection into all subsystems. That is, by constructing mechanical invariants, it is possible to place subsystems relating to the main axes of perception and the lower order and higher order projections among the same on a common footing. The difference in the Planck's constant h and other physical constants differently defined for each subsystem are included as linear combination coefficients scaling the entirety in subsystem units. That is, perception can be described as a linear model.

The intensity Qi of the degree of impression of perception for a certain adjective "i" is expressed as a linear sum of the individual energy elements emitted by the individual images. The magnitudes and signs of the energy elements stressed differ for each adjective. This appears in the form of a linear combination coefficient as a property characterizing the adjective. That is, the feature of an image of a mechanical invariant is a quantity converted from microscopic image information to macroscopic image information. What requires modelization is concentrated in the linear combination coefficients. Prior learning of the model for determining the linear combination coefficients is also based on the base concepts of statistical physics and is basically performed by the statistical mean for the statistical ensemble of the image group.

$$Qi = \alpha_1 F_1 + \alpha_2 F_2 + \ldots \text{ (color)}$$

$$+ \beta_1 G_1 + \beta_2 G_2 + \ldots \text{ (texture)}$$

$$+ \gamma_1 H_1 + \gamma_2 H_2 + \ldots \text{ (composition)}$$

In a pyramidal hierarchical structure, the factor structure modeled once at each level can have other factors added to it as is without change. The point that should be changed at that time is only the scaling connecting one subsystem and another subsystem. The ratio in the subsystem, that is, the factor structure, is unchanged.

Further, the important point in a linear model is that the subsystems be described by additive features, so the number of combined features when combining subsystems by combination of principal axes can be expressed by the simple sum with the highest degree of reduction. The number becomes on the order of 10,000 and becomes the same extent as the total number of perceptual adjectives.

Linear combination is not limited to energy. Linear combination for Qi is also possible for the remaining additive mechanical invariants of momentum and angular momentum. At this time, the linear combination coefficients also function for combining the energy and physical dimensions. Therefore, when using all of the mechanical invariants, at the time of model learning, it is necessary to determine the factor structure of linear combination coefficients in energy units, momentum units, and angular momentum units, then determine one more time the combination coefficients for scaling the entirety among the three. This combines the dimensions and also leads to determination of what invariants play important roles among the three. In general, if taking the statistical mean for many model images, the roles of momentum and angular momentum drop.

In the next section, to facilitate understanding of the discussion, the explanation will be given limited to the case of handling only energy.

<Density of States and Adjective Model>

If deriving the macroscopic energy from image information and giving a value by a certain energy level, this means that the energy of that energy level is emitted to exactly that amount and there is a state in the energy level. If the value of the energy element of a certain energy level is zero, the image does not emit any energy element and there is no state at that level. The value of energy may also take a negative value.

For a certain adjective "i", when the value of the product of the value of the energy element and the linear combination coefficient acts positively, that element acts positively on the adjective i. Conversely, when the value of the product is negative, it has a negative action. When the sum of the inner products of a distribution diagram of energy elements derived from a single image, that is, a diagram showing the state of existence of states of an energy level, and the distribution diagram of the model coefficients of linear combination is a positive value, the image has an impression of the adjective i of that value. Conversely, when having a negative value, the image can be said to give an impression in an opposite direction to the impression of the adjective i by exactly the amount of that value. Therefore, the total sum Qi of the inner products of the linear combination coefficients and energy elements of the model adjectives expresses the adjective energy.

If normalizing the distribution diagram of energy elements by the number of states of the energy system as a whole, the density of states function finding the probability of existence of a state is expressed. A positive value of energy is held when the positive state $\rho_+(E)$ has a positive probability of existence. Conversely, a negative energy value is held when the negative state $\rho_-(E)$ has a positive probability of existence. The normalization is performed so that, $$\int \{\rho_+(E) + \rho_-(E)\} dE = 1 \quad \{\text{Math. 60}\}$$

However, as the method of expression of the density of states when illustrating the density of states and when actually taking a linear combination between the density of states and linear combination coefficients, division into two parts is not necessary in this way. That is, if employing the sign of the energy value as it is and using as the size a value corresponding to $\rho_+(E)$ or $\rho_-(E)$ to express $\rho(E)$, it is not necessary to divide the symbols. Further, if normalizing the linear combination coefficients, the result becomes as follows.

$$Q_i = \frac{\vec{\alpha}_i \cdot \vec{E}}{\langle |\vec{\alpha}_i| \rangle_i \langle |\vec{E}| \rangle} = \alpha(E_n)\rho(E_n) \quad \{\text{Math. 61}\}$$

Here, the < > of the denominator indicates the statistical mean of the images becoming the model of a general image, while the $< >_i$ indicates the statistical mean relating to all adjectives which the image retrieval system prepares. Regarding this n, when the same suffix appears, the sum of these is taken.

If normalizing the norm of the denominator in this way across the possible range using the statistical mean of the image group or adjective group, it is possible to numericalize by what extent of strength an adjective impression is given by a certain image with respect to a mean image using an absolute reference. Therefore, it becomes possible to evaluate the perception of an absolute impression provided with an evaluation reference of the relative magnitude between adjectives from an absolute image reference—not a relative impression evaluation closed in a single image or in a single adjective. Therefore, normalization of Qi is only normalization so as to fit in the interval of [−1,1] in the mean range. Sometimes, that range may even be exceeded.

Figure 18:
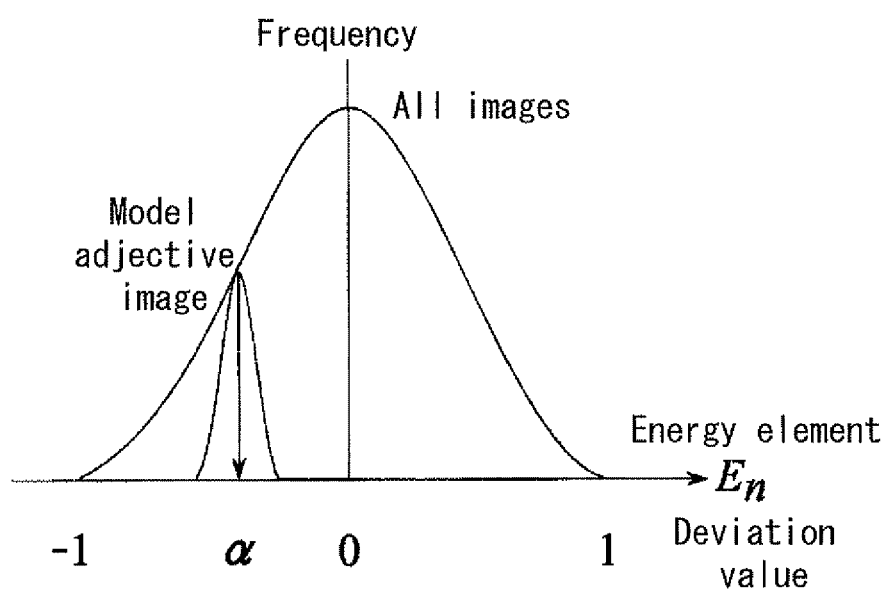
{FIG. 18} A distribution diagram of energy values in a model image of an adjective.

<Method of Determination of Linear Combination Coefficients> (See FIG. 18)

If selecting a model image of an adjective i from the sufficiently many general image models and viewing the frequency distribution relating to the energy values for each and every one of the energy elements $E_n$, usually the general images are regularly distributed. The model images are also believed to be regularly distributed in them. However, distortion of the distribution conceivable statistically also is described in the range of the models of the normal distribution.

If evaluating at what position in the distribution of general images the mean value of distribution of model images is, in the form of the deviation value of the model images with respect to the distribution of general images, the deviation value itself shows the importance of the adjectives of the energy elements. At this time, if designating the mean value of the distribution of general images as zero and using deviation values with two ends expressed by intervals of [−1,1], these can be directly used as linear combination coefficients.

This deviation value is given assuming that the width becomes the normal distribution given by the standard deviation value of a general image distribution and in the form of an integral of the distribution function from the mean value of the general distribution to the mean value of the model images. Further, the error of the deviation value can also be calculated if giving the mean values and standard deviation values of the general image distribution and model image distribution.

The distribution of general images is not necessary a normal distribution in some cases, so for the method of expression of the distribution position of a model, in addition to statistics, there are also indicators defining the percentile rank using the actual distribution. Upon experimentation, it was learned that the deviation values giving an integral by an error function assuming normal distribution are superior as linear combination coefficients to the percentile rank obtained by the integral of the actual distribution from a central value of distribution, so normally these are used.

Saying that the energy value of the model images of adjectives is distributed means that the energy value fluctuates. Therefore, the method of describing perception using a large number of image groups to determine perception can be said to correspond to the Gibbs distribution of statistical physics describing the macroscopic quantity of the fluctuating distribution of the energy value (canonical distribution) (see Document E4).

On the other hand, if taking the extreme of reducing the images of the model adjectives to obtain only a single image, a description which compares macroscopic quantities of systems with no fluctuation of energy values determined to the macroscopic energy values which images have in a general image distribution is switched to. In that sense, a single similar image retrieval corresponds to microcanonical distribution of statistical physics where the macroscopic quantities of images of the energy value or the momentum and angular momentum are described by delta functions. In this sense, the method of mechanically describing the perception provides the performance of enabling seamless description of a perceptual image retrieval constructed by a large number of single similar image retrievals. The method only changes the number of model images for determining the linear combination coefficients to the number of the target image group.

[Document E4] Landau and Lifshitz, Course of Theoretical Physics, Volume 5, "Statistical Physics Part 1" (Third Revised Edition, 1976), Chapter 3 "The Gibbs Distribution", Section 28 "The Gibbs distribution" and Section 31 Section 35 "The Gibbs distribution for a variable number of particles"

<Combination of subsystems>

Figure 19:
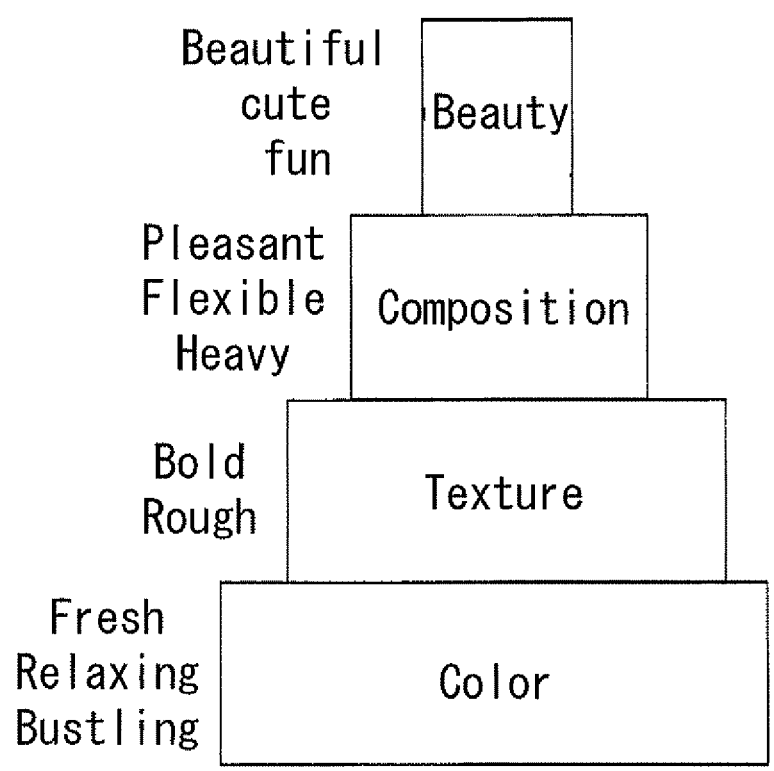
{FIG. 19} A conceptual view of a hierarchical structure of a pyramid.

For the adjective energy, expected values are determined in subsystem units as explained above, so next the method of combination has to be considered. In general, the hamiltonian describing the entire system is expressed by a linear combination of hamiltonians of the subsystems, that is, when a linear model of perception stands, the solution of the wave function of the hamiltonian of the entire system is expressed as a linear combination of wave functions of hamiltonian solutions of the subsystems. Therefore, in the same way as the eigenvalues corresponding to the wave functions, the energy eigenvalue En of the entire system is expressed by the linear combination of energy eigenvalues of the subsystems. If expressing this relationship by a formula, one gets $$H = k_1 H_1 + k_2 H_2 + k_3 H_3 + k_4 H_4 +$$

where, $H_1$: Lower order invariant of color
$H_2$: Higher order invariant of color
$H_3$: Lower order invariant of texture
$H_4$: Higher order invariant of texture FIG. 19 is a conceptual view of the hierarchical structure of a pyramid.

The added factor of the energy elements solves the previous problem of the degeneracy of the energy level and performs the role of state separation.

That is, even minor differences in state can be continuously numericalized through expression of the energy value of real values. If adding energy relating to the composition system as a subsystem, it becomes possible to solve the energy degenerated relating to the composition up to then and differentiate differences in perception due to the composition.

<Method of Determination of Linear Combination Coefficients k>

The adjective energy Pi,j of the subsystem defined as the inner product of the density of states function $\rho(E_n)$ and linear combination coefficients $\alpha(E_n)$ for each subsystem (here, symbols for differentiation with the adjective energy Qi of the entire system are introduced) can be used to determine the linear combination coefficients k for these through a process exactly the same as that performed for each of the energy elements in the subsystem up to now. That is, relating to the energy indicator taking the subsum of the linear combination, by investigating how an image group of a general image model is distributed and evaluating at what position the image group of the adjective model is distributed in that by a deviation value, the linear combination coefficients k are determined.

The thus found linear combination coefficients k lead to the elucidation of the ratio of action of subsystems showing which subsystem elements of color, texture, and composition for a certain adjective actually act strongly and determine the impression of the adjective. As the methodology, values of the range of [−1,1] can be taken for the linear combination coefficients k of the subsystem, but when actually running experiments, the result only becomes a positive value. This strangely matches with the role inherently held by the subsystem of only changing the ratio of action of the causative structure.

In this way, when subsystems all have the properties of additive energies, it is possible to divided the subsystems so as to re-determine the linear combination coefficients in subsum units and combine the subsystems. In a system handling only energy, a two-stage combination of combination with other subspaces is gone through.

By similar thinking, in a system handling all of momentum, angular momentum, and energy, there is the concept of division into subsystems among these mechanical invariants, so three-step combination is necessary. That is, the factor structure is determined between elements in the momentum, in the angular momentum, and in the energy, then which mechanical invariant among the momentum, angular momentum, and energy for which the linear sum is taken actually plays the dominant role is determined. It is determined just how important the representative energy of the subsystem expressed by their linear sum is among the subsystems.

If referring to the process of determination of the linear combination coefficients as "learning", this can be said to be a system performing multistep learning in subsystem units.

<Energy Band Diagram>

Figure 20:
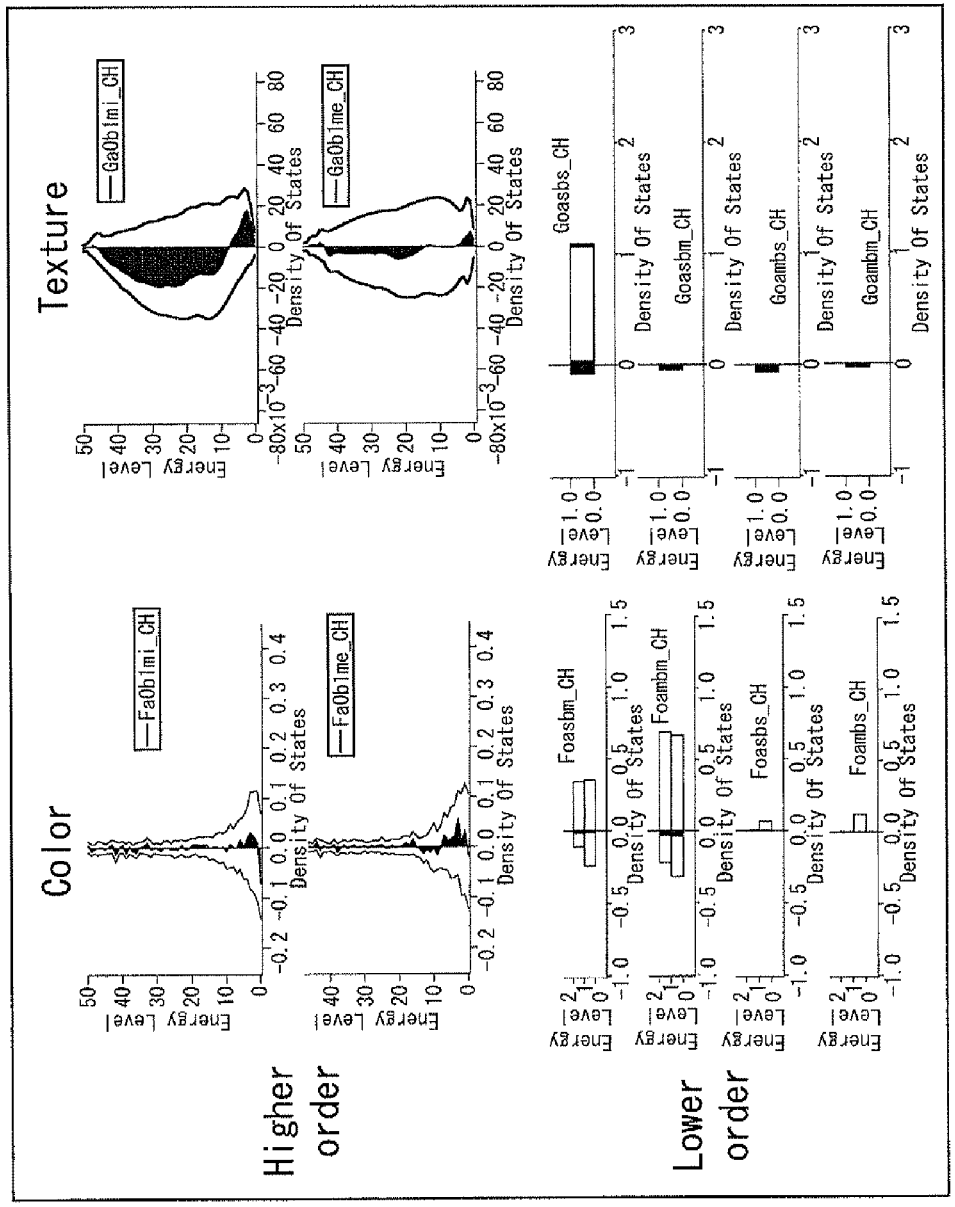
{FIG. 20} An energy band diagram in color and texture.

FIG. 20 is an energy band diagram of color and texture. If illustrating the density of states functions in the order of energy level, the lower order system scalar invariants become the discrete energy levels while the higher order system vector invariants become continuous energy levels. This is like a set of atoms reaching Avogadro's Number. For example, with metal substances, the result is a density of states diagram like a system having an energy band structure where the electron orbit of the inner shell is superposed over a discrete energy level close to the atomic order and the electron orbit of the outer shell is superposed over the electron orbit of the adjoining atoms to form a dense energy level conduction band.

The state of the energy band diagram created from the adjective model of "fresh" selected by a certain person is illustrated. For comparison, the energy band diagram in the conductivity band of the typical transition metal nickel is shown (see FIG. 21).

Figure 21:
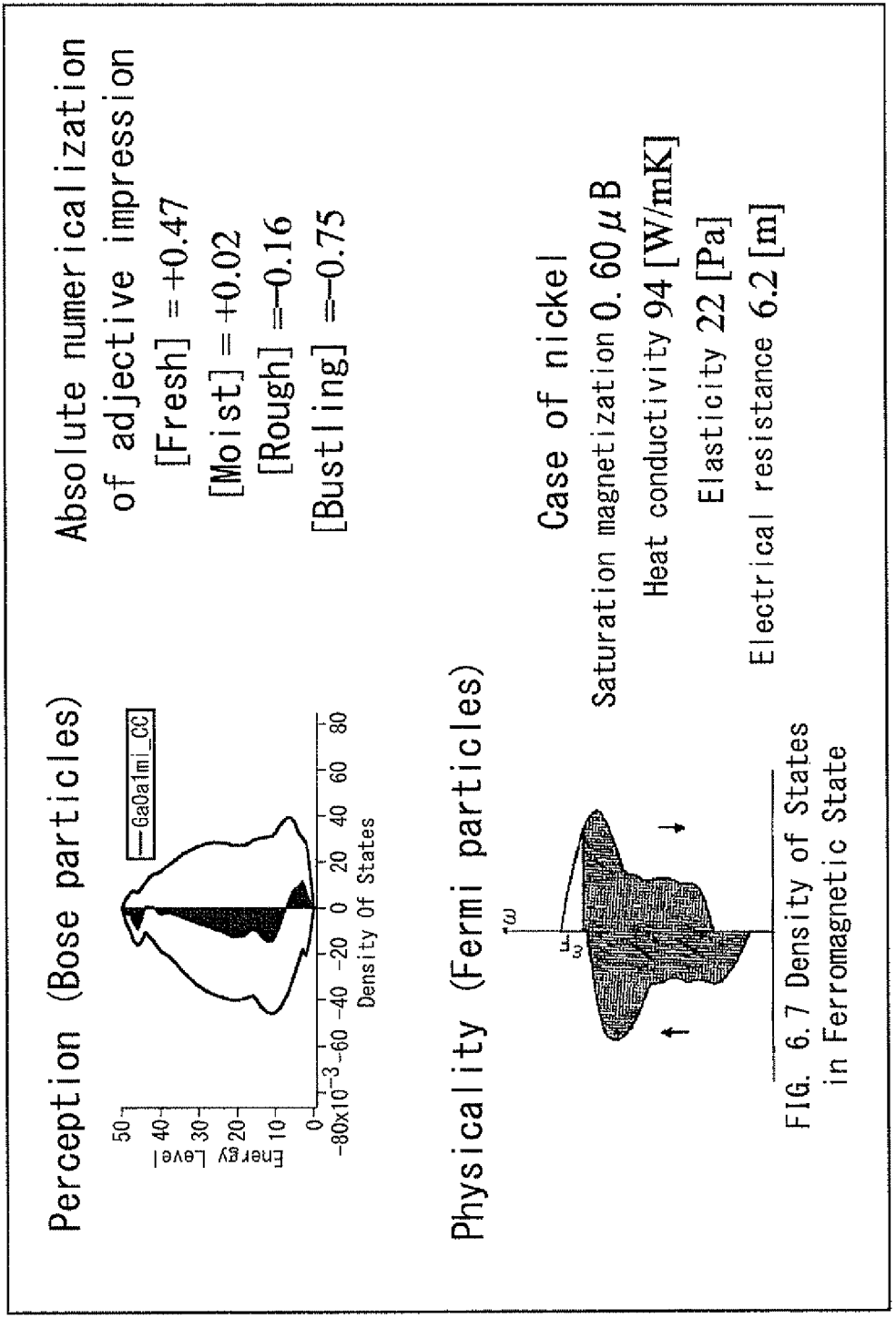
{FIG. 21} An energy band diagram in a conduction band of nickel.

What determines the electron structure of a substance is that the system of the electrons responsible for it are Fermi particles with a spin 1/2. Therefore, the Pauli exclusion principle acts and the upward spin and downward spin are never mixed. Therefore, the density of states diagram of the right side of FIG. 21 and the density of states diagram of the left side of FIG. 21 are never mixed. The states are packed in order from low energy level up to the Fermi energy level in the structure.

The energy band diagram describing the perception of one image differs from this. That is, the state taken by the positive energy value (density of states diagram of right side of FIG. 21) and the state taken by the negative energy value (density of states diagram of left side of FIG. 21) are allowed to go to the right or go to the left at any level. The size of the density of states can also be packed in any way. This can be interpreted as describing the properties of Bose particles in a certain sense. Therefore, as the state system of the image, concentration can occur in which the states concentrate at a certain energy level.

If assuming that color describes a spin system, a Chebyshev function optimally selected for describing the higher order invariant of color perfectly matches with being a special function which can only describe the state of the system of the angular momentum 1. The photons of the image are, by quantum mechanics, a system of a spin angular momentum of "1". Note that from the state of the energy band diagram, the state where the spin system of color describes an extremely fine factor structure can be seen.

A texture system described using spherical Bessel functions suitable for describing one radial direction wave function reveals a state describing an extremely rough energy structure. This is very similar in relationship to the relation that when considering the energy level of atoms of a substance, the radial direction wave functions determine the large energy level, next the wave functions of the zenith angle and azimuth angle direction finely determine the energy level, and the spin system determines the further finer energy level. However, when it comes to the electronic structure of a solid or other substance, for example, with a ferromagnetic material, the spin system starts to play a large role, so the relative relationship of the separation of the energy level cannot be generally discussed by the aggregate system of the collection of atoms.

The relationship of these energy level structures, if comparing the correspondence between the pyramidal structure which it is considered an adjective system has and the pyramidal structure of the feature predicted in relation to this, the property of the additive energy in a mechanics-like method of description is in a relation very similar to the state of solution of degeneracy of the energy level of only a system considered up to now by the addition of new principal axis energy elements.

<Temperature of Image>

In an image system, the temperature of the system including both the stationary state and nonstationary state is defined. The temperature is positioned as the total sum of the number of energy states. Therefore, the norm of the vector when the quantum state $E_n$ of energy is expressed by a vector for the state n is made the temperature. This corresponds to a normalization factor of the denominator when defining the density of states in the energy. The number of energy states which each individual image can take differs. The temperature also differs with each image. Therefore, the concept of the "temperature of an image" can be defined. For the temperature of an image, the method of counting the number of states must be first defined in common subsystem units. Further, the temperature of an image has the same number of dimensions as energy.

The norm of a vector takes a value of zero or more, so satisfies the condition which the temperature satisfies. Further, when there is no number of states of energy, the image system becomes the absolute zero degree. However, a conjugate space at which the uncertainty principle works is simultaneously described as a projected plane of the subsystem, so it is difficult to create an image giving the absolute zero point.

<Entropy of Image>

The entropy of an image is defined in subsystem units by counting the number of states based on the definition of the distribution function f(p,q) in the phase space of the momenta p and positions q projected in the subsystem. In this sense, the entropy S can be expressed as S=S(f)=S(p,q).

The entropies defined in subsystem units have additive properties, so the entropy of the entire system can also be defined. If defining "a" as expressing a subsystem, $$S = \sum_a S_a \quad \text{\{Math. 62\}}$$

Entropy is a dimensionless quantity.

The entropy of a subsystem "a" is calculated by the following formula. Integration is performed only for the interval where the value of the distribution function is limited. The interval where the value is zero is skipped. However, the number of states of the distribution function is made a normalized one. Therefore, a value of over zero is always obtained and the requirement of entropy is satisfied.

$$S_a = -\iint f_a(p_a, q_a) \ln(f_a(p_a + q_a)) dp_a dq_a$$

$$\iint f_a(p_a, q_a) dp_a dq_a = 1 \quad \text{\{Math. 63\}}$$

When the distribution function f(p,q) of a subsystem is projected in a function of only the momenta p, the following formula is used. The method of integration is similar. However, the number of states of the distribution function is made a normalized one.

$$S_a = -\int f_a(p_a) \ln(f_a(p_a)) dp_a$$

$$\int f_a(p_a) dp_a = 1 \quad \text{\{Math. 64\}}$$

Similar definition is possible even when the distribution function f(p,q) of a subsystem is projected in a function of only the positions q. When the distribution functions of all of the subsystems gather at a single state, the entropy becomes zero. However, as the distribution functions, both conjugated distribution functions in an uncertainty relationship are viewed, so an image satisfying this condition will not easily exist. Entropy is a quantity expressing the degree of disorder of an image.

If conducting an experiment preparing the thermodynamic invariant of the quantity of heat Q=TS together with the entropy S, for example, in a subsystem handling only the energy of the lower order invariant of color, the images will be divided into images of a cool impression close to a monochromic image in a low temperature system and into images which are overall colorful and, if having reddish colors, gives a hot impression such as that of the scene of a plateau in high summer. Further, in another subsystem, for example, a subsystem handling higher order invariants of texture, images where uniform texture is packed together tightly cluster at a low temperature system, while abstract-like images accompanied with suitable composition and main subjects cluster at a high temperature system. If explaining this briefly for another subsystem as well, impressions are divided into the featureless, quiet impression in the subsystem of the lower order invariants of texture and a high temperature system of a large number or objects or people jumbled together in high emotions. In the higher order invariants of color, impressions are divided into a low temperature system of sharp impressions such as often seen in Japanese buildings, vacation clothes, etc. and a high low temperature system of deep colors. In this way, a TS invariant plays an important role both in viewing the properties of a subsystem and in verifying if an independent subsystem is being handled.

<Free Energy>

The value of energy $E_n$ is expressed as a vector of n dimensions of the energy level n. Furthermore, a scalar invariant TS is added to define the free energy F.

$$\vec{F} = \left( \vec{E}, -|\vec{E}| \frac{S}{\langle S \rangle} \right) \quad \text{\{Math. 65\}}$$

This is a thermodynamic quantity expressing a macroscopic property of an image system itself. From the macroscopic property of an image, how much a property of a certain adjective is emitted can be measured by obtaining the inner product with the linear combination coefficient α vector forming a model of an adjective.

$$\text{Model adjective vector } \vec{\alpha}_i = (\vec{\alpha}^{(E)}, \alpha^{(TS)}) \quad \text{\{Math. 66\}}$$

$$Q_i = \vec{\alpha}_i \cdot \vec{F} = \frac{\vec{\alpha}_i \cdot \vec{F}}{\langle |\vec{\alpha}_i| \rangle_i \langle |\vec{E}| \rangle}$$

Therefore, a definition somewhat changing the definition of the adjective energy Qi when explaining the density of states of the energy band is used.

1/<S> expresses the Boltzmann constant k defined in subsystem units. The reason is that the method of measuring the Planck's constant h for counting the number of states in subsystem units differs, so when combining subsystems, this plays an important role for matching the scales of the two. In this way, when combining subsystems, the method of normalization of the denominator plays an extremely important role. As the basic thinking for this, the fact that as much as possible a statistical mean should be carried to the denominator is experimentally shown. If the objective is just to keep the inner product in the [−1,1] interval, it may also be considered to carry the maximum value of the absolute value of the molecules to the denominator, but if actually trying to do this, measurement of energy as a whole fails.

The first reason for making such a change is that the form of the inner product operation when finding the adjective energy is very similar to the form of the argument of the Gibbs distribution. That is, the excitation probability with respect to the energy state $E_n$ of Gibbs distribution is expressed as $$w(E_n) = \exp\left(\frac{F - E_n}{T}\right) \quad \{\text{Math. 67}\}$$

Free energy plays the role of a normalization factor for the probability distribution (see Document E5). Further, the macroscopic property of the image system called perception is believed to be in a correspondence described by the density of states distribution in the energy $\rho(E_n)$ through entropy $S(p, q) = S(E)$ of the number of states in phase space in the distribution of fluctuation of the constraining condition $E=E(p,q)$ of the energy function.

The second reason is that free energy $F=E-TS$ means thermodynamic work performed through these (see Document E6). This is interpreted as follows. The microscopic state of an image system (distribution of pixel values) induces perception as thermodynamic work F in the human brain in the form of the quantities of energy E and the quantity of heat TS expressing the macroscopic state. Therefore, the energy band diagram calculated from only the signal value distribution of the image system expresses the macroscopic properties of the image itself, while the state distribution diagram multiplying this with the linear combination coefficient α vector is positioned as a visual quantification of the distribution diagram of perception in the human brain.

In reality, if looking such a picture, an interesting factor of visual psychology can also be explained. That is, the difference in the impressions given by a photograph in a frame of a snow white background color and in a frame of a pitch black background color can be explained by the difference of the free energy. The values of the free energy of a snow white background color and pitch black background color can be calculated. These values differ. A perception corresponding to the amount of change of free energy from the background color to showing a picture in a frame is induced. The amounts of change differ between the former and latter, so the perceptions induced also differ.

The adjective energy measured by free energy, if performing actual experiments with visual psychological quantities, is confirmed to be of a nature of images ordered in an extremely linear relationship. As one interpretation of this, it may be considered that human visual psychological quantities have a logarithmic response characteristic to the amount of light. It is believed that a linear scalar impression is received for the argument of the excitation probability of the Gibbs distribution.

[Document E5] Landau and Lifshitz, Course of Theoretical Physics, Volume 5, "Statistical Physics Part 1" (Third Revised Edition, 1976), Chapter 3 "The Gibbs Distribution", Section 28 "The Gibbs Distribution" and Section 31 "The free energy in the Gibbs distribution"

[Document E6] Landau and Lifshitz, Course of Theoretical Physics, Volume 5, "Statistical Physics Part 1" (Third Revised Edition, 1976), Chapter 2 "Thermodynamic Quantities", Section 13 "Work and Quantity of Heat", Section 15 "The free energy and the thermodynamic potential", and Section 20 "Maximum work done by a body in an external medium"

[5] Evaluation and Performance of Descriptive Model

<Output of Absolute Impression of Adjectives>

An example will be shown expressing a certain image and numerically evaluating the absolute impression by an adjective model of a certain person based on an energy band diagram. The adjectives are described rearranged in the order of the largest value, for example, "fresh"=+0.47, "moist"=+0.02, "rough"=−0.16, "bustling"=−0.75.

<Correlation Matrix of Adjectives>

An example of the correspondence matrix $w_{ij}$ of adjectives for elucidating the correspondence between one adjective and another adjective based on a certain person defined in the fifth embodiment will be shown. This is a value in the range handling the subsystems of color and texture. i and j assign adjective numbers in the order of "fresh", "bustling", "rough, and "moist".

$$w_{ij} = \begin{pmatrix} 0.81 & -0.58 & 0.50 & 0.34 \\ -0.54 & 0.75 & -0.51 & -0.61 \\ 0.42 & -0.45 & 0.93 & 0.27 \\ 0.24 & -0.41 & 0.21 & 0.68 \end{pmatrix} \quad \{\text{Math. 68}\}$$

<Reproducibility>

If preparing a list evaluating the degree of psychological impression in for example five ranks for a population image forming a model of general images and an image group of an adjective model selected from that, this can also be used for determining the linear combination coefficients for constructing an adjective model for the individual invariants. Furthermore, it is possible to determine the linear combination coefficients of the subsystem of the subsum. If going further with this thinking, even for the sum Qi of the entire system, it is possible to measure at what position the mean value of the distribution of Qi of the model adjective image group can be extracted in the higher group for the distribution of the value of Qi of a general image. This can become an indicator for viewing the objective reproduction rate.

As the method of selection of the model image, there is the technique of 0, 1 judgment of correspondence and noncorrespondence and the method of evaluation by ranking the degree of psychological impression. In the case of five-stage evaluation, the psychological technique of the SD method (semantic differential method) is followed in which 0 expresses noncorrespondence and the integers of 1 to 5 express the level of the degree of correspondence.

When calculating the mean value, deviation value, and other statistical data, in the case of a 0-1 judgment, the mean is calculated by an even weight for the model image. On the other hand, in the case of a five-stage evaluation, in the case of a model mean, rankings of a psychological degree of 1 are deemed correspondence with a weight of 0.2, rankings of a psychological degree of 2 are deemed correspondence with a weight of 0.4, . . . and rankings of a psychological degree of 5 are deemed correspondence with a weight in evaluation of 1 in the calculation.

If calculated in this way, if evaluating the mean value of the model image and the spread of its distribution by standard deviation, the error of the mean value can also be evaluated.

That is, in the process of combining this value with the mean value of a general image and its standard deviation to calculate the deviation value showing the position of the mean value of the model image with respect to the distribution of the general image, if also evaluating the error of the deviation value based on the definition, it is possible to give data matched in reliability of evaluation of the deviation value as well.

The reproduction rate in the results of selection of four adjective models of "fresh", "bustling", "rough", and "moist" for testers from among 254 models of general images is shown. In the case of the method of the fifth embodiment, the results of the statistical mean of several persons become deviation values as shown next in order. This means that an extremely high reproduction rate is realized. With the deviation values of 0-100% definition, the values become 85±12%, 86±7%, 98±2%, and 84±12%. Regarding the linearity as well, numericalization is possible if investigating the relationship between the psychological evaluation value and the Qi value.

First, in the fifth embodiment, a stable perceptual retrieval system in the case where there are a large number of images in the adjective model will be described. Next, in the sixth embodiment, a perceptual retrieval system able to handle even the case where there are a small number of adjective model images will be explained. Next, in the seventh embodiment, a single image similar image retrieval system will be explained.

[Fifth Embodiment]

Perceptual Retrieval: Two-Stage Combination of Only "Energy"

1. Conversion to Munsell HVC Color Space

In the same way as the first to fourth embodiments, as the method for preparing the hue planes, as described in the fourth embodiment, a plane from which neutral is separated and a plane from which it is not separated are prepared, the plane from which it is separated is used for describing the aspects of color, while the plane from which it is not separated is used for describing the aspects of texture.

As the method of handling when deeming a hue circle to be a one-dimensional axis, as explained at the start before this embodiment, in the case of color, a cut is made at the point where the power of the histogram becomes the smallest to make the circle one-dimensional. In the case of texture, a cut is made fixed at the origin of the Munsell value. Due to this, the edge planes of the next HVC planes are prepared. The first to fourth embodiments also based on this.

2. Preparation of Edge Images of HVC Planes

Same as explained in second to third embodiments.

3. Preparation of Lower Order Invariants of Color

As the symbols for differentiating this subsystem, sometimes the symbol of Fo is used for the invariants.

3-1. Preparation of Distribution Function of Lower Order System

In the same way as the first embodiment, assume that there are 200 bins of a histogram. A distribution function is quantized in units of bins and cannot be described in any greater accuracy. The distribution function is expressed similarly as follows:

$$f(H), f(V), f(C)$$

Assume that the value of the variable x=H, V, C of the distribution function f(x) is defined by the Munsell value regardless of the number of bins and is normalized to [0,1] using the standard maximum value of the Munsell value so as to satisfy uniformity among HVC. However, there is no upper limit to the value of C, so while unusual, the value of 1 is sometimes exceeded. That is, $$H \equiv H/100,$$

$$V \equiv V/10,$$

$$C \equiv C/20.$$

Further, the distribution function satisfies the conditions of normalization. Therefore, the probability density is described.

$$\int f(x)dx = 1 \qquad \{\text{Math. 69}\}$$

Regarding f(H), assume that the probability density of the neutral hue is described in the single bin of f(N).

3-2. Calculation of Entropy

The entropy S is calculated from the distribution function f(x). The case where the value of the distribution function is 0, in the sense of not taking that state, is excluded from the integration interval. If expressing the color planes of the distribution function differentiated by $(\alpha)$, entropies are calculated from the distribution functions of the H, V, and C planes. The sum of these expresses the entropy of the subsystem projected into the lower order system of color.

$$S^{(\alpha)} = -\int_{f^{(\alpha)}(x)=0} f^{(\alpha)}(x) \ln(f^{(\alpha)}(x)) dx$$

$$S = S^{(H)} + S^{(V)} + S^{(C)} \qquad \{\text{Math. 70}\}$$

This value is made $S_{Fo}$.

3-3. Calculation of Elements $p_n$ of Momentum

The mean value $\langle x \rangle$ and the standard deviation value $\sigma_x$ are calculated from the distribution function f(x).

$$\langle x \rangle = \int x f(x) dx$$

$$\sigma_x^2 = \int (x - \langle x \rangle)^2 f(x) dx \qquad \{\text{Math. 71}\}$$

At the hue plane as well, a distribution function from which the neutral component has been removed is used and the mean value and deviation value are calculated on the axis of the hue circle made one-dimensional. However, the mean value $\langle H \rangle$ of hue is expressed by two components on a hue circle of a radius 1 by a complex number $\exp(2\pi i \langle H_{\neq N} \rangle)$ of a magnitude satisfying $1 < H_{\neq N} | = 1$ at all times. At this time, it is assumed that the effect of removal of neutral acts on the radius showing the magnitude of the hue. For this reason, the neutral ratio pop(N) is calculated. That is, $$\langle H_{\neq N} \rangle = \int_{H \neq N} H f(H) dH$$

$$\sigma_{H \neq N}^2 = \int_{H \neq N} (H - \langle H_{\neq N} \rangle)^2 f(H) dH$$

$$pop(N) = \int_{H=N} f(H) dH \qquad \{\text{Math. 72}\}$$

x=H, V, C, so these are linked as elements $p_n$ of momentum.

$$\langle H \rangle, \langle V \rangle, \langle C \rangle, \sigma_H, \sigma_V, \sigma_C$$

The parts relating to hue have to be defined as follows: The components separated into two are assigned other element numbers n.

$$\langle H \rangle = \begin{cases} (1 - pop(N)) |\langle H_{\neq N} \rangle| \cos(2\pi \langle H_{\neq N} \rangle) \\ (1 - pop(N)) |\langle H_{\neq N} \rangle| \sin(2\pi \langle H_{\neq N} \rangle) \end{cases} \qquad \{\text{Math. 73}\}$$

$$\sigma_H = (1 - pop(N)) \sigma_{H \neq N}$$

Note that the values of the elements of momentum are all described in the range of [0,1].

3-4. Calculation of Elements $E_n$ of Energy

As the energy elements $E_n$, the following are defined.

$$(\alpha)(\alpha) \qquad \{\text{Math. 74}\}$$

amam:

$$\langle H \rangle \langle H \rangle = (1 - \text{pop}(N))^2 |\langle H_{\neq N} \rangle|^2$$

$$\langle V \rangle \langle V \rangle$$

$$\langle C \rangle \langle C \rangle$$

amas:

$$\langle H \rangle \sigma_H =$$

$$\begin{cases} (1 - \text{pop}(N)) |\langle H_{\neq N} \rangle| \cos(2\pi \langle H_{\neq N} \rangle) \cdot (1 - \text{pop}(N)) \sigma_{H \neq N} \\ (1 - \text{pop}(N)) |\langle H_{\neq N} \rangle| \sin(2\pi \langle H_{\neq N} \rangle) \cdot (1 - \text{pop}(N)) \sigma_{H \neq N} \end{cases}$$

$$\langle V \rangle \sigma_V$$

$$\langle C \rangle \sigma_C$$

asas:

$$\sigma_H \sigma_H = (1 - \text{pop}(N))^2 (\sigma^2)_{H \neq N}$$

$$\sigma_V \sigma_V$$

$$\sigma_C \sigma_C$$

$(\beta)(\beta)$:

ambm:

$$\langle H \rangle \langle V \rangle =$$

$$\begin{cases} (1 - \text{pop}(N)) |\langle H_{\neq N} \rangle| \cos(2\pi \langle H_{\neq N} \rangle) \cdot \langle V \rangle \\ (1 - \text{pop}(N)) |\langle H_{\neq N} \rangle| \sin(2\pi \langle H_{\neq N} \rangle) \cdot \langle V \rangle \end{cases}$$

$$\langle V \rangle \langle C \rangle$$

$$\langle C \rangle \langle H \rangle =$$

$$\begin{cases} \langle C \rangle \cdot (1 - \text{pop}(N)) |\langle H_{\neq N} \rangle| \cos(2\pi \langle H_{\neq N} \rangle) \\ \langle C \rangle \cdot (1 - \text{pop}(N)) |\langle H_{\neq N} \rangle| \sin(2\pi \langle H_{\neq N} \rangle) \end{cases}$$

ambs:

$$\langle H \rangle \sigma_V =$$

$$\begin{cases} (1 - \text{pop}(N)) |\langle H_{\neq N} \rangle| \cos(2\pi \langle H_{\neq N} \rangle) \cdot \sigma_V \\ (1 - \text{pop}(N)) |\langle H_{\neq N} \rangle| \sin(2\pi \langle H_{\neq N} \rangle) \cdot \sigma_V \end{cases}$$

$$\langle V \rangle \sigma_C$$

$$\langle C \rangle \sigma_H = \langle C \rangle (1 - \text{pop}(N)) \sigma_{H \neq N}$$

asbm:

$$\sigma_H \langle V \rangle = (1 - \text{pop}(N)) \sigma_{H \neq N} \langle V \rangle$$

$$\sigma_V \langle C \rangle$$

$$\sigma_C \langle H \rangle =$$

$$\begin{cases} \sigma_C \cdot (1 - \text{pop}(N)) |\langle H_{\neq N} \rangle| \cos(2\pi \langle H_{\neq N} \rangle) \\ \sigma_C \cdot (1 - \text{pop}(N)) |\langle H_{\neq N} \rangle| \sin(2\pi \langle H_{\neq N} \rangle) \end{cases}$$

asbs:

$$\sigma_H \sigma_V = (1 - \text{pop}(N)) \sigma_{H \neq N} \sigma_V$$

$$\sigma_V \sigma_C$$

$$\sigma_C \sigma_H = \sigma_C (1 - \text{pop}(N)) \sigma_{H \neq N}$$

Note that the values of the elements of energy are all described in the range of $[-1, 1]$.

3-5. Calculation of Temperature of Subsystem

If expressing the values of the energy elements all together by a vector, the energy vector of a subsystem can be defined.

$$\vec{E} = (E_1, E_2, \ldots, E_n) \qquad \{\text{Math. 75}\}$$

If calculating the norm of the energy vector of the subsystem, it is possible to define the temperature T of the image relating to the subsystem.

$$T = |\vec{E}| = \sqrt{E_1^2 + E_2^2 + \ldots E_n^2} \qquad \{\text{Math. 76}\}$$

3-6. Calculation of Free Energy of Subsystem

The thermodynamic invariant of free energy is defined using the thus calculated vector of the energy elements $E_n$, the temperature T of the image, and the macroscopic quantity of the entropy S. The free energy is a vector of the energy vector plus one scalar quantity.

$$\vec{F} = \left( \vec{E}, -|\vec{E}| \frac{S}{\langle S \rangle} \right) = \left( \vec{E}, -T \frac{S}{\langle S \rangle} \right) \qquad \{\text{Math. 77}\}$$

Here, $\langle \ \rangle$ expresses the statistical mean relating to any general image. Therefore, $\langle S \rangle$ calculates the entropy of an image for any of a large number of general images prepared in advance. These mean values have to be calculated in advance. Physically, $1/\langle S \rangle$ performs the role of the Boltzmann constant k for linking the microscopic number of states on a phase space and the macroscopic quantity of entropy based on Planck's constant defined in this subsystem. That is, regarding the number of states in the phase space $$\Delta \Gamma = \Delta p \Delta q / (2\pi k)^s \qquad \{\text{Math. 78}\}$$

(where s is the number of freedoms of a system), entropy is linked in the relationship of $S = \ln \Delta \Gamma$ (see Document E3). Further, to link temperature with the amount of energy, kT is used for measurement through the Boltzmann constant k. Note that usually, the Boltzmann constant defines also the entropy side. For temperature, a definition is often employed enabling description by the same size of scale as with the energy (see Document E7). That is, $S = k \ln \Delta \Gamma$. Regarding the quantum state of an image system, the definition of Planck's constant changes by the subsystem, so such an absolutely unchanging physical constant cannot be defined. Therefore, an operation is performed for normalization for measurement, by an absolute reference, of the number of states which each image can take based on the mean number of states which general images can take in the subsystem. This performs the same role as the Boltzmann constant. The Boltzmann constant of this subsystem can be expressed by the following equation:

$$k_{Fo} = \frac{1}{\langle S_{Fo} \rangle} \qquad \{\text{Math. 79}\}$$

[Document E7] Landau and Lifshitz, Course of Theoretical Physics, Volume 5, "Statistical Physics Part 1" (Third Revised Edition, 1977), Chapter 2 "Thermodynamic Quantities", Section 9 "Temperature"

4. Preparation of Higher Order Invariants of Color

As the symbol for differentiating this subsystem, sometimes the symbol F will be used for the invariants.

4-0. Hilbelt Space Expression of Distribution Function of Lower Order System

The histograms of the colors of HVC planes are positioned as distribution functions of a lower order system of color. A distribution function of a lower order system can also be interpreted as a coordinate space q able to be measured by the original coordinate system. This is converted to Chebyshev functions to be expressed as frequency and projected into the momentum space p. This is an equivalent expression of viewing the original distribution function from a different aspect. As the base functions forming the Hilbelt space, the properties of distribution functions of a lower order system are added to select a function of a complete orthogonal system expressed as compactly as possible. However, due to the uncertainty principle of coordinate space and momentum space $$\Delta p \Delta q \geqq h \quad \{\text{Math. 80}\}$$

when one is expressed compactly, the other is expressed broadly. It is optimal to select a function system giving the smallest uncertainty of the two.

In the same way as the first embodiment, this is defined so that the values of the expansion coefficients fit in the range of $[-1,1]$.

$$f^{(\alpha)}(x) = \sum_{n=0}^{2N-1} c_n^{(\alpha)} T_n(x) \quad (\alpha) = H, V, C_o \quad \{\text{Math. 81}\}$$

When $(\alpha)$ is H, x=H, when $(\alpha)$ is V, x=V, and when $(\alpha)$ is C, x=C. The value of N is made 100.

4-1. Preparation of Distribution Function of Higher Order System

The power spectrum of the coefficients expanded by Chebyshev expansion is defined as the distribution function of a higher order system relating to color. The distribution functions of higher order systems can be defined for the three H, V, and C planes. This is normalized to express the probability density.

$$f^{(\alpha)}(k) = \frac{(c_k^{(\alpha)})^2}{\sum_k (c_k^{(\alpha)})^2} \quad (\alpha) = H, V, C_o \quad \{\text{Math. 82}\}$$

When the distribution function of the higher order system of color has 2N=200, the value of k is quantized to 200 bins.

4-2. Calculation of Entropy

The entropy S is calculated from the distribution function f(x). The case where the value of the distribution function is 0, in the sense of not taking that state, is excluded from the integration interval. If expressing the color planes of the distribution function differentiated by $(\alpha)$, entropies are calculated from the distribution functions of the H, V, and C planes. The sum of these expresses the entropy of the subsystem projected into the higher order system of color $$S^{(\alpha)} = -\int f^{(\alpha)}(k) \neq 0 f^{(\alpha)}(k) \ln(f^{(\alpha)}(k)) dk$$

$$S = S^{(H)} + S^{(V)} + S^{(C)} \quad \{\text{Math. 83}\}$$

This value is made $S_F$.

4-3. Calculation of Elements $p_n$ of Momentum

Chebyshev expansion coefficients enable a grasp of momenta in a Hilbelt space. Therefore, the elements $p_n$ of momentum are the expansion coefficients themselves:

$$p_n^{(\alpha)} = c_n^{(\alpha)}(\alpha) = H, V, C.$$

The momentums of the different color planes are expressed together in order by $p_n$. These form the momentum $p=(p_1, p_2, \ldots, p_i, \ldots)$ of the phase space of this subsystem.

4-4. Calculation of Elements $E_n$ of Energy

When constructing an energy matrix expressing mechanical energy by products of momentum, in the fifth embodiment, a submatrix is created in units of angular momentum and an expanded trace is taken to form a complete system. Due to this, the eigenvalues of the energy are found. These become the elements of the energy. Basically, energy invariants are constructed by the same procedure as in the first embodiment.

When defining the elements of energy, a relationship guaranteed by the Schwarz inequality is used and normalization is performed by the pure trace of the energy matrix, that is the sum of the diagonal elements, so that each fall in the range of $[-1,1]$. Therefore, only the stationary state constructed by only the pure trace cannot be normalized. The other energy elements are all normalized and the expanded trace defined. Regarding the value of the pure diagonal sum, since each of the expansion coefficients of the distribution function is defined in the range of $[-1,1]$, even if slightly sticking out, a value of a range of about $[0,1]$ is found.

The energy eigenvalue expresses the amount of absolute energy. Even in finally taking the linear combination, the energy eigenvalue having a finite value and the linear combination coefficients having values not zero have different meanings. The energy eigenvalue expresses the existence of energy elements emitted by an image itself. The linear combination coefficients only express if elements are important for a certain adjective. Therefore, the energy eigenvalue must be measured by an absolute reference. Regarding the problem of the above-mentioned diagonal sum sticking out slightly over the range of $[0,1]$, it is possible to assume that the zero point energy $\epsilon_0$ is added to the energy of the diagonal sum from the original and the amount corresponding to the zero point energy is subtracted for the definition. Even if introducing zero point energy, there is no effect at all on the linear combination coefficients. Here, in the case of the Chebyshev expansion coefficients of the higher order system of color, the value of ⅓=0.333 or so is introduced as the zero point energy. Further, in the case of a spherical Bessel expansion coefficient of a higher order system explained later, the diagonal sum does not exceed the range of $[0,1]$, so there is no need to introduce the zero point energy.

Below, when considering $c_n$ divided into subgroups of angular momentum units, the expansion coefficients of the angular momentum quantum number l=0 are expressed as $c_{0n}$ and the expansion coefficients of the angular momentum quantum number l=1 are expressed as $c_{1n}$. Therefore, the number of elements of the expansion coefficients is divided into N number of half each. The number of elements of the subgroups is counted by n=1, 2, ..., N. Further, it is possible to give only one energy element expressing the pure diagonal sum by a separate definition.

(Separate definition) $\{\text{Math. 84}\}$ $(\alpha)(\alpha)$ $a0a0p, e$:

$$E_{n=1-k=0, l-1=0}^{(\alpha)(\alpha)+} = \left\{ \sum_{}^{N} (c_{01}^{(\alpha)})^2 + \sum_{}^{N} (c_{11}^{(\alpha)})^2 \right\} - \varepsilon_0 \quad i = k$$

-continued (General definition)

$(\alpha)(\alpha)$ $a0a0p$, $e/i$:

$$E_{n-l-k,l-l'-0}^{(\alpha)(\pm\alpha)+} = \frac{\frac{1}{4}\left\{\begin{array}{l}\sum_{k=i+n,i=1}^{N}(c_{0i}^{(\alpha)}c_{0k}^{(\alpha)}+c_{0k}^{(\alpha)}c_{0i}^{(\alpha)}) \pm \\ \sum_{k=i=n,i=l}^{N}(c_{1i}^{(\alpha)}c_{1k}^{(\alpha)}+c_{1k}^{(\alpha)}c_{1c}^{(\alpha)})\end{array}\right\}}{\frac{1}{2}\left\{\sum_{i=1}^{N}(c_{0l}^{(\alpha)})^2+\sum_{i=1}^{N}(c_{1l}^{(\alpha)})^2\right\}} \quad i \neq k$$

$a0a1p$, $e$:

$$E_{n-i-k,l-l'-1}^{(\alpha)(-\alpha)+} = \frac{\frac{1}{4}\left\{\begin{array}{l}\sum_{k=1+n,i=1}^{N}(c_{0l}^{(\alpha)}c_{1k}^{(\alpha)}+c_{0k}^{(\alpha)}c_{1l}^{(\alpha)})+\\ \sum_{k=i+n,i=1}^{N}(c_{1i}^{(\alpha)}c_{0k}^{(\alpha)}+c_{1k}^{(\alpha)}c_{01}^{(\alpha)})\end{array}\right\}}{\sqrt{\sum_{i=1}^{N}(c_{0i}^{(\alpha)})^2}\sqrt{\sum_{i=1}^{N}(c_{1i}^{(\alpha)})^2}}$$

$a0a1m$, $i$:

$$E_{n=i-k,l-l'=1}^{(\alpha)(-\alpha)-} = \frac{\frac{1}{4}\left\{\begin{array}{l}-\sum_{k=i+n,i=1}^{N}(c_{0i}^{(\alpha)}c_{1k}^{(\alpha)}-c_{0k}^{(\alpha)}c_{1i}^{(\alpha)})+\\ \sum_{k=i+n,i=1}^{N}(c_{1i}^{(\alpha)}c_{0k}^{(\alpha)}-c_{1k}^{(\alpha)}c_{0i}^{(\alpha)})\end{array}\right\}}{\sqrt{\sum_{i=1}^{N}(c_{0i}^{(\alpha)})^2}\sqrt{\sum_{i=1}^{N}(c_{1i}^{(\alpha)})^2}} \quad i \neq k$$

$(\alpha)(\beta)$ $a0b0p$, $e/i$:

$$E_{n-i-k,l-l'-0}^{(\alpha)(\pm\beta)+} = \frac{\frac{1}{4}\left\{\begin{array}{l}\sum_{k=l+n,i=1}^{N}\left(c_{0i}^{(\alpha)}c_{0k}^{(\beta)}+c_{0k}^{(\alpha)}c_{0i}^{(\beta)}\right) \pm \\ \sum_{k=i+n,i=1}^{N}\left(c_{1l}^{(\alpha)}c_{1k}^{(\beta)}+c_{1k}^{(\alpha)}c_{1l}^{(\beta)}\right)\end{array}\right\}}{\frac{1}{2}\left\{\begin{array}{l}\sqrt{\sum_{i=1}^{N}(c_{0i}^{(\alpha)})^2}\sqrt{\sum_{i=1}^{N}(c_{0i}^{(\beta)})^2}+\\ \sqrt{\sum_{i=1}^{N}(c_{1i}^{(\alpha)})^2}\sqrt{\sum_{i=1}^{N}(c_{1i}^{(\beta)})^2}\end{array}\right\}}$$

$a0b0m$, $e/i$:

$$E_{n-i-k,l-l'-0}^{(\alpha)(\pm\beta)-} = \frac{\frac{1}{4}\left\{\begin{array}{l}\sum_{k=i+n,i-1}^{N}\left(c_{0i}^{(\alpha)}c_{0k}^{(\beta)}-c_{0k}^{(\alpha)}c_{0l}^{(\beta)}\right) \pm \\ \sum_{k=n,i=1}^{N}\left(c_{1i}^{(\alpha)}c_{1k}^{(\beta)}-c_{1k}^{(\alpha)}c_{1i}^{(\beta)}\right)\end{array}\right\}}{\frac{1}{2}\left\{\begin{array}{l}\sqrt{\sum_{i=1}^{N}(c_{0i}^{(\alpha)})^2}\sqrt{\sum_{i=1}^{N}(c_{0i}^{(\beta)})^2}+\\ \sqrt{\sum_{i=1}^{N}(c_{1l}^{(\alpha)})^2}\sqrt{\sum_{i=1}^{N}(c_{1i}^{(\beta)})^2}\end{array}\right\}} \quad i \neq k$$

$a0b1p$, $e/i$:

$$E_{n-i-k,l-l'=1}^{(\alpha)(\pm\beta)+} = \frac{\frac{1}{4}\left\{\begin{array}{l}\pm\sum_{k=i+n,i=1}^{N}\left(C_{0i}^{(\alpha)}C_{1k}^{(\beta)}+c_{0,k+1}^{(\alpha)}C_{1i}^{(\beta)}\right)+\\ \sum_{k=1+n,i=1}^{N}\left(c_{1i}^{(\alpha)}c_{0,k+1}^{(\beta)}+c_{1k}^{(\alpha)}c_{0l}^{(\beta)}\right)\end{array}\right\}}{\frac{1}{2}\left\{\begin{array}{l}\sqrt{\sum_{i=1}^{N}(c_{0i}^{(\alpha)})^2}\sqrt{\sum_{i=1}^{N}(c_{1i}^{(\beta)})^2}+\\ \sqrt{\sum_{i=1}^{N}(c_{1i}^{(\alpha)})^2}\sqrt{\sum_{i=1}^{N}(c_{0i}^{(\beta)})^2}\end{array}\right\}}$$

$a0b1m$, $e/i$:

$$E_{n=l-k,l-l'=1}^{(\alpha)(\pm\beta)-} = \frac{\frac{1}{4}\left\{\begin{array}{l}\pm\sum_{k=i+n,i=1}^{N}\left(c_{0i}^{(\alpha)}c_{1k}^{(\beta)}-c_{0,k+1}^{(\alpha)}c_{1i}^{(\beta)}\right)+\\ \sum_{k=i+n,i=1}^{N}\left(c_{1i}^{(\alpha)}c_{0,k+1}^{(\beta)}-c_{1k}^{(\alpha)}c_{0i}^{(\beta)}\right)\end{array}\right\}}{\frac{1}{2}\left\{\begin{array}{l}\sqrt{\sum_{i=1}^{N}(c_{0i}^{(\alpha)})^2}\sqrt{\sum_{i=1}^{N}(c_{1i}^{(\beta)})^2}+\\ \sqrt{\sum_{i=1}^{N}(c_{1i}^{(\alpha)})^2}\sqrt{\sum_{i=1}^{N}(c_{0i}^{(\beta)})^2}\end{array}\right\}}$$

Here, when taking a value such as $c_{0k}=c_{0,N+n}$, the vector $\{c_{0k}\}$ is connected in a ring inside a subgroup of the same angular momentum such as $c_{0,N+n}=c_{0,n}$, and the initial point is returned to for redefinition. In the same way, $c_{1,N+n}=c_{1,n}$. These energy elements are expressed together as $E_n$.

4-5. Calculation of Temperature of Subsystem

The energy vector of a subsystem and the temperature T of the image of a subsystem can be defined in the same way as above.

$$\vec{E}=(E_1,E_2,\ldots,E_n)$$

$$T=|\vec{E}|=\sqrt{E_1^2+E_2^2+\ldots E_n^2} \quad \{\text{Math. 85}\}$$

4-6. Calculation of Free Energy of Subsystem

The free energy of a subsystem can be defined in the same way as above.

$$\vec{F} = \left(\vec{E}, -|\vec{E}|\frac{S}{\langle S \rangle}\right) = \left(\vec{E}, -T\frac{S}{\langle S \rangle}\right) \quad \{\text{Math. 86}\}$$

The Boltzmann constant of this subsystem is measured by the reciprocal of the statistical mean of any image of entropy of this subsystem.

$$k_F = \frac{1}{\langle S_F \rangle} \quad \{\text{Math. 87}\}$$

5. Preparation of Lower Order Invariants of Texture

As a symbol for differentiating this subsystem, sometimes the symbol of Go is used for the invariants.

5-1. Preparation of Distribution Function of Lower Order System

In the same way as the third embodiment, assume that there are 200 bins of a histogram. A distribution function is quantized in units of bins and cannot be described in any greater accuracy. The distribution function is expressed similarly as follows:

f(ΔH), f(ΔV), f(ΔC)

Assume that the value of the variable x=ΔH, ΔV, ΔC of the distribution function f(x) is defined by the Munsell value regardless of the number of bins and is normalized to [−1,1] as the differential so as to satisfy uniformity among HVC. That is,

ΔH≡ΔH/100,

ΔV≡ΔV/10,

ΔC≡ΔC/20.

Further, the distribution function satisfies the conditions of normalization. Therefore, the probability density is described.

$$\int f(x)dx = 1 \quad \{\text{Math. 88}\}$$

5-2. Calculation of Entropy

The entropy S is calculated from the distribution function f(x). The case where the value of the distribution function is 0, in the sense of not taking that state, is excluded from the integration interval. If expressing the color planes of the distribution function differentiated by (α), entropies are calculated from the distribution functions of the H, V, and C planes. The sum of these expresses the entropy of the subsystem projected into the lower order system of texture.

$$S^{(\alpha)} = -\int_{f^{(\alpha)}(x) \neq 0} f^{(\alpha)}(x) \ln(f^{(\alpha)}(x)) dx$$

$$S = S^{(H)} + S^{(V)} + S^{(C)} \quad \{\text{Math. 89}\}$$

This value is made $S_{Go}$.

5-3. Calculation of Elements $p_n$ of Momentum

The mean value <x> and the standard deviation value $\sigma_x$ are calculated from the distribution function f(x).

$$\langle x \rangle = \int x f(x) dx$$

$$\sigma_x^2 = \int (x - \langle x \rangle)^2 f(x) dx \quad \{\text{Math. 94}\}$$

Since x=ΔH, ΔV, ΔC, these correspond to the elements $p_n$ of momentum.

<ΔH>,<ΔV>,<ΔC>,$\sigma_{\Delta H}, \sigma_{\Delta V}, \sigma_{\Delta C}$

Note that the values of the elements of momentum are all described in the range of [−1,1].

5-4. Calculation of Elements $E_n$ of Energy

As the energy elements $E_n$, the following are defined. Their values are all defined as real values.

(α)(α)

amam:

<ΔH><ΔH>

<ΔV><ΔV>

<ΔC><ΔC> amas:

<ΔH>$\sigma_{\Delta H}$

<ΔV>$\sigma_{\Delta V}$

<ΔC>$\sigma_{\Delta C}$ asas:

$\sigma_{\Delta H} \sigma_{\Delta H}$ $\sigma_{\Delta V} \sigma_{\Delta V}$ $\sigma_{\Delta C} \sigma_{\Delta C}$ (β)(β):

ambm:

<ΔH><ΔV>

<ΔV><ΔC>

<ΔC><ΔH> ambs:

<ΔH>$\sigma_{\Delta V}$

<ΔV>$\sigma_{\Delta C}$

<ΔC>$\sigma_{\Delta H}$ asbm:

$\sigma_{\Delta H}$<ΔV>

$\sigma_{\Delta V}$<ΔC>

$\sigma_{\Delta C}$<ΔH> asbs:

$\sigma_{\Delta H} \sigma_{\Delta V}$ $\sigma_{\Delta V} \sigma_{\Delta C}$ $\sigma_{\Delta C} \sigma_{\Delta H}$ Note that the values of the elements of energy are all described in the range of [−1,1].

5-5. Calculation of Temperature of Subsystem

The energy vector of a subsystem and the temperature T of the image of a subsystem can be defined in the same way as above.

5-6. Calculation of Free Energy of Subsystem

The free energy of a subsystem can be defined in the same way as above.

$$\vec{F} = \left(\vec{E}, -|\vec{E}|\frac{S}{\langle S \rangle}\right) = \left(\vec{E}, -T\frac{S}{\langle S \rangle}\right) \quad \{\text{Math. 91}\}$$

The Boltzmann constant of this subsystem is measured by the reciprocal of the statistical mean of any image of entropy of this subsystem.

$$k_{Go} = \frac{1}{\langle S_{Go} \rangle} \quad \{\text{Math. 92}\}$$

6. Preparation of Higher Order Invariants of Texture

The letter "G" is sometimes used as a symbol for differentiating this subsystem for invariants.

6-0. Hilbelt Space Expression of Distribution Function of Lower Order System The histograms of the edge images of HVC planes are positioned as distribution functions of a lower order system of texture. A distribution function of a lower order system can also be interpreted as a coordinate space able to be measured by the original coordinate system. This is converted by spherical Bessel conversion to a frequency expression and projected into the momentum space p. This is an equivalent expression viewing the original distribution function from a different aspect. As the base functions forming the Hilbelt space, the properties of distribution functions of a lower order system are added to select a function of a complete orthogonal system expressed as compactly as possible. However, due to the uncertainty principle of coordinate space and momentum space $$\Delta p \Delta q \geq h \quad \{\text{Math. 93}\}$$

when one is expressed compactly, the other is expressed broadly. It is optimal to select a function system giving the smallest uncertainty of the two.

In the same way as the third embodiment, in the present embodiment, the case of expansion by the s and p orbits will be explained. Note that even in the case of expansion by the s, p, d, and f orbits, as explained in the start, similar expansion is possible.

$$f^{(\alpha)}(x) = \sum_{l=0}^{1} \sum_{n=1}^{N} c_{ln}^{(\alpha)} j_l\left(\alpha_{ln}\frac{x}{a}\right) \quad (\alpha) = H, V, C_o \quad \{\text{Math. 94}\}$$

When ($\alpha$) is H, x=$\Delta$H, when ($\alpha$) is V, x=$\Delta$V, and when ($\alpha$) is C, x=$\Delta$C. The value of N is 100.

6-1. Preparation of Distribution Function of Higher Order System

The power spectrum of the coefficients expanded by spherical Bessel expansion is defined as the distribution function of a higher order system relating to texture. The distribution functions of higher order systems can be defined for the three H, V, and C planes. This is normalized to express the probability density.

$$f^{(\alpha)}(l, k) = \frac{(c_{lk}^{(\alpha)})^2}{\sum_l \sum_k (c_{lk}^{(\alpha)})^2} \quad (\alpha) = H, V, C_o \quad \{\text{Math. 95}\}$$

When the distribution function of the higher order system of texture has N=100, for one angular momentum, the value of k is quantized to 100 bins. The value of l takes 0 and 1, so is quantized in total to 2×100=200 bins.

6-2. Calculation of Entropy

The entropy S is calculated from the distribution function f(l,k). When the value of the distribution function is 0, it means that that state is not taken and therefore this is excluded from the integration interval. If expressing the color planes of the distribution function differentiated by ($\alpha$), entropies are calculated from the distribution functions of the edge images of the H, V, and C planes. The sum of these expresses the entropy of the subsystem projected into the higher order system of texture.

$$S^{(\alpha)} = -\iint_{f^{(\alpha)}(l,k) \neq 0} f^{(\alpha)}(l,k) \ln(f^{(\alpha)}(l,k)) dk dl$$

$$S = S^{(H)} + S^{(V)} + S^{(C)} \quad \{\text{Math. 96}\}$$

This value is made $S_G$.

6-3. Calculation of Elements $p_n$ of Momentum

Spherical Bessel expansion coefficients can be grasped as momentum in a Hilbelt space. Therefore, the elements $p_n$ of momentum are the expansion coefficients themselves.

$$p_n^{(\alpha)} = c_{0n}^{(\alpha)}$$

$$p_{N+n}^{(\alpha)} = c_{1n}^{(\alpha)} (\alpha) = H, V, C.$$

The momentums of the different color planes are expressed together in order by $p_n$. These form the momentum p=($p_1$, $p_2$, ..., $p_i$, ...) of the phase space of this subsystem.

6-4. Calculation of Elements $E_n$ of Energy

In expansion to the s and p orbits, the equation is exactly the same as that defined for the higher order system of color, that is, the Chebyshev expansion coefficients. The Chebyshev expansion coefficients are merely replaced with spherical Bessel expansion coefficients. Note that in the case of a higher order system of texture, $\epsilon_0=0$ may be set for the zero point energy.

6-5. Calculation of Temperature of Subsystem

The energy vector of a subsystem and the temperature T of the image of a subsystem can be defined in the same way as above.

6-6. Calculation of Free Energy of Subsystem

The free energy of a subsystem can be defined in the same way as above.

$$\vec{F} = \left(\vec{E}, -|\vec{E}|\frac{S}{\langle S \rangle}\right) = \left(\vec{E}, -T\frac{S}{\langle S \rangle}\right) \quad \{\text{Math. 97}\}$$

The Boltzmann constant of this subsystem is measured by the reciprocal of the statistical mean of any image of the entropy of this subsystem.

$$k_G = \frac{1}{\langle S_G \rangle} \quad \{\text{Math. 98}\}$$

7. Combination of Adjective Energy of Subsystem

7-1. Setting of Adjectives

The adjectives presented by the perceptual retrieval system using adjectives as keywords are determined and i-th adjectives are assigned as symbols for differentiating them. As adjectives, for example, there are "brisk", "busy", "boisterous", "moist", etc.

7-2. Construction of General Image Models

A large number of general images are randomly collected to make a model of general images. Usually, an order of several hundred images are prepared. Furthermore, if expecting accuracy, the order becomes 10s of thousands. The greater the number, the stabler the statistics. These are used to construct a distribution function p(x) of the general model image group explained below. The distribution function p(x) expresses the image frequency which general energy can take in a unit energy interval taking the actual value $E_n$. If dividing the energy interval as bins, the result becomes a frequency distribution function.

7-3. Construction of Adjective Model Image

Each of the prepared general image models was evaluated for psychological impression of correspondence with an i-th adjective to prepare distribution data of an adjective model image. There are two methods of preparation. Either may be used. That is, in the case of simple correspondence or noncorrespondence, the integers of 1 and 0 are assigned and images assigned "1" are used as images of the same weight. Further, the image groups are used to construct a distribution function q(x) of the adjective model image groups. There is also the method of ranking the case of noncorrespondence as "0" and ranking the degree of absolute psychological impression in the case of correspondence in five levels of "1" to "5". In this case, in building the distribution data of the model, a 5-ranked image is given a weight of 1.0, a 4-ranked image is given a weight of 0.8, a 3-ranked image is given a weight of 0.6, a 2-ranked image is given a weight of 0.4, and a 1-ranked image is given a weight of 0.2 to construct a frequency distribution q(x) explained below.

7-4. Calculation of Deviation Value in Distribution in Elements

For the individual energy elements $E_n$ of each of the subsystems defined above, separately for each, the distribution of the value of $E_n$ taken by the general model image and the distribution of the value of $E_n$ taken by the adjective model image were investigated. When the adjective model image is distributed at a position different from the mean of the general model images, it is judged that its energy elements act specifically for that adjective and weighting is given in the form of linear combination coefficients when taking the energy sum. The extent of the specific action can be given by the deviation value of the position of the adjective model images with respect to the distribution of general model images.

The energy elements $E_n$ are expressed by the variable x, the distribution function of the general model image is designated as p(x), and the distribution of the adjective model image is designated as q(x). The mean value of the energy elements $E_n$ of the general model image is designated as $m_p$, its standard deviation is designated as $\sigma_p$, the mean value of the energy elements $E_n$ of the adjective model image is designated as $m_q$, and its standard deviation is designated as $\sigma_q$. At this time, the linear combination coefficients $\alpha_i(E_n)$ for the energy elements $E_n$ corresponding to the i-th adjective can be expressed as follows using the error function erf(x). The linear combination coefficients are defined so as to become 0 when positioned at the same location as the mean value of a general model image and to become ±1 when positioned at the two ends. Further, the fluctuation of the deviation value of an adjective model image group, that is, the error $\delta\alpha_i(E_n)$ of the linear combination coefficients can also be evaluated.

Regarding energy elements $E_n$ $$\int p(x)dx = 1 \int q(x)dx = 1$$

$$m_p = \int xp(x)dx \, m_q = \int xq(x)dx$$

$$\sigma_p^2 = \int (x-m_p)^2 p(x)dx \, \sigma_q^2 = \int (x-m_q)^2 q(x)dx \quad \{\text{Math. 99}\}$$

Deviation Value and its Error $$\alpha_i(E_n) = \text{erf}\left(\frac{m_q(E_n) - m_p(E_n)}{\sqrt{2}\,\sigma_p(E_n)}\right) \quad \{\text{Math. 100}\}$$

$$\delta\alpha_i(E_n) = \sqrt{\frac{2}{\pi}} \exp\left(-\left(\frac{m_q(E_n) - m_p(E_n)}{\sqrt{2}\,\sigma_p(E_n)}\right)^2\right) \cdot \frac{\sigma_q(E_n)}{\sigma_p(E_n)}$$

Here, $$\text{erf}(x) = \frac{2}{\sqrt{\pi}} \int_0^x \exp(-t^2)\,dt \quad \{\text{Math. 101}\}$$

$\text{erf}(\pm\infty)=\pm 1$, and inverts the value of $\text{erf}(0)=0$.

7-5. Calculation of Subenergy of Subsystem Units

A certain image is input and whether that provides an impression of an i-th adjective is investigated. This is done by calculating the energy elements of the subsystems for the input image and using linear combination coefficients determined by the adjective model to find the total sum of the absolute values of the adjective energies. In finding this total sum, first, the subsums are obtained in subsystem units. Here, the inner product of the free energy vector of the subsystem with the model adjective vector expressing the linear combination coefficients by vector expression is obtained to define the subsum. At this time, even if adding one scalar quantity of the quantity of heat TS as the free energy, the corresponding linear combination coefficients are defined. That is, Free Energy Vector $$\vec{F} = \left(\vec{E}, -T\frac{S}{\langle S \rangle}\right) \quad \{\text{Math. 102}\}$$

Model Adjective Vector $$\vec{\alpha}_i = (\vec{\alpha}_i^{(E)}, \vec{\alpha}_i^{(TS)}) \quad \{\text{Math. 103}\}$$

The subsystems are given indicators differentiating them such as a1, a2, . . . and are found by taking the inner product of the energy sums Pi of the subsystem units. a1 corresponds to the lower order system of color, a2 to the higher order system of color, a3 to the lower order system of texture, a4 to the higher order system of texture, etc.

$$P_{i,a1} = \vec{\alpha}_{i,a1} \cdot \vec{F}_{a1} \quad \{\text{Math. 104}\}$$
$$= \vec{\alpha}_{i,a1}^{(E)} \cdot \vec{E}_{a1} - \alpha_{i,a1}^{(TS)} T_{a1} \frac{S_{a1}}{\langle S_{a1} \rangle}$$

$$P_{i,a2} = \vec{\alpha}_{i,a2} \cdot \vec{F}_{a2}$$
$$= \vec{\alpha}_{i,a2}^{(E)} \cdot \vec{E}_{a2} - \alpha_{i,a2}^{(TS)} T_{a2} \frac{S_{a2}}{\langle S_{a2} \rangle}$$

...

However, in obtaining these linear combinations and finding the total adjective energy Qi, with the above simple inner products, the greater the number of energy elements which can be defined in a system, the larger the value of Pi ends up becoming. Subsystems describe independent aspects. At the time of combining subsystems, they have to be treated equally. For this reason, the value of the subsum Pi must be normalized to fall in the range of about [−1,1]. That is, $$P_{i,a1} = \frac{\vec{\alpha}_{i,a1}^{(E)} \cdot \vec{E}_{a1} - \alpha_{i,a1}^{(TS)} T_{a1} \frac{S_{a1}}{\langle S_{a1} \rangle}}{\langle |\vec{\alpha}_{i,a1}| \rangle_i \langle |\vec{E}_{a1}| \rangle \sqrt{1 + \left(\frac{\langle S_{a1} \rangle}{\langle \langle S \rangle \rangle_a}\right)^2}} \quad \{\text{Math. } 105\}$$

$$P_{i,a2} = \frac{\vec{\alpha}_{i,a2}^{(E)} \cdot \vec{E}_{a2} - \alpha_{i,a2}^{(TS)} T_{a2} \frac{S_{a2}}{\langle S_{a2} \rangle}}{\langle |\vec{\alpha}_{i,a2}| \rangle_i \langle |\vec{E}_{a2}| \rangle \sqrt{1 + \left(\frac{\langle S_{a2} \rangle}{\langle \langle S \rangle \rangle_a}\right)^2}}$$

Here, $<>_a$ indicates the statistical mean for all subsystems. That is, if the number of subsystems considered is $n_a$, $$\langle\langle S \rangle\rangle_a = \frac{\langle S_{a1} \rangle + \langle S_{a2} \rangle + \ldots}{n_a} \quad \{\text{Math. } 106\}$$

Here too, in the normalization of the denominator, the idea that the statistical mean should be taken as much as possible is applied. Due to this, the differences in number of states due to the differences in number of bins in quantification of a distribution function, defined differently depending on the subsystems, that is, the differences in entropy, can be absorbed and different subsystems can be placed on a common footing. That is, the definitions of the Planck's constant and the Boltzmann constant, which differ depending on the subsystem, are absorbed here, and an energy quantity Pi of the scale which can be treated equally is calculated. Physically, the term of the square root of the denominator can be understood as a correction term required when the physical constants differ depending on the subsystem. The norm mean of one mean temperature or adjective vector is normalization for absorbing the difference in the number of energy elements able to be defined by a subsystem. In this way, the normalization by the statistical mean of the norm for placing the subsystems on a common footing in this way plays an extremely important role in defining an absolute quantity.

For reference, the applicant prepared a large amount of general images and investigated the values of their entropies and the values of their temperatures for their subsystems by experiments. The results are shown below. If looking at these values, it will be understood how important the procedure of normalization is for combining subsystems.

Entropy $7.97 \leq \sim S_{Fo} \leq \sim 14.30 < S_{Fo} > = 12.51$ $2.49 \leq \sim S_F \leq \sim 6.05 < S_F > = 4.67$ $8.75 \leq \sim S_{Go} \leq \sim 14.39 < S_{Go} > = 12.19$ $7.49 \leq \sim S_G \leq \sim 13.82 < S_G > = 10.81$ Temperature $0.18 \leq \sim T_{Fo} \leq \sim 1.37 < T_{Fo} > = 0.73$ $2.68 \leq \sim T_F \leq \sim 3.31 < T_F > = 2.91$ $0.003 \leq \sim T_{Go} \leq \sim 0.10 < T_{Go} > = 0.03$ $5.75 \leq \sim T_G \leq \sim 20.63 < T_G > = 12.31$ Therefore, the number becomes on the order of 1/<S> to 0.1. The square root of the denominator is a value of about 1.1 to 1.6 or so.

8. Combination to Adjective Energy of Entire System

Next, the energies of the subsystems are combined. To find the adjective energies Qi of the entire system, the subsum energies Pi are combined by linear combination. The linear combination coefficients at this time determine which of the lower order system of color, the higher order system of color, the lower order system of texture, the higher order system of texture, etc. plays an important role for a certain adjective i. Furthermore, when adding composition as a subsystem, the importance of the element of composition is also taken into consideration.

The step of determining the linear combination coefficients is performed by a similar procedure as performed for determining αi for each of the above-mentioned energy elements $E_n$. That is, using the subsum Pi,j as the variable x, for the distribution of general model images, the mean value $m_p$ and its standard deviation $\sigma_p$ are found and, for the distribution of an adjective model images, the mean value $m_q$ and its standard deviation $\sigma_q$ are found, to similarly determine the linear combination coefficients.

$$k_{i,aj} = \text{erf}\left(\frac{m_q(P_{i,aj}) - m_p(P_{i,aj})}{\sqrt{2}\,\sigma_p(P_{i,aj})}\right) \quad \{\text{Math. } 107\}$$

$$\delta k_{i,aj} = \sqrt{\frac{2}{\pi}} \exp\left(-\left(\frac{m_q(P_{i,aj}) - m_p(P_{i,aj})}{\sqrt{2}\,\sigma_p(P_{i,aj})}\right)^2\right) \cdot \frac{\sigma_q(P_{i,aj})}{\sigma_p(P_{i,aj})}$$

These linear combination coefficients are used to find the energy sum Qi of all systems relating to the adjectives i. At this time as well, normalization is performed so that this fits in the range of about [−1,1].

$$Q_i = \frac{k_{i,a1} P_{i,a1} + k_{i,a2} P_{i,a2} + \ldots}{\langle |\vec{k}_i| \rangle_i \langle |\vec{P}_i| \rangle_i} = \frac{\vec{k}_i \cdot \vec{P}_i}{\langle |\vec{k}_i| \rangle_i \langle |\vec{P}_i| \rangle_i} \quad \{\text{Math. } 108\}$$

Here, < > expresses the mean relating to the general model images, while $<>_i$ expresses the mean relating to adjectives. Note that the energy band diagram shown up to here was drawn using an $\alpha(E_n)$ of a form including the weight coefficients k of this subsystem. Further, regarding the density of states, for the gamut region $\rho_{max}(E_n)$ fluctuating the most to the plus and minus sides among the energy elements used for the general model image, the range considered largest as $\alpha(E_n)\rho_{max}(E_n)$ is filled in as the energy band model.

9. Adjective Retrieval Processing

If combining a general model and adjective model to construct an energy band model for learning use in this way, it is possible to search through images of a separate database using an i-th adjective as a keyword to retrieve images of impressions close to it based on the adjective energy Qi. If arranging the images in the order of Qi, the result becomes a form close to a regular distribution and it is possible to present a region of a high deviation value of the higher order group as the target images. Further, it is possible to present a region of a low deviation value of a lower order group as images of impressions of an opposite structure to this adjective. That is, it is possible to determine the results of sorting of perceptual images of opposite meanings to a user as well.

Furthermore, if inputting a certain single image and calculating Qi for all of the adjectives of an adjective model prepared in advance, it is possible to convert the degree of the absolute impression received from the image by a person of that model to numerical values for all of the adjective. If displaying this rearranged in order of size of the values, this image has a "freshness" of 0.8 and "repose" of a high 0.7 as well and has a "bustling" value of −0.7 or a low value in the opposite direction, so it is possible to present the result of no impression being felt at all.

As the energy band models of adjectives, it is possible to obtain a mean model common for the vast majority of people and possible to build models specific to cultures reflecting differences in countries, cultures, and languages. Alternatively, it is also possible to build individual energy band models reflecting differences in preferences on the individual level. Therefore, the models of the energy band structure employed by this image retrieval system can also be used as tools for quantitatively illuminating the structure of human perception.

The applicant tried experimentally to see if differences in individuals can be distinguished. It found that for the adjective "rough", for a model where one person would select the scene of trees standing up sharply on a bare mountain and the sight created by the roughly churning water of a river about half of the time each, the results of perceptual retrieval capture these elements compositely and cluster at the higher order group. Further, while another person would select the sight created by the rough churning of water of a river as the main model image, the adjective energy Qi enables a clear grasp of the features of the flow of a river and shows the performance of extracting images close to the model. For this reason, the energy elements $E_n$ used as features can be said to provide the ability to differentiate objects incorporated into an image as a whole.

Note that it is possible to extend the idea of using the deviation value to find the linear combination coefficients and to use the finally obtained value of Qi to confirm if the adjective model image clusters at the higher order group with respect to the general model image by finding the deviation value of the Qi of the model image group with respect to the general model one more time. Due to this, it is possible to verify the sufficiency of a feature treated as the legitimacy of a theoretical model.

$$w_u = \mathrm{erf}\left(\frac{m_q(Q_i) - m_p(Q_i)}{\sqrt{2}\,\sigma_p(Q_i)}\right)$$

$$\delta w_u = \sqrt{\frac{2}{\pi}} \exp\left(-\left(\frac{m_q(Q_i) - m_p(Q_i)}{\sqrt{2}\,\sigma_p(Q_i)}\right)^2\right) \cdot \frac{\sigma_q(Q_i)}{\sigma_p(Q_i)}$$

{Math. 109}

By expanding on this thinking and viewing where the adjective model image distribution of the i-th adjective energy Qi is positioned with respect to the general model image distribution of the j-th adjective energy Qj for the finally found Qi of the adjective, it is learned how much of the absolute impression of the i-th adjective is included for a j-th adjective. It is possible to find a correlation matrix $w_{ij}$ between the adjectives expressing whether the i-th adjective is an adjective belonging to the similar group giving impressions close to the j-th adjective or whether the i-th adjective is an adjective belonging to a far off adjective group giving an impression completely opposite to the j-th adjective. Due to this, a map of the adjective structure common to all people becomes clear and the map structure of adjectives relating to differences in cultures and differences in individuals can be elucidated.

$$w_{ij} = \mathrm{erf}\left(\frac{m_q(Q_i) - m_p(Q_j)}{\sqrt{2}\,\sigma_p(Q_j)}\right)$$

$$\delta w_{ij} = \sqrt{\frac{2}{\pi}} \exp\left(-\left(\frac{m_q(Q_i) - m_p(Q_j)}{\sqrt{2}\,\sigma_p(Q_j)}\right)^2\right) \cdot \frac{\sigma_q(Q_i)}{\sigma_p(Q_j)}$$

{Math. 110}

By switching the relationship of i and j, it is possible to similarly calculate the deviation value of the adjective model distribution of a j-th adjective energy Qj over the general model distribution image of an i-th adjective energy Qi by a separate route. From the definition, a correlation matrix of an adjective is a symmetric matrix. That is, $$w_{ij} = w_{ji}$$

However, what are calculated by going over separate routes do not always match when there is some propensity in the properties of the population image. Therefore, whether a correlation matrix of an adjective indicates a value close to the symmetric matrix gives a good indicator for verifying if an image group selected in the model building process selects random images with good generality. Further, the diagonal components preferably all become 1 as explained above. When not reaching this, it means that the features for capturing the adjective are insufficient or there are parts where the hypothesis of the theoretical model does not stand, so a good evaluation indicator is given for the construction of a retrieval system.

[Sixth Embodiment]

Perceptual Retrieval: Three-Stage Combination of "Energy+Momentum+Angular Momentum"

In this embodiment, it was explained that adjective retrieval reflecting individuality is possible. However, in constructing individual adjective models, it is preferable to prepare a certain large number of images. As opposed to this, when the object is to submit a smaller number of about three to five images and select images close to their image perceptions from a database, since the process of elimination of information by the statistical mean is an incomplete state, the need arises to add to the consideration the mechanical invariant omitted in the fifth embodiment. Just the steps newly added along with this will be explained below.

1. Conversion to Munsell HVC Color Space
2. Preparation of Edge Images of HVC Planes
3. Preparation of Lower Order Invariants of Color
3-1. Preparation of Distribution Function of Lower Order System
3-2. Calculation of Entropy
3-3. Calculation of Elements $p_n$ of Momentum In the momenta defined in the fifth embodiment, only the mean values <H>, <V>, and <C> are made elements of the momentum.

3-4. Calculation of Elements $M_n$ of Angular Momentum

In the momentums defined in the fifth embodiment, the standard deviation values $\sigma_H$, $\sigma_V$, and $\sigma_C$ are made elements of the angular momentum.

3-5. Calculation of Elements $E_n$ of Energy
3-6. Calculation of Temperature of Subsystem Based on the same procedure as the content described later for the higher order system of color. Details will not be explained here.

3-7. Calculation of Free Energy of Subsystem

Based on the same procedure as the content described later for the higher order system of color. Details will not be explained here.

4. Preparation of Higher Order Invariants of Color 4-0. Hilbelt Space Expression of Distribution Function of Lower Order System 4-1. Preparation of Distribution Function of Higher Order System 4-2. Calculation of Entropy 4-3. Calculation of Elements $p_n$ of Momentum 4-4. Calculation of Elements $M_n$ of Angular Momentum Chebyshev expansion coefficients are divided into the angular momentum quantum number l=0 and 1, so the product of the angular momentum quantum number and momentum is taken to calculate the angular momentum. The elements $M_n$ of the angular momentum become as follows:

$$(c_{11}^{(\alpha)} + c_{12}^{(\alpha)} + \ldots + c_{1N}^{(\alpha)})(\alpha) = H, V, C.$$

4-5. Calculation of Elements $E_n$ of Energy 4-6. Calculation of Temperatures of Subsystem If expressing the values of the energy elements together in units of energy by a vector and similarly expressing the values of the elements of momentum together in units of momentum and the values of the elements of angular momentum together in units of angular momentum by vectors, the energy vector, momentum vector, and angular momentum vector of the subsystems can be defined.

$$\vec{E} = (E_1, E_2, \ldots, E_n)$$

$$\vec{p} = (p_1, p_2, \ldots, p_n)$$

$$\vec{M} = (M_1, M_2, \ldots, M_n) \quad \{\text{Math. 111}\}$$

If calculating the norms of the energy vector, momentum vector, angular momentum vector of a subsystem, the temperatures $T_E$, $T_p$, $T_M$ of the images relating to subsystem can be defined in units of mechanical invariants.

$$T_E = |\vec{E}| = \sqrt{E_1^2 + E_2^2 + \ldots + E_n^2}$$

$$T_p = |\vec{p}| = \sqrt{p_1^2 + p_2^2 + \ldots + p_n^2}$$

$$T_M = |\vec{M}| = \sqrt{M_1^2 + M_2^2 + \ldots + M_n^2} \quad \{\text{Math. 112}\}$$

4-7. Calculation of Free Energy of Subsystem

From the similarity in the case of energy, the free energy, free momentum, and free angular momentum of a subsystem are defined.

$$\vec{F}_E = \left(\vec{E}, -|\vec{E}|\frac{S}{\langle S \rangle}\right) = \left(\vec{E}, -T_E \frac{S}{\langle S \rangle}\right) \quad \{\text{Math. 113}\}$$

$$\vec{F}_p = \left(\vec{p}, -|\vec{p}|\frac{S}{\langle S \rangle}\right) = \left(\vec{p}, -T_p \frac{S}{\langle S \rangle}\right)$$

$$\vec{F}_M = \left(\vec{M}, -|\vec{M}|\frac{S}{\langle S \rangle}\right) = \left(\vec{M}, -T_M \frac{S}{\langle S \rangle}\right)$$

5. Preparation of Lower Order Invariants of Texture

Exactly the same as the guidelines described in "3. Preparation of lower order invariants of color".

6. Preparation of Higher Order Invariants of Texture

When performing spherical Bessel expansion by s and p orbits, the procedure is exactly the same as the guidelines explained in "4. Preparation of higher order invariants of color", so the explanation will be omitted.

7. Combination of Mechanical Invariant Units of Subsystem 7-1. Setting of Adjectives 7-2. Construction of General Image Model 7-3. Construction of Adjective Model Images 7-4. Calculation of Deviation Values in Distribution in Elements In the sixth embodiment, the deviation values and their errors were calculated for the energy elements $E_n$, but in the seventh embodiment, the same thing is performed for the elements $p_n$ of momentum and the elements $M_n$ of angular momentum. The symbols are changed and the deviation values for the elements of energy are made $\beta_i$, the deviation values for the elements of momentum are made $\gamma_i$, and the deviation values for the elements of angular momentum are made $\delta_i$.

$$\beta_i(E_n) = \text{erf}\left(\frac{m_q(E_n) - m_p(E_n)}{\sqrt{2}\,\sigma_p(E_n)}\right) \quad \{\text{Math. 114}\}$$

$$\delta\beta_i(E_n) = \sqrt{\frac{2}{\pi}}\exp\left(-\left(\frac{m_q(E_n) - m_p(E_n)}{\sqrt{2}\,\sigma_p(E_n)}\right)^2\right) \cdot \frac{\sigma_q(E_n)}{\sigma_p(E_n)}$$

$$\gamma_i(p_n) = \text{erf}\left(\frac{m_q(p_n) - m_p(p_n)}{\sqrt{2}\,\sigma_p(p_n)}\right)$$

$$\delta\gamma_i(p_n) = \sqrt{\frac{2}{\pi}}\exp\left(-\left(\frac{m_q(p_n) - m_p(p_n)}{\sqrt{2}\,\sigma_p(p_n)}\right)^2\right) \cdot \frac{\sigma_q(p_n)}{\sigma_p(p_n)}$$

$$\delta_i(M_n) = \text{erf}\left(\frac{m_q(M_n) - m_p(M_n)}{\sqrt{2}\,\sigma_p(M_n)}\right)$$

$$\delta\delta_i(M_n) = \sqrt{\frac{2}{\pi}}\exp\left(-\left(\frac{m_q(M_n) - m_p(M_n)}{\sqrt{2}\,\sigma_p(M_n)}\right)^2\right) \cdot \frac{\sigma_q(M_n)}{\sigma_p(M_n)}$$

7-5. Calculation of Subenergy, Submomentum, and Subangular Momentum of Mechanical Invariant Units of Subsystems In the above way, model adjective vectors are determined for the free energy vector, free momentum vector, and free angular momentum vector. Note that it is assumed that deviation values are determined through the same process as for the TS invariants. That is, $$\vec{F}_E = \left(\vec{E}, -|\vec{E}|\frac{S}{\langle S \rangle}\right) = \left(\vec{E}, -T_E \frac{S}{\langle S \rangle}\right) \quad \vec{\beta}_i = (\beta_i^{(E)}, \beta_i^{(T_E S)}) \quad \{\text{Math. 115}\}$$

$$\vec{F}_p = \left(\vec{p}, -|\vec{p}|\frac{S}{\langle S \rangle}\right) = \left(\vec{p}, -T_p \frac{S}{\langle S \rangle}\right) \quad \vec{\gamma}_i = (\gamma_i^{(p)}, \gamma_i^{(T_p S)})$$

$$\vec{F}_M = \left(\vec{M}, -|\vec{M}|\frac{S}{\langle S \rangle}\right) = \left(\vec{M}, -T_M \frac{S}{\langle S \rangle}\right) \quad \vec{\delta}_i = (\delta_i^{(M)}, \delta_i^{(T_M S)})$$

The inner products of the two are taken and combined to the subenergy $E_i$, submomentum $p_i$, and subangular momentum $M_i$ of the mechanical invariant units of the subsystem relating to the impression of the adjective i. Due to the normalization, the dimensions of all of the mechanical invariants are aligned.

$$E_i = \frac{\vec{\beta}_i^{(E)} \cdot \vec{E} - \beta_i^{(T_E S)} T_E \frac{S}{\langle S \rangle}}{\langle |\vec{\beta}_i| \rangle_i \langle |\vec{E}| \rangle \sqrt{1 + \left(\frac{\langle S \rangle}{\langle \langle S \rangle \rangle_a}\right)^2}} \quad \{\text{Math. 116}\}$$

$$p_i = \frac{\vec{\gamma}_i^{(E)} \cdot \vec{p} - \gamma_i^{(T_P S)} T_P \frac{S}{\langle S \rangle}}{\langle |\vec{\gamma}_i| \rangle_i \langle |\vec{p}| \rangle \sqrt{1 + \left(\frac{\langle S \rangle}{\langle \langle S \rangle \rangle_a}\right)^2}}$$

$$M_i = \frac{\vec{\delta}_i^{(M)} \cdot \vec{M} - \delta_i^{(T_M S)} T_M \frac{S}{\langle S \rangle}}{\langle |\vec{\delta}_i| \rangle_i \langle |\vec{M}| \rangle \sqrt{1 + \left(\frac{\langle S \rangle}{\langle \langle S \rangle \rangle_a}\right)^2}}$$

8. Combination to Adjective Energy of Subsystem

The three mechanical invariants found in a subsystem express the expected value of the energy, the expected value of the momentum, and the expected value of the angular momentum for which the statistical mean is taken relating to the adjectives i in the subsystem. Which among these macroscopic quantities plays an important role in the case of a small-number image model is expressed by the combination coefficients when combining three mechanical invariants by linear combination. These combination coefficients can be similarly described by deviation values from the positional relationship of the distribution functions of general model images and adjective model images. These combination coefficients are expressed by $\alpha_i(E_i)$, $\alpha_i(p_i)$, and $\alpha_i(M_i)$.

$$\alpha_i(E_i) = \text{erf}\left(\frac{m_q(E_i) - m_p(E_i)}{\sqrt{2}\,\sigma_p(E_i)}\right) \quad \{\text{Math. 117}\}$$

$$\delta\alpha_i(E_i) = \sqrt{\frac{2}{\pi}} \exp\left(-\left(\frac{m_q(E_i) - m_p(E_i)}{\sqrt{2}\,\sigma_p(E_i)}\right)^2\right) \cdot \frac{\sigma_q(E_i)}{\sigma_p(E_i)}$$

$$\alpha_i(p_i) = \text{erf}\left(\frac{m_q(p_i) - m_p(p_i)}{\sqrt{2}\,\sigma_p(p_i)}\right)$$

$$\delta\alpha_i(p_i) = \sqrt{\frac{2}{\pi}} \exp\left(-\left(\frac{m_q(p_i) - m_p(p_i)}{\sqrt{2}\,\sigma_p(p_i)}\right)^2\right) \cdot \frac{\sigma_q(p_i)}{\sigma_p(p_i)}$$

$$\alpha_i(M_i) = \text{erf}\left(\frac{m_q(M_i) - m_p(M_i)}{\sqrt{2}\,\sigma_p(M_i)}\right)$$

$$\delta\alpha_i(M_i) = \sqrt{\frac{2}{\pi}} \exp\left(-\left(\frac{m_q(M_i) - m_p(M_i)}{\sqrt{2}\,\sigma_p(M_i)}\right)^2\right) \cdot \frac{\sigma_q(M_i)}{\sigma_p(M_i)}$$

The three linear combination coefficients are expressed as vectors of $\alpha_i$ and the mechanical invariant is expressed as a vector of E'.

$$\vec{E}_i' = (E_i, p_i, M_i)$$

$$\vec{\alpha}_i = (\alpha_i(E_i), \alpha_i(p_i), \alpha_i(M_i)) \quad \{\text{Math. 118}\}$$

The adjective energy P, of a subsystem is expressed by the inner product of these.

$$P_{i,a1} = \frac{\vec{\alpha}_{i,a1} \cdot \vec{E}'_{i,a1}}{\langle |\vec{\alpha}_{i,a1}| \rangle \langle \langle |\vec{E}'_{i,a1}| \rangle \rangle_i} \quad \{\text{Math. 119}\}$$

$$P_{i,a2} = \frac{\vec{\alpha}_{i,a2} \cdot \vec{E}'_{i,a2}}{\langle |\vec{\alpha}_{i,a2}| \rangle \langle \langle |\vec{E}'_{i,a2}| \rangle \rangle_i}$$

9. Combination to Adjective Energy of Entire System

The rest is exactly the same as the fifth embodiment.

10. Adjective Retrieval Processing

[Seventh Embodiment]

Similar Image Retrieval of Single Image: Three-Stage Combination of "Energy+Momentum+Angular Momentum"

In the sixth embodiment, the example of constructing an adjective model by a small-number model was shown. If bringing this to an extreme, it is possible to use this for a single image similar image retrieval. That is, it becomes possible to extract images close in overall impression with a single image given as an example through description of the macroscopic quantities of energy, momentum, and angular momentum.

The method of the sixth embodiment includes the method of the fifth embodiment. The reason is that if the number of the model images becomes large, the roles of momentum and angular momentum are decreased and automatically the statistical mean causes these linear combination coefficients to be constrained to a value close to zero. Therefore, the method of the sixth embodiment can be realized seamlessly for retrieval of a single image to perceptual retrieval of a small number of models and furthermore for perceptual retrieval of a large number of models.

The embodiments explained above were described to facilitate the understanding of the present invention and were not described to limit the present invention. Therefore, the elements disclosed in the above embodiments include all design modifications and equivalents etc. falling under the technical scope of the present invention.

The invention claimed is:

1. An image sorting apparatus comprising:
   an image inputting unit that inputs an image;
   a distribution function preparing unit that prepares a distribution function of pixel values of the image;
   a describing unit that performs series expansion on the distribution function by using base functions that form a complete set and are orthogonal to each other due to different weights in a distribution area and describing the distribution function by expansion coefficients,
   an evaluating unit that evaluates features of the shape of the distribution function based on the expansion coefficients, and
   a sorting unit that sorts the image to images of at least two categories based on results of the evaluation, wherein
   the describing unit uses base functions that are orthogonal to each other due to different weights between a center portion and two end portions of the distribution area spreading in a positive region.

2. An image sorting apparatus comprising:
   an image inputting unit that inputs an image;
   a distribution function preparing unit that prepares a distribution function of pixel values of the image;
   a describing unit that performs series expansion on the distribution function by using base functions that form a complete set and are orthogonal to each other due to different weights in a distribution area and describing the distribution function by expansion coefficients, an evaluating unit that evaluates features of the shape of the distribution function based on the expansion coefficients, and a sorting unit that sorts the image to images of at least two categories based on results of the evaluation, wherein the describing unit uses base functions capable of shape description with a density attaching importance to shapes of a rising portion and a falling portion located at the two ends of the distribution function more than the shape of the center portion.

3. An image sorting apparatus comprising:

an image inputting unit that inputs an image;

a distribution function preparing unit that prepares a distribution function of pixel values of the image;

a describing unit that performs series expansion on the distribution function by using base functions that form a complete set and are orthogonal to each other due to different weights in a distribution area and describing the distribution function by expansion coefficients, an evaluating unit that evaluates features of the shape of the distribution function based on the expansion coefficients and a sorting unit that sorts the image to images of at least two categories based on results of the evaluation, wherein the describing unit uses Chebyshev polynomials as the base functions.

4. An image sorting apparatus comprising:

an image inputting unit that inputs an image;

an edge image preparing unit that prepares an edge image concerning edge components of the image;

a distribution function preparing unit that prepares a distribution function of pixel values of the edge image;

a describing unit that performs series expansion on the distribution function by using base functions that form a complete set and are orthogonal to each other due to different weights in a distribution area and describing the distribution function by expansion coefficients, an evaluating unit that evaluates features of the shape of the distribution function based on the expansion coefficients, and a sorting unit that sorts the image to images of at least two categories based on results of the evaluation, wherein the describing unit uses base functions that are orthogonal to each other due to different weights between near zero and outside of the distribution area spreading in positive and negative regions.

5. An image sorting apparatus comprising:

an image inputting unit that inputs an image;

an edge image preparing unit that prepares an edge image concerning edge components of the image;

a distribution function preparing unit that prepares a distribution function of pixel values of the edge image;

a describing unit that performs series expansion on the distribution function by using base functions that form a complete set and are orthogonal to each other due to different weights in a distribution area and describing the distribution function by expansion coefficients, an evaluating unit that evaluates features of the shape of the distribution function based on the expansion coefficients, and a sorting unit that sorts the image to images of at least two categories based on results of the evaluation, wherein the describing unit uses base functions capable of shape description with a density attaching importance to the shape of lower slope portions located at the outside of the distribution function more than the shape near the origin.

6. An image sorting apparatus comprising:

an image inputting unit that inputs an image;

an edge image preparing unit that prepares an edge image concerning edge components of the image;

a distribution function preparing unit that prepares a distribution function of pixel values of the edge image;

a describing unit that performs series expansion on the distribution function by using base functions that form a complete set and are orthogonal to each other due to different weights in a distribution area and describing the distribution function by expansion coefficients, an evaluating unit that evaluates features of the shape of the distribution function based on the expansion coefficients, and a sorting unit that sorts the image to images of at least two categories based on results of the evaluation, wherein the describing unit uses spherical Bessel functions as the base functions.

7. An image sorting apparatus comprising:

an image inputting unit that inputs an image;

an edge image preparing unit that prepares an edge image concerning edge components of the image;

a distribution function preparing unit that are prepares a distribution function of pixel values of the edge image.

a describing unit that performs series expansion on the distribution function by using base functions that form a complete set and are orthogonal to each other due to different weights in a distribution area and describing the distribution function by expansion coefficients, an evaluating unit that evaluates features of the shape of the distribution function based on the expansion coefficients, and a sorting unit that sorts the image to images of at least two categories based on results of the evaluation, wherein the edge image preparing unit filters the image to successively produce high frequency subband images comprised of a plurality of resolutions, successively combines the high frequency subband images from the lowest resolution to produce a single combined high frequency band image, and defines the single combined high frequency band image as the edge image.

8. The image sorting apparatus according to claim 1, wherein when the image is a color image, the apparatus expresses the image by three color plane images of a hue plane, value plane, and chroma plane and performs the above processing for each of the three color plane images so as to sort the color image into images of at least two categories.

9. The image sorting apparatus according to claim 1, wherein the sorting unit sorts the image into at least two categories of adjectives.

10. An image sorting apparatus comprising:

an image inputting unit that inputs an image;

a distribution function preparing unit that prepares a distribution function of pixel values of the image, a describing unit that performs series expansion on the distribution function by using base functions comprised of an even function group and an odd function group that form a complete set and are orthogonal to each other and describing the distribution function by expansion coefficients, a physical quantity calculating unit that gives even quantum numbers and odd quantum numbers to function groups belonging to subgroups having same properties concerning even functions and odd functions among the base function groups and calculating a physical quantity of the sum of products of the expansion coefficients and the quantum numbers given to each for all expansion coefficients;

an evaluating unit that evaluates features of the shape of the distribution function based on the physical quantity, and a sorting unit that sorts the image to images of at least two categories based on results of the evaluation, wherein when the image inputting unit inputs an image of one color plane, the describing unit uses Chebyshev polynomials as the base functions, and the physical quantity calculating unit calculates the physical quantity by giving a quantun number 0 to all even function groups and giving a quantum number 1 to all odd function groups.

11. An. image sorting apparatus comprising:

an image inputting unit that inputs an image;

a distribution function preparing unit that prepares a distribution function of pixel values of the image, a describing unit that performs series. expansion an the distribution function by using base functions comprised of an even function group and an odd function group that form a complete set and are orthogonal to each other and describing the distribution function by expansion coefficients, a physical quantity calculating unit that gives even quantum numbers and odd quantum numbers to function groups belonging to subgroups having same properties concerning even functions and odd functions among the base function groups and calculating a physical quantity of the sum of products of the expansion coefficients and the quantum numbers given to each for all expansion coefficients;

an evaluating unit that evaluates feature of the shape of the distribution function based on the physical quantity, and a sorting unit that sorts the image to images of at least two categories based on results of the evaluation, wherein when the image inputting unit inputs an edge image concerning an edge component of one color plane, the describing unit uses, as the base functions, spherical Bessel functions comprised of at least an order 0 even function group and an order 1 odd function group, and the physical quantity calculating unit calculates the physical quantity by giving quantum numbers equal to the orders of the spherical Bessel functions to the subgroups.

12. The image sorting apparatus according to claim 11, wherein when the describing unit describes the distribution function by using order 2 or higher spherical Bessel functions, the physical quantity calculating unit calculates the physical quantity and further obtains a sum of products in a case when inverting the odd number order expansion coefficients to negative signs so as to calculate another physical quantity.

13. The image sorting apparatus according to claim 11, wherein the edge image is a single combined high frequency band image obtained by filtering the image to successively produce high frequency subband images comprised of a plurality of resolutions and successively combining the high frequency subband images from the one with the lowest resolution.

14. The image sorting apparatus according to claim 11, wherein the inputting unit inputs edge images of planes of hue, value, and chroma.

15. The image sorting apparatus according to claim 4, wherein when the image is a color image, the apparatus expresses the image by three color plane images of a hue plane, value plane, and chroma plane and performs the above processing for each of the three color plane images so as to sort the color image into images of at least two categories.

16. The image sorting apparatus according to claim 4, wherein the sorting unit sorts the image into at least two categories of adjectives.

17. The image sorting apparatus according to claim 13, wherein the inputting unit inputs edge images of planes of hue, value, and chroma.

* * * * *